(12) United States Patent
Pind et al.

(10) Patent No.: US 12,242,972 B2
(45) Date of Patent: Mar. 4, 2025

(54) METHODS AND SYSTEMS FOR GENERATING ACOUSTIC IMPULSE RESPONSES

(71) Applicant: Treble Technologies, Reykjavík (IS)

(72) Inventors: Finnur Pind, Reykjavík (IS); Jesper Pedersen, Garðabær (IS)

(73) Assignee: TREBLE TECHNOLOGIES, Reykjavik (IS)

( * ) Notice: Subject to any disclaimer, the term of this patent is extended or adjusted under 35 U.S.C. 154(b) by 0 days.

(21) Appl. No.: 18/521,850

(22) Filed: Nov. 28, 2023

(65) Prior Publication Data
US 2024/0179487 A1    May 30, 2024

(30) Foreign Application Priority Data

Nov. 28, 2022  (EP) .................................... 22209959
Sep. 5, 2023   (EP) .................................... 23195400
Oct. 17, 2023  (EP) .................................... 23204159

(51) Int. Cl.
  H04S 7/00      (2006.01)
  G06N 3/0455    (2023.01)
  G06N 3/094     (2023.01)

(52) U.S. Cl.
  CPC .......... G06N 3/094 (2023.01); G06N 3/0455 (2023.01); H04S 7/302 (2013.01); H04S 7/303 (2013.01);
(Continued)

(58) Field of Classification Search
  CPC ....................................................... H04S 7/303
(Continued)

(56) References Cited

U.S. PATENT DOCUMENTS 6,826,483 B1 * 11/2004 Anderson ................ G01V 1/30
                                                  702/14
9,383,464 B2 *  7/2016 Shin ........................ G01V 1/30
(Continued)

FOREIGN PATENT DOCUMENTS

WO    2022167720 A1    8/2022

OTHER PUBLICATIONS

Aretz, Combined wave and ray based room acoustic simulation (Year: 2012).*
(Continued)

*Primary Examiner* — William A Jerez Lora
(74) *Attorney, Agent, or Firm* — COATS & BENNETT, PLLC

(57) ABSTRACT

A method for generating an impulse response for a listening point in a room includes: receiving a 3D model of the room, the position of at least one sound source in the 3D model, and acoustic properties of at least one boundary in the 3D model; using a wave based solver for determining a wave based impulse response of a wave based propagation of an impulse emitted at the at least one sound source in the 3D model and received at the listening point within a first acoustic frequency range; using a geometrical acoustics based solver for determining a geometrical impulse response of the ray based propagation of an impulse emitted at the at least one sound source in the 3D model and received at the listening point within a second acoustic frequency range; and generating the impulse response by merging the wave impulse response and the geometrical impulse response.

19 Claims, 4 Drawing Sheets

(52) U.S. Cl.
CPC .............. *H04S 7/305* (2013.01); *H04S 7/307* (2013.01); *H04S 2400/11* (2013.01); *H04S 2400/15* (2013.01)

(58) Field of Classification Search
USPC .................................. 381/1, 56, 58, 124, 303
See application file for complete search history.

(56) References Cited

U.S. PATENT DOCUMENTS

| | | | |
|---|---|---|---|
| 9,560,467 | B2 | 1/2017 | Gorzel et al. |
| 9,711,126 | B2* | 7/2017 | Mehra ..................... A63F 13/60 |
| 10,440,498 | B1 | 10/2019 | Gari et al. |
| 10,559,295 | B1 | 2/2020 | Abel |
| 10,777,214 | B1 | 9/2020 | Shi et al. |
| 10,897,570 | B1 | 1/2021 | Robinson et al. |
| 10,986,444 | B2 | 4/2021 | Mansour et al. |
| 11,830,471 | B1 | 11/2023 | Mansour et al. |
| 2011/0015924 | A1 | 1/2011 | Gunel Hacihabiboglu et al. |
| 2015/0110310 | A1 | 4/2015 | Minnaar |
| 2020/0214559 | A1 | 7/2020 | Krueger et al. |
| 2020/0395028 | A1 | 12/2020 | Kameoka et al. |
| 2021/0074282 | A1 | 3/2021 | Borgstrom et al. |
| 2021/0074308 | A1 | 3/2021 | Skordilis et al. |
| 2021/0136510 | A1 | 5/2021 | Tang et al. |
| 2022/0051479 | A1 | 2/2022 | Agarwal et al. |
| 2022/0079499 | A1 | 3/2022 | Doron et al. |
| 2022/0101126 | A1 | 3/2022 | Bharitkar |
| 2022/0327316 | A1 | 10/2022 | Grauman et al. |
| 2022/0405602 | A1 | 12/2022 | Yoo et al. |
| 2023/0164509 | A1 | 5/2023 | Sporer |
| 2023/0197043 | A1 | 6/2023 | Martinez Ramirez et al. |
| 2023/0362572 | A1 | 11/2023 | Jang et al. |

OTHER PUBLICATIONS

Thomas, Open Sphere Cardioid Microphone Array (Year: 2019).*
Aretz, Combined wave and ray based room acoustic simuation, 2012.*
Thomas, Open Sphere Cardioid Microphone Array, 2019.*
Ahrens, Computation of spherical harmonics based sound source directivity models from sparse measurement data, 2020.*
Anonymous and Others. Hybrid Model for Acoustic Simulation. May 15, 2021, XP93044320.
Funkhouser, T. Survey of Methods for Modeling Sound Propagation in Interactive Virtual Environment Systems. Department of Computer Science of Princeton University, Jan. 1, 2003, XP055746257.
Hart et al. Machine-learning of long-range sound propagation through simulated atmospheric turbulencea. The Journal of the Acoustical Society of America, American Institute of Physics, vol. 149, No. 6, Jun. 21, 2021, pp. 4384-4395, XP012257489.
Yeh et al. Using Machine Learning to Predict Indoor Acoustic Indicators of Multi-Functional Activity Centers. Applied Sciences, vol. 11, No. 12, Jun. 18, 2021, p. 5641, XP93054209.
Yeh et al. Wave-ray coupling for interactive sound propagation in large complex scenes. ACM Transactions on Graphics, ACM, NY, US, vol. 32, No. 6, Nov. 1, 2013, pp. 1-11, XP058033914.
Atkins, H.L et al, "Quadrature-Free Implementation of Discontinuous Galerkin Method for Hyperbolic Equations". In: AIAA Journal 36.5 (1998), pp. 775-782.
Berland, J. et al, "Low-dissipation and low-dispersion fourth-order Runge-Kutta algorithm", Computers & Fluids 35.10 (2006), pp. 1459-1463.
Bilbao, S. et al, "Local time-domain spherical harmonic spatial encoding for wave-based acoustic simulation". IEEE Signal Processing Letters 26.4 (2019), pp. 617-621.
Cosnefroy, M. "Propagation of impulsive sounds in the atmosphere: numerical simulations and comparison with experiments". PhD thesis. École Centrale de Lyon, 2019.
Dragna, D. et al "A generalized recursive convolution method for time-domain propagation in porous media". In: The Journal of the Acoustical Society of America 138.2 (2015), pp. 1030-1042.

Gabard, G. et al "A full discrete dispersion analysis of time-domain simulations of acoustic liners with flow". In: Journal of Computational Physics 273 (2014), pp. 310-326.
Hesthaven, J.S. et al, Nodal Discontinuous Galerkin Methods—Algorithms, Analysis, and Applications (Springer, New York, 2008), Chap. 3.
Hu, F.Q. et al, "Low-dissipation and low-dispersion Runge-Kutta schemes for computational acoustics", Journal of Computational Physics 124.1 (1996), pp. 177-191.
Jameson, A. et al "Solution of the Euler equations for complex configurations", 6th Computational Fluid Dynamics Conference. American Institute of Aeronautics and Astronautics (AIAA), pp. 1-11, 1983.
Kuttruff, H. "Room Acoustics: 6th edition", Dec. 10, 2019. CRC Press.
Pind Jorgensson, F. K, Wave-Based Virtual Acoustics. Technical University of Denmark, (2020), 194 pages.
Pind, F. et al. "Time domain room acoustic simulations using the spectral element method". In: The Journal of the Acoustical Society of America 145.6 (2019), pp. 3299-3310.
Pind, F. et al, "Time-domain room acoustic simulations with extended-reacting porous absorbers using the discontinuous Galerkin method", The Journal of the Acoustical Society of America 148.5 (2020), pp. 2851-2863.
Pind, F. et al, "A phenomenological extended-reaction boundary model for time-domain wave-based acoustic simulations under sparse reflection conditions using a wave splitting method", Applied Acoustics 172 (2021), p. 107596.
Savioja, L. et al, Overview of geometrical room acoustic modeling techniques. J. Acoust. Soc. Am., 138, 708-730, 2015.
Strøm, E. et al, "Massively Parallel Nodal Discontinous Galerkin Finite Element Method Simulator for Room Acoustics". MA thesis. Technical University of Denmark, 2020.
Wang, H. et al, "Time-domain impedance boundary condition modeling with the discontinuous Galerkin method for room acoustics simulations". In: The Journal of the Acoustical Society of America 147.4 (2020), pp. 2534-2546.
Wang, H. et al "An arbitrary high-order discontinuous Galerkin method with local time-stepping for linear acoustic wave propagation", The Journal of the Acoustical Society of America 149.1 (2021), pp. 569-580.
Abadi, M. et al, "TensorFlow: A system for large-scale machine learning", uploaded May 31, 2016, arXiv:1605.08695v2, published in Proceedings of the 12th USENIX conference on Operating Systems Design and Implementation, Nov. 2016, pp. 265-283, USENIX Association.
Anonymous, "Hybrid Model for Acoustic Simulation" May 15, 2021, pp. 1-6, XP93044320, obtained from Internet: https://reuk.github.io/wayverb/hybrid.html.
Yeh C-Y. et al., "Using Machine Learning to Predict Indoor Acoustic Indicators of Multi-Functional Activity Centers", Article, Applied Sciences, vol. 11, No. 12, Submitted May 28, 2021; Published Jun. 18, 2021, pp. 1-24, Obtained online: https://doi.org/10.3390/app11125641.
Atkins, H.L et al, "Quadrature-Free Implementation of Discontinuous Galerkin Method for Hyperbolic Equations", AIAA Journal vol. 36, No. 5, May 1998, pp. 775-782, Downloaded by North Dakota State University.
Bank, D. et al., "Autoencoders", Version 2, Submitted Apr. 3, 2021, pp. 1-22, Obtained from Internet: https://arxiv.org/abs/2003.05991v2.
Bansal, M. et al, "First Approach to Combine Particle Model Algorithms with Modal Analysis using FEM", Conventional Paper 6392, AES Convention 118, May 28-31, 2005, Barcelona, Spain, pp. 1-9,AES.
Bilbao S. et al, "Local time-domain spherical harmonic spatial encoding for wave-based acoustic simulation", IEEE Signal Processing Letters, 26.4, Mar. 1, 2019, pp. 617-621, obtained from Internet: https://www.research.ed.ac.uk/en/publications/local-time-domain-spherical-harmonic-spatial-encoding-for-wave-ba.

(56) References Cited

OTHER PUBLICATIONS

Cosnefroy, M. "Propagation of impulsive sounds in the atmosphere: numerical simulations and comparison with experiments", Partly in French, PhD thesisPHD thesis, Ecole Centrale de Lyon, Submitted Dec. 18, 2019, pp. 1-222.

Denk, F. et al, "Equalization filter design for achieving acoustic transparency in a semi-open fit hearing device", Speech Communication; 13th ITG-Symposium, Oct. 10-12, 2018, Oldenburg, Germany, pp. 226-230.

Dozat,T., "Incorporating Nesterov Momentum into Adam", Workshop track poster, ICLR May 2, 2016, pp. 1-4.

Dragna, D. et al "A generalized recursive convolution method for time-domain propagation in porous media", The Journal of the Acoustical Society of America 138.2, published online Aug. 20, 2015, pp. 1030-1042, https://doi.org/10.1121/1.4927553, Acoustical Society of America.

Funkhouser, T., "Survey of Methods for Modeling Sound Propagation in Interactive Virtual Environment Systems", Department of Computer Science of Princeton University, Jan. 1, 2003, pp. 1-53, XP055746257.

Gabard, G. et al "A full discrete dispersion analysis of time-domain simulations of acoustic liners with flow", Manuscript, Journal of Computational Physics 273, Received date Nov. 25, 2013, Accepted date May 2, 2014, pp. 1-22, 10.1016/j.jcp.2014.05.004.

Hart, C. et al., "Machine-learning of long-range sound propagation through simulated atmospheric turbulence", article, The Journal of the Acoustical Society of America, American Institute of Physics, vol. 149, No. 6, published online Jun. 21, 2021, pp. 4384-4395, XP012257489.

Hesthaven, J.S. et al, "Nodal Discontinuous Galerkin Methods, Algorithms, Analysis, and Applications", Texts in Applied Mathematics, Chapter 3, pp. 1-507, Springer, New York, 2008.

Hu, F.Q. et al, "Low-dissipation and low-dispersion Runge-Kutta schemes for computational acoustics", Article No. 0052, Journal of Computational Physics 124, 1996, received Dec. 23, 1994, Revised Jul. 1995, pp. 177-191, Academic Press, Inc.

Jameson, A. et al "Solution of the Euler equations for complex configurations", 6th Computational Fluid Dynamics Conference, paper No. 83-1929, pp. 1-11, 1983, American Institute of Aeronautics and Astronautics (AIAA), https://doi.org/10.2514/6.1983-1929.

Käser, M. et al, "An arbitrary high-order discontinuous Galerkin method for elastic waves on unstructured meshes—I. The two-dimensional isotropic case with external source terms", Journal compilation, Geophys. J. Int. (2006) 166, accepted Apr. 26, 2006, pp. 855-887, The Authors.

Ketkar, N., "Introduction to Keras", Deep learning with python: a hands-on introduction, Chapter 7, pp. 97-111, 2017, Kikhil Ketkar.

Kuttruff, H., "Room Acoustics: 6th edition", Dec. 10, 2019, pp. 1-302, CRC Press.

Majumder, S. et al, "Few-Shot Audio-Visual Learning of Environment Acoustics", 36th Conference on Neural Information Processing Systems (NeurIPS 2022), Nov. 22, 2022, p. 1-17, arXiv:2206.04006v2.

Melander, A. et al, "Massively parallel nodal discontinous Galerkin finite element method simulator for room acoustics", Research Paper, The International Journal of High Performance Computing Applications 2023, vol. 0(0), published online Nov. 16, 2023, pp. 1-21, The Authors.

Miccini, R. et al., "A hybrid approach to structural modeling of individualized HRTFs", 2021 IEEE Conference on Virtual Reality and 3D User Interfaces Abstracts and Workshops (VRW), Mar. 27, 2021, pp. 80-85, IEEE.

Milo, A. et al., "Treble Auralizer: a real time Web Audio Engine enabling 3DoF auralization of simulated room acoustics designs", Presented at conference 2023 Immersive and 3D Audio: from Architecture to Automotive (I3DA), Sep. 5-7, 2023, Bologna, Italy, pp. 1-8, 10.1109/I3DA57090.2023.10289386.

Moreau, S. et al.,"Study of Higher Order Ambisonic Microphone", CFA/DAGA'04, Strasbourg, Mar. 24-25, 2004, pp. 215-216.

Pind Jörgensson, F. K., "Wave-Based Virtual Acoustics", Ph.D. Thesis, 2020, pp. 1-195, Technical University of Denmark.

Pind, F. et al, "A phenomenological extended-reaction boundary model for time-domain wave-based acoustic simulations under sparse reflection conditions using a wave splitting method", preprint submitted to Applied Acoustics Aug. 4, 2020, published Jan. 2021, vol. 172, 107596, pp. 1-29, DTU Library.

Pind, F. et al. "Time domain room acoustic simulations using the spectral element method", The Journal of the Acoustical Society of America 145.6, 2019, pp. 3299-3310, Acoustical Society of America.

Pind, F. et al, "Time-domain room acoustic simulations with extended-reacting porous absorbers using the discontinuous Galerkin method", The Journal of the Acoustical Society of America 148.5, Nov. 24, 2020, pp. 2851-2863.

Ratnarajah, A. et al., "IR-GAN: Room impulse response generator for far-field speech recognition", Interspeech 2021, 22nd Annual Conference of the International Speech Communication Association, Brno, Czechia, Aug. 30-Sep. 3, 2021, pp. 286-290, ISCA.

Reed, W. H. et al., "Triangular mesh methods for the neutron transport equation", Submitted to Proceedings of the American Nuclear Society by Los Alamos Scientific Laboratory, Oct. 31, 1973, pp. 1-23.

Richard, A. et al., "Deep Impulse Responses: Estimating and Parameterizing Filters With Deep Networks", Feb. 7, 2022, pp. 1-5, arXiv:2202.03416v1 [cs.SD], obtained from Internet: https://arxiv.org/abs/2202.03416v1.

Rumelhart, D.E. et al, "Learning Internal Representations by Error Propagation", Parallel Distributed Processing: Explorations in the Microstructure of Cognition: Foundations, Chapter 8, 1987, pp. 318-362, MIT Press.

Sakamoto, S. et al, "Calculation of impulse responses and acoustic parameters in a hall by the finite-difference time-domain method", Acoust. Sci. & Tech. 29, 4, 2008, accepted Feb. 1, 2008, pp. 256-265, The Acoustical Society of Japan.

Sanaguano-Moreno, D.A. et al, "A Deep Learning approach for the Generation of Room Impulse Responses", 2022 Third International Conference of Information Systems and Software Technologies (ICI2ST), IEEE, Nov. 8, 2022, pp. 64-71, IEEE.

Savioja, L. et al, "Overview of geometrical room acoustic modeling techniques", J. Acoust. Soc. Am., 138, published online Aug. 10, 2015, pp. 708-730.

Singh, N. et al., "Image2Reverb: Cross-Modal Reverb Impulse Response Synthesis", submitted Aug. 13, 2021, pp. 1-22, arXiv:2103.14201v2 [cs.SD], obtained from internet: https://arxiv.org/abs/2103.14201.

Strøm, E. et al., "Massively Parallel Nodal Discontinuous Galerkin Finite Element Method Simulator for Room Acoustics", Master thesis, Apr. 2020, pp. 1-133, Technical University of Denmark.

Yeh C-Y. et al., "Wave-ray coupling for interactive sound propagation in large complex scenes", ACM Transactions on Graphics, ACM, NY, US, vol. 32, No. 6, Article 165, Nov. 2013, pp. 1-11, XP058033914.

Wang, H. et al., "Time-domain impedance boundary condition modeling with the discontinuous Galerkin method for room acoustics simulations", The Journal of the Acoustical Society of America 147.4, 2020, pp. 2534-2546, Acoustical Society of America.

Wang, H. et al., "An arbitrary high-order discontinuous Galerkin method with local time-stepping for linear acoustic wave propagation", The Journal of the Acoustical Society of America 149.1, publication date Jan. 25, 2021, pp. 569-580.

Xu, Z. et al, "Simulating room transfer functions between transducers mounted on audio devices using a modified image source method", J. Coust. Soc. Am., Sep. 8, 2023, Submitted Sep. 7, 2023, arXiv:2309.03486 [eess.AS], Cornell University Library.

Sakamoto, S. et al., "Directional sound source modeling by using spherical harmonic functions for finite-difference time-domain analysis", Proceedings of Meetings on Acoustics, vol. 19, 2013, ICA 2013 Montreal, Jun. 2-7, 2013, pp. 1-9, Acoustical Society of America.

Pind, F. et al., "A novel wave-based virtual acoustics and spatial audio framework", Audio Engineering Society Conference Paper, AVAR Conference, Richmond, VA, Aug. 15-17, 2022, pp. 1-10, AES.

(56) References Cited

OTHER PUBLICATIONS

Rocchesso, D., "Maximally Diffusive Yet Efficient Feedback Delay Networks for Artificial Reverberation", IEEE Signal Processing Letters, vol. 4, No. 9, Sep. 1997, pp. 252-255, IEEE.

* cited by examiner

METHODS AND SYSTEMS FOR GENERATING ACOUSTIC IMPULSE RESPONSES

CROSS-REFERENCE TO RELATED APPLICATIONS

The present application claims priority to each of the following applications: European Patent Application 22209959.0 filed on Nov. 28, 2022; European Patent Application 23195400.9 filed on Sep. 5, 2023; and European Patent Application 23204159.0 filed on Oct. 17, 2023, all of which are hereby incorporated by reference herein in their entireties.

TECHNICAL FIELD

The description relates to simulation of acoustic wave propagation and the rendering and use of the simulation.

BACKGROUND OF THE INVENTION

The theory of acoustic wave propagation is well established. An acoustic wave radiating from a source and propagating in some n-dimensional spatio-temporal domain can be mathematically described using the wave equation, which is based upon the fundamental physical principles of conservation of mass and momentum.

However, when applying computer systems and computer implemented method for acoustic simulation, the acoustic theory needs to be transferred to simulation method that can be processed by a computer.

Many different simulation methods such as the finite-difference time-domain method (FDTD), the boundary element method (BEM) or the finite volume method (FVM) are known in the art and common to them is that each is used with a consideration towards speed and accuracy. I.e. if a fast simulation is desired the trade-off is that the accuracy is low (low fidelity) and if an accurate simulation (high fidelity) is desired it can often take days to perform the simulation.

With the advancement of even greater processing capabilities, both local processing capabilities and cloud based high processing power, both speed and a fidelity of a simulation can be increased. However, in many cases simply using previous common simulation methods with the increased processing capabilities does not provide satisfactory results. This can for example be because the known simulation methods are not optimised for the structure and implementation of the computer processing systems of tomorrow.

For example, [17] describes numerous simulation methods in the field of room acoustic simulations. This is included herein as a reference.

Accordingly, there exist a need to further develop and improve acoustic simulation methods.

SUMMARY

The present disclosure relates to the implementations and optimisations of three types of simulation methods, the geometrical acoustic solver, the wave based solver and the hybridization or combination of the two simulation methods. Furthermore, it is also discussed uses and applications involving the simulations.

Geometrical Acoustic Solver

Geometrical acoustic solvers are generally known for their high speed but low accuracy simulations.

The basis for geometrical acoustic solvers is to employ a high frequency assumption, where the wavelength is assumed to be vanishingly small compared to the dimensions of the room and the obstacles in the room. The concept of the sound wave is then replaced by that of a bundle of sound rays, where each ray represents a small portion of a wave front with vanishing aperture. The ray propagates in the room following the laws of ray optics.

Examples of common geometrical acoustics methods used in the geometrical acoustic solvers are ray-tracing methods and image source methods [19]. Improvements on geometrical acoustic solvers applying the ray-tracing methods and the image source methods will be further discussed herein.

The geometrical acoustics approximation is generally taken to be acceptable at high frequencies in large rooms, where the dimensions and sizes of obstacles are orders of magnitude larger than the acoustic wavelength. The approximation becomes inappropriate and inaccurate once the obstacles in the room or room dimensions become comparable in size to the wavelength.

Wave Based Solver

Wave based solvers are generally known for their low speed but high accuracy simulations.

Wave based methods used in such solvers apply numerical techniques to directly solve governing partial differential equations that describe wave motion in a virtual domain, such as representing an air volume. This can for example be a wave equation in the time domain or the Helmholtz equation in the frequency domain.

The concept of the different wave-based methods is thus to divide the virtual domain of interest into small subdomains (discretization) and solve algebraic equations on each subdomain. Accordingly, wave based methods as disclosed herein may be understood to be methods that solve the partial differential equations using discretization techniques.

As discussed herein wave based solver includes or refers to finite element methods (FEM). This can for example be nodal finite element methods, which covers numerical methods such as a discontinuous Galerkin finite element method (DG/DGFEM) or a spectral element method (SEM).

In particular the discontinuous Galerkin finite element method (DG/DGFEM scheme) has been shown to be efficient when simulating acoustic wave propagation as discussed herein and will be considered in the following.

To consider the DG scheme the wave based engine solves the following system of differential equations describing wave propagation in a lossless air medium [1]:

$$\frac{\partial p}{\partial t} + \rho_0 c^2 \nabla \cdot v = \rho_0 c^2 Q, \tag{1}$$

$$\frac{\partial v}{\partial t} + \nabla p / \rho_0 = F / \rho_0, \tag{2}$$

with the acoustic pressure and the particle velocity are denoted by $p(x, t)$ and $v(x, t)=(u, v, w)$, respectively, the location $x=(x, y, z)$ in the spatial domain $\Omega$ (which in the most general case is in three dimensions, but can also be in one or two dimensions), at time t. The propagation medium is defined by the air density $\rho_0$ and adiabatic sound speed c; these parameters are usually assumed known and constant over time and space. The acoustic quantities Q and $F=(F_x, F_y, F_z)$ account for potential mass sources and external forces, respectively. For numerical purposes, Eqs (1) and (2) can be cast into the following matrix form:

$$\frac{\partial q}{\partial t} + A_x \frac{\partial q}{\partial x} + A_y \frac{\partial q}{\partial y} + A_z \frac{\partial q}{\partial z} = S, \quad (3)$$

With $q=\{p, u, v, w\}^T$ the solution vector, and $$A_i \begin{bmatrix} 0 & \rho_0 c^2 \delta_{ix} & \rho_0 c^2 \delta_{iy} & \rho_0 c^2 \delta_{iz} \\ \delta_{ix}/\rho_0 & 0 & 0 & 0 \\ \delta_{iy}/\rho_0 & 0 & 0 & 0 \\ \delta_{iz}/\rho_0 & 0 & 0 & 0 \end{bmatrix},$$

$$S = \begin{Bmatrix} \rho_0 c^2 Q \\ F_x/\rho_0 \\ F_y/\rho_0 \\ F_z/\rho_0 \end{Bmatrix},$$

with $i=\{x, y, z\}$ and the Kronecker delta function $\delta_{ij}$ to simplify the notations. System (3) is to be solved numerically from the (known) initial solution vector $q(x, t=0)$ together with appropriate boundary conditions.

As will be further discussed herein the spatial domain Q is partitioned or discretized into a set on non-overlapping and potentially unstructured mesh element or sub-domains ne (volumetric meshing). The elements can be of arbitrary shape, e.g. tetrahedrons, hexahedrons, pyramids, etc., or a combination of different shape types. However, aiming for a uniformity of the mesh elements in terms of shapes and element sizes throughout the mesh may improve certain processes. Thus, in some embodiment it may be preferred not to deform elements of the same shape, e.g. tetrahedrons.

The variational formulation of the propagation equations is then obtained as a projection against test functions $\Phi_e$ over $\Omega_e$. The test functions can be globally continuous across the mesh elements, defining for instance the spectral method (SEM); or the test functions can be piecewise discontinuous, as for the discontinuous Galerkin finite element method (DG/DGFEM). The strong formulation is obtained after two consecutive integrations by parts:

$$\int_{\Omega_e} \Phi_e^T \left[ \frac{\partial q_e}{\partial t} + A_x \frac{\partial q_e}{\partial x} + y \frac{\partial q_e}{\partial y} + A_z \frac{\partial q_e}{\partial z} - S \right] d\Omega_e = \quad (4)$$

$$\oint_{\Gamma_e} \Phi_e^T [A_n q_e - f^*(q_e, q_e^{ext})] d\Gamma_e,$$

where $q_e$ corresponds to the approximated solution vector over each element. The numerical flux f*, the normal flux matrix $A_n = A_x n_x + A_y n_y + A_z n_z$, and the outward-pointing normal vector $n=(n_x, n_y, n_z)$ are defined along the element interface $\Gamma$e. All the terms are expressed in terms of the local solution $q_e$, except for the numerical flux used to evaluate the contour integral, which involves the solution vector of the neighbouring element $q_e^{ext}$ from the other side of the interface. In the case of the discontinuous Galerkin (DG) formulation DGFEM, the acoustic fields on each point of the interface $\Gamma_e$, are multiply defined since the test functions are discontinuous across the element boundaries. The continuity of the acoustic fields and the communication between elements is solely ensured by the numerical flux. This data locality is a very interesting property of DG/DGFEM regarding parallel computing, as only the acoustics variables $q_e^{ext}$ on the element boundaries $\Gamma_e$ need to be exchanged between neighbouring elements.

For implementing data exchange between elements, an upwind numerical flux can be used. The upwind numerical flux can have optimal dispersion properties and can be construed by considering the propagation direction of the characteristic waves at the element interface. Due to the hyperbolicity of the propagation equations (3), an eigendecomposition of the normal flux matric can be performed as $\Lambda_n = W\Lambda W^{-1}$, with $$\Lambda = \begin{bmatrix} 0 & 0 & 0 & 0 \\ 0 & 0 & 0 & 0 \\ 0 & 0 & +c & 0 \\ 0 & 0 & 0 & -c \end{bmatrix}.$$

This eigendecomposition allows a definition of the characteristic waves $\tilde{q}=W^{-1}q$ (see, e.g. [2]). The phase speed and propagation direction of the characteristic waves along the normal n are given by the amplitude and the sign of the corresponding diagonal entries of $\Lambda$: the propagation equations therefore support two types of acoustic waves travelling in opposite directions at the speed c, respectively leaving and entering the mesh element.

The upwind flux can be construed on physical grounds, since the waves leaving the elements should only depend on the solution $q_e$, while the waves entering the elements should only depend on the external solution $q_e^{ext}$. Mathematically, this amounts to defining the numerical flux along the interface as $$f^*(q_e, q_e^{ext}) = W[\Lambda^+ W^{-1} q_e = \Lambda^- W^{-1} q_e^{ext}], \quad (5)$$

where $\Lambda^+$ and $\Lambda^-$ contains the positive and negative eigenvalues, respectively. Equation (5) can be conveniently rewritten, using the relation $\Lambda^\pm = (\Lambda \pm |\Lambda|)/2$, as $$f^*(q_e, q_e^{ext}) = \frac{1}{2} [A_n q_e + A_n q_e^{ext} + W|\Lambda|W^{-1}(q_e - q_e^{ext})], \quad (6)$$

where $|\Lambda|$ is a diagonal matrix containing the absolute value of the entries of $\Lambda$. After some algebraic manipulations, the exact upwind flux associated with the propagation equations (3), for each acoustic variable, reads $$f_p^* = c([[p]] + \rho_0 c <v> \cdot n), \quad (7)$$

$$f_{v_x}^* = n_x c \left( \frac{\langle p \rangle}{\rho_0 c} + [[v]] \cdot n \right),$$

$$f_{v_y}^* = n_y c \left( \frac{\langle p \rangle}{\rho_0 c} + [[v]] \cdot n \right),$$

$$f_{v_z}^* = n_z c \left( \frac{\langle p \rangle}{\rho_0 c} + [[v]] \cdot n \right).$$

The following operators were defined to simplify the expressions:

$$<q_e> = \frac{q_e + q_e^{ext}}{2} \text{ and } [[q_e]] = \frac{q_e - q_e^{ext}}{2} \quad (8)$$

which correspond to the mean value and to the difference between the solution on both sides of the interface, respectively.

As presented in details in [8], an approximate solution to the strong formulation [Eq. (4)] can be obtained numerically by considering the nodal expansion of the solution $q_e$, as $$q_e(r, t) \approx \sum_{n=1}^{N_p} \psi_n(r) q_e(r_n, t), \quad (9)$$

with $N_p$ interpolating Lagrange polynomials $\Psi_e = \{\psi_1, \psi_2, \ldots, \psi_{N_p}\}$. By taking the test functions $\Phi_e$ in the variational formulation equal to the basis functions $\Psi_e$, s semi-discrete formulation can be obtained in terms of the nodal values of the solution vector $q_e = (r_n, t)$ defined at the Legendre-Gauss-Lobatto interpolation nodes $r_n$. For linear (i.e. non-curved) mesh elements, the spatial integration is performed with an efficient quadrature-free approach [9].

The maximum order of the interpolating polynomials N is typically chosen as four, although a lower or a higher value can be used depending on the smallest investigated wavelength, the spatial domain and/or the mesh element size. For N=4, one should typically ensure that at least two element-per-wavelength are used for an accurate numerical solution.

Inserting Eq. (9) into Eq. (4) leads to the following semi-discrete system:

$$\mathcal{M}^k \frac{du_h^k}{dt} = -\frac{1}{\rho} S_x^k p_h^k + \frac{1}{\rho} \varepsilon^k n_x (p_h^k - p^*), \quad (10)$$

$$\mathcal{M}^k \frac{dv_h^k}{dt} = -\frac{1}{\rho} S_y^k p_h^k + \frac{1}{\rho} \varepsilon^k n_y (p_h^k - p^*),$$

$$\mathcal{M}^k \frac{dw_h^k}{dt} = -\frac{1}{\rho} S_z^k p_h^k + \frac{1}{\rho} \varepsilon^k n_z (p_h^k - p^*),$$

$$\mathcal{M}^k \frac{dp_h^k}{dt} = -\rho c^2 (S_x^k u_h^k + S_y^k v_h^k + S_z^k w_h^k) + \rho c^2 \varepsilon^k n \cdot (v_h^k - v^*),$$

where the following matrix operators are defined:

$$\mathcal{M}_{mn}^k = \int_{D^k} \ell_m^k(x) \ell_n^k(x) dx \in \mathbb{R}^{N_p \times N_p}, \quad (11)$$

$$(S_j^k)_{mn} = \int_{D^k} \ell_m^k(x) \frac{\partial \ell_n^k(x)}{\partial x_j} dx \in \mathbb{R}^{N_p \times N_p},$$

where j is the jth Cartesian coordinate, $\mathcal{M}$ is the so-called mass matrix, and $\mathcal{S}$ is the so-called stiffness matrix. Furthermore, $\mathcal{E}^k \in \mathcal{R}^{N_p \times 4 N_{fp}}$, where $N_{fp}$ is the number of nodes on a single element face, is a matrix operator for carrying out the surface integration. For this purpose, a surface mass matrix for each element face is defined as $$\mathcal{M}_{mn}^{kf} = \int_{\partial D^{kf}} \ell_m^k(x) \ell_n^k(x) dx, \quad (12)$$

where f is the face index, ranging from 1 to 4, for tetrahedral elements. Then, the first $N_{fp}$ columns of $\mathcal{E}^k$ consist of $\mathcal{M}^{k1}$ in the rows corresponding to the face points for face 1, the next $N_{fp}$ columns consist of $\mathcal{M}^{k2}$ and so on. For the sake of brevity, the details of how to compute the element matrices are omitted here. Further details can be found in [15].

Thus, in general terms, the derivation of an SEM/DG/DGFEM scheme is in one embodiment as described above comprised of four steps, the governing equations Eq. (3) which can be formulated in a variational formulation according to Eq. (4). By using the numerical flux as set out in Eq. (5), continuity across the virtual domain which has been discretized into sub-domains is ensured. Then, finally, the problem can be formulated as a numerical semi-discrete system, as per Eq. (10). This effectively means that the spatial derivatives found in the governing equations have been converted into simpler algebraic equations that can be solved on a computer. All that remains is to address the left hand side temporal derivates in Eq. (10), which is handled by a time marching algorithm as discussed herein.

In one aspect the present disclosure relates to a computer-implemented method for acoustic simulation in a virtual domain. The computer-implemented method comprises the steps of obtaining input data comprising at least one model of the virtual domain, at least one sound source in the virtual domain, and at least one acoustic property of the virtual domain; obtaining a wave based solver for determining the wave based propagation of sound in the virtual domain based on the at least one sound source and the at least one acoustic property within a first acoustic frequency range; obtaining a geometrical acoustics based solver for determining the ray based propagation of sound in the virtual domain based on the at least one sound source and the at least one acoustic property within a second acoustic frequency range and outputting the wave based propagation and the geometrical acoustics based propagation.

In one embodiment there may be provided a computer implemented method for generating an impulse response for a listening point in a room, wherein the method comprises the steps of:

(a) receiving a 3D model of the room, the position of at least one sound source in the 3D model of the room, and acoustic properties of at least one boundary in the 3D model of the room;

(b) using a wave based solver for determining a wave based impulse response of a wave based propagation of an impulse emitted at the at least one sound source in the 3D model of the room and received at the listening point within a first acoustic frequency range;

(c) using a geometrical acoustics based solver for determining a geometrical impulse response of the ray based propagation of an impulse emitted at the at least one sound source in the 3D model of the room and received at the listening point within a second acoustic frequency range; and (d) generating the impulse response by merging the wave impulse response and the geometrical impulse response.

For example, as discussed herein, where the sound source emits an impulse, an impulse response is simulated or generated. Accordingly, the propagation of sound describes the impulse response as it propagates in the room.

As will be further discussed herein, the output can be in many different forms and embodiments, it can for example be a visual rendering, it may be as data for use in further processing, for example for training a neural network. It may also be used for providing an audio rendering of a listening experience in a virtual environment.

In another aspect, there is disclosed a wave-based solver for simulating the propagation of sound in at least one model of a virtual domain based on at least one sound source in the virtual domain and at least one acoustic property of the virtual domain. The at least one acoustic property and the at least one sound source in the virtual domain may also be similar to the ones that will be further described. The wave-based solver may comprise finite element methods (FEM), such as a discontinuous Galerkin finite element method (DGFEM) or a spectral element method (SEM).

In another aspect, there is disclosed a wave based method for simulating the propagation of sound, which comprises one or more of the steps of performing the features and modules as discussed with respect to the wave based solver herein. The wave based method may for example be computer implemented.

In a further aspect, there is disclosed a geometrical acoustics solver for simulating the propagation of sound in at least one model of a virtual domain, based on at least one sound source in the virtual domain and at least one acoustic property of the virtual domain, wherein the geometrical acoustics solver comprises,
 a) at least one image source module for determining at least one image source simulation by simulating the propagation of sound;
 b) at least a first acoustic ray tracing module for determining an at least first ray tracing simulation by simulating the propagation of sound;
 c) a hybridization module for combining the at least first ray tracing simulation and the at least one image source simulation to a geometrical acoustics simulation of the propagation of sound; and
 d) an output module for preparing the output of the geometrical acoustics simulation.

In another aspect, there is disclosed a geometrical acoustic method for simulating the propagation of sound, which comprises one or more of the steps of performing the features and modules as discussed with respect to the geometrical acoustic solver herein. The geometrical acoustic method may for example be computer implemented.

The wave based simulation and the geometrical acoustic based simulation may be improved and hybridized as discussed herein. Even further, applications of the simulations such as the rendering and use of the acoustic simulation may benefit from different types of improvements. The acoustic simulation as disclosed herein may even enable different types of applications that was not possible previously.

Acoustic simulations, propagation of sound simulations or sound propagation simulations may generally be understood as simulations of acoustic waves. Acoustic waves are a type of energy propagation through a medium by means of adiabatic loading or unloading. Acoustic waves may comprise audible sound(s), seismic waves or ultrasound(s). The applications of the methods and systems described herein preferably fall in the scope of acoustic waves, more preferably in the scope of audible sound(s). Acoustic waves can also be defined herein as acoustic signal(s).

In another aspect, a system for generating an impulse response for a listening point in a room is disclosed, the system comprising:
 a computer system having a processor coupled to a memory, the processor configured to:
  receive a 3D model of the room, the position of at least one sound source in the 3D model of the room, and acoustic properties of at least one boundary in the 3D model of the room;
  determine, using a wave-based solver, a wave-based impulse response of a wave-based propagation of an impulse emitted at the at least one sound source in the 3D model of the room and received at the listening point within a first acoustic frequency range;
  determine, using a geometrical acoustics-based solver, a geometrical impulse response of a ray-based propagation of an impulse emitted at the at least one sound source in the 3D model of the room and received at the listening point within a second acoustic frequency range; and
  generate the impulse response by merging the wave impulse response and the geometrical impulse response.

The system as disclosed above may be configured to execute the computer implemented method for generating an impulse response for a listening point in a room as disclosed herein.

In one application aspect disclosed herein, the acoustic simulation can be used in a method of training machine-learning driven audio algorithms. Such a method may comprise the steps of:
 obtaining input data comprising at least one model of a virtual domain, at least one sound source located in the at least one model of a virtual domain and at least one acoustic property of the at least one model of a virtual domain;
 performing at least one sound propagation simulation in a virtual domain from the at least one sound source to at least one sound receiver located in the at least one model of a virtual domain;
 obtaining at least one sound propagation simulation output from the at least one sound propagation simulation; and
 training a machine-learning model for machine-learning driven audio devices with the at least one sound propagation simulation output.

The steps of the disclosed method may be performed in any order that would benefit the method. The at least one sound propagation simulation output may vary depending on the sound propagation simulation used. It can take any forms that is suitable for a training of a machine-learning model for machine-learning driven audio algorithms or for a further processing by at least one secondary system, before it may be used to train a machine-learning model for preferably machine-learning driven audio devices. Machine-learning driven audio algorithms as described herein can be used for different applications such as blind room acoustic modeling, dereverberation, echo-cancellation, speech recognition, beamforming or virtual sound rendering.

For example, in one additional aspect, there may be provided a method for providing a machine learning model for audio compensation in an audio device, wherein the audio device comprises at least one microphone, wherein the method comprises receiving an audio signal at the at least one microphone and generating a compensated audio signal by using the machine learning model for audio compensation The method may for example be trained by a computer implemented method, wherein the method comprises the steps of receiving 3D models of a plurality of rooms, each of the 3D models comprising at least one sound source and at least one acoustic property, receiving a plurality of impulse responses at a listening position in each of the plurality of rooms, training the machine learning model for audio compensation using at least the plurality of impulse responses as input for training the machine learning model. Training the machine learning model for audio compensation may comprise using at least the plurality of impulse responses as input.

In other words, the acoustic simulation as described herein can be used to generate synthetic data, such as generated impulse responses, which can be used for training machine-learning driven audio algorithms in a fast and accurate way, especially when compared to current methods where data is generated with real-life conditions, which makes it complex to generate a relatively large amount of data in a relatively short amount of time. For example with respect to audio compensation as described herein using synthetic data reduces the costs and time-consuming task of doing physical measurement and recordings.

In one aspect an audio device comprising at least one microphone can be provided, wherein the audio device comprises a processing system for applying a machine learning based audio compensation as discussed herein. The audio device is configured to receive an audio signal at the at least one microphone and applies the machine learning based audio compensation to the audio signal to generate a compensated audio signal.

The audio device can for example be a an audio device for web based conference meetings. Thus, as the audio of a speaker is received at a first audio device and transferred to a remote audio device the sound processed using audio compensation in order to ensure that the audio is played back eligible and clearly through the remote audio device.

In one aspect, a system for training a machine learning model for audio compensation is described, the system comprising:
 a computer system having a processor coupled to a memory, the processor configured to:
  receive 3D models of a plurality of rooms, each of the 3D models including at least one sound source and at least one acoustic property;
  receive a plurality of impulse responses at a listening position in each of the plurality of rooms; and
  training the machine learning model for audio compensation using at least the plurality of impulse responses as input.

The system as disclosed above may be configured to execute the computer implemented method for training a machine learning model for audio compensation as disclosed herein.

In another aspect, a method of determining a head-related transfer function is disclosed. The method may comprise the steps of:
 obtaining a geometry of a user's head;
 performing a simulation of sound propagation from at least one audio source to the geometry of the user's head, typically to the geometry proximate to the user's ear, in the ear or the user's eardrums, wherein the simulation of sound propagation is based on a sound propagation simulation using a wave-based solver; and
 determining a head-related transfer function (HRTF) for the user's head based on the simulation of sound propagation.

In a further aspect thereof, there may be provided a computer implemented method of determining a head-related transfer function comprising:
 (a) receiving a 3D model of a user's head and the position of at least one sound source representing the ear drum or an approximation thereon in the 3D model;
 (b) using a wave based solver for determining a plurality of wave based impulse responses from an impulse emitted at the at least one sound source, wherein the plurality of wave based impulse responses is determined at a plurality of digital representation of head receivers; and
 (c) determining a head-related transfer function (HRTF) for the user's head based on the plurality of wave based impulse responses being determined at the plurality of digital representation of head receivers.

The geometry of a user's head may be obtained by a plurality of methods. The geometry may be obtained by 3D scanning the geometry of the user's head, or at least part or all of the outer ear(s). One method may consist on capturing a plurality of image of the user's head, and use the plurality of images to build the user's head geometry. Another method may consist of using a depth camera, such that the depth camera can capture images of the user including the user's head. The depth information would be captured with the plurality of images and thus, making it possible for a system such as a computer, a computer implemented method or any computer-based systems to build a geometry of the user's head. The geometry can also be obtained from an auxiliary interface, where the geometry of the user's head may be ready to be used by the method.

The head-related function is also known as anatomical transfer function (ATF), which is a response that characterizes how an ear receives a sound from a point in space. As sound strikes the listener, the size and shape of a head, ears, ear canal, density of the head, size and shape of nasal and oral cavities can transform the sound and affect how it is perceived. Some frequencies of the sound spectrum may be boosted while some other can be attenuated. The HRTF may vary significantly from person to person.

An HRTF may for example be used in order to personalize an audio experience for a user. As the HRTF characterizes how a user typically receives sound it will provide a highly realistic experience for a user in cases where the personalized HRTF is applied to e.g. headsets, in car audio, home cinema, gaming, virtual reality etc.

For example by combining the orientation of the person together with the person HRTF the acoustic experience will become highly realistic as specific filters will be applied in order to describe sound coming from the front and other filters for sound coming from the side or the back. Even further, different filter may be required for different frequencies and sound levels.

Accordingly, in one embodiment a device for providing auralization, such as a headphone set for providing binaural auralization, may be configured to apply a HRTF as disclosed herein to an audio signal played to the user.

Using simulation of sound propagation to determine the HRTF for a user's head provides a reliable, fast and efficient method.

In a further aspect a system is also provided herein for implementing the methods discussed.

Thus, in one embodiment a system is disclosed for simulating the propagation of sound in at least one model of a virtual domain using a wave based solver, a geometrical acoustic solver or a combination thereof as described herein.

The system comprises a storage medium for storing data and a computer program describing the method for simulating the propagation of sound as described herein, a processor for executing the method for simulating the propagation of sound as described herein, at least one input device for inputting data to the system and an output device for outputting data from the system.

For example in one embodiment the storage medium and/or the processor is cloud based where data is entered into the system from a personal computer via a keyboard and a monitor, e.g. by loading a CAD model of the virtual space into the system by sending to the cloud service via the internet.

The output can also be provided through the personal computer via the cloud service, e.g. by presenting the output on the monitor, rendering it on the monitor or playing an audio output through the computer speakers, external speakers, a set of VR (Virtual Reality) glasses and/or audio headsets.

DETAILED DESCRIPTION

The term 'using' as employed throughout this patent application comprises the acts of 'executing' or 'applying'.

In the context of the present patent application, 'using' refers to the performance of a specified action or operation, which may include an execution or application of a particular process.

The virtual domain is a one dimensional (1D) domain, a two dimensional (2D) domain or a three dimensional (3D) domain such as a three dimensional model (3D) of a virtual space.

One dimensional (1D) domain can for example be used to simplify simulations when performing simulation analysis of absorption properties of materials. In that case, wave propagation can be reduced to one dimension, which reduces down the wave propagation to a plane wave propagation instead of a spherical wave propagation. This potentially makes the simulation of acoustic waves much faster.

Two dimensional (2D) domain can have applications where acoustic waves are simulated in an outdoor environment. 2D domain may also be used when a 3D domain can be cut into slices. Solving 2D domains with a simulation of the propagation of sound may be less complex than solving the three dimensional (3D) domain. Simulating the propagation of sound in a plane in a fixed height in a 3D domain can also sometimes be useful, for example in a car cabin, where the propagation of sound can be relevant to analyse in specific planes. Simulating in 1D domain or 2D domain decreases the complexity of the simulation of the propagation of sound by cutting off one or two dimensions from the equations described herein, such as [Eq. (1)] and/or [Eq. (2)].

Three dimensional domain (3D) of a virtual space can be implemented as a 3D model of a virtual space. The virtual space can be an enclosed air volume but can also be a semi-opened air volume or an open space without boundaries.

The 3D model of the virtual space can be implemented or obtained thanks to any existing modelling computer-implemented method(s), such as 3D model builders. The 3D model can be closed. The 3D model can also emulate a semi-opened space by setting a boundary far away from the others, where the amplitude of the acoustic signal may be so low that the effect caused by the boundary on the acoustic signal becomes almost negligible. A boundary can also be defined with a very high absorption coefficient such that it basically simulates that the sound escapes into the open environment. The acoustic property of the 3D model can be acoustic properties of materials which may be a part of the 3D model. For example, materials can have an acoustic property such as a surface impedance, which may characterize how a material may react when an acoustic signal or wave hits its surface. The at least one sound source may be placed or arranged in the 3D model. The at least one sound source can consist of a specific location wherein an acoustic signal may be sent within the 3D model. The at least one sound source can be directed with a specific orientation and may possess specific frequency dependent directivity characteristics, where it radiates sound with different intensity to different directions. The specific orientation angle can be defined by the specific orientation of the at least one sound source. The at least one sound source may also be arranged outside of the 3D model.

The wave-based solver can be any type of wave-based solver useful for acoustic simulations. The finite element methods may be the most commonly used methods that can be useful for acoustic simulations. Geometrical acoustics is a branch of acoustics that studies propagation of sound on the basis of the concept of rays considered as lines along which the acoustic energy is transported.

The output that comes from the step of outputting the wave-based propagation and the geometrical acoustics based propagation can have any type of format. The type of format can be a text file containing the different information regarding the propagation of the acoustic signal in the 3D model, but it can also be a graphical interface illustrating the propagation and/or the reflection of the acoustic signal in the 3D model. More preferably, the format of the output may match the need of the system or the user using any of the computer-implemented methods presently disclosed.

In one embodiment the first and second acoustic frequency ranges are different, for example two neighbouring frequency ranges. This allow for optimal simulation when using a combination of wave based simulation and geometrical acoustic simulation when considering speed of simulation vs accuracy. For example if a high speed simulation is desired, the second acoustic frequency range may be larger, whereas if higher accuracy is desired the first acoustic frequency range is larger.

The frequency range of interest may be the audible frequency range, which is generally between 20 Hz and 20 KHz. Within the audible frequency range low frequencies are typically considered as falling into the range 20 Hz-200 Hz, where mid frequencies are typically considered falling into the range 200 Hz-2000 Hz and high frequency are typically considered falling into the range 2000 Hz-20 KHz. Thus, the first acoustic frequency range may for example be the low and mid acoustic frequency range, e.g. 20 Hz-2000 Hz, and the second acoustic range may be the neighbouring high acoustic frequency range, e.g. 2000 Hz-20 KHz.

The first and second acoustic frequency ranges can be defined according to the geometry of the 3D model. Depending on the acoustic signal spectrum, a wave-based solver can be more accurate than a geometrical acoustic-based solver. Generally, a wave-based solver can be appropriate when simulating in the low-mid frequency range of the acoustic signal, while a geometrical based-acoustic simulation may be sufficient when simulating in the high frequency range of the acoustic signal. The wavelength may generally be what defines the frequency range of interest depending on the geometry of the 3D model. A frequency of 20 Hz has a wavelength of around 17.2 m while a frequency of 20 KHz has a wavelength of around 17.2 mm, if the propagation of the wave occurs in air. It may be noticeable that there is a factor of around 1000 between the high frequency wavelengths and the low frequency wavelengths. This may lead to some physical behaviours that a geometrical acoustic-based solver may not be able to compute/simulate with a high accuracy/precision, such as interference, scattering or potential diffraction of acoustic waves, especially in the low-mid frequency range. By combining both approaches, i.e. wave-based solvers and geometrical acoustic-based solver, a better accuracy of the simulation can be achieved.

In one embodiment the first and second acoustic frequency ranges may partly overlap, which may be desired to obtain a smooth transition when merging the two simulation outputs. The first and second acoustic frequency overlap may also depend on the convergence of the simulation.

The first and second acoustic frequency ranges may in some embodiments completely overlap. This may for example be desired where a fast initial simulation provided by the geometrical acoustic solver is desired for evaluation and subsequent a slower more accurate simulation may be provided by the wave based solver.

The lowest frequency of the second frequency range or the highest frequency of the first frequency range may need to be manually selected by a user. This selection provides to the computer-implemented method the frequency ranges where the wave-based solver and the geometrical acoustic-based solver need to be used. This selection may be executed depending on the size of the 3D model. For instance, a relatively small 3D model would benefit from having a low frequency range being relatively broad in order to execute the wave-based solver on a relatively large frequency range.

The lowest frequency of the second frequency range or the highest frequency of the first frequency range may also be selected automatically by a computer implemented method. The method may assess the frequency range in which strong acoustic wave phenomena, like diffraction and interference, will occur and can set the highest frequency range of the wave based solver to cover this frequency range. This may for example be based on estimating the Schroeder frequency of the 3D domain in question, or potentially using more advanced techniques that estimate diffraction based on surface areas that make up the 3D domain and its interior furnishing.

In one embodiment the wave based propagation and the geometrical acoustics based propagation are merged together.

For example, as will be described, the output of the wave based acoustic simulation and the output of the geometrical based acoustic simulation may be in the format of a wave based impulse response and a geometrical acoustic based impulse response, respectively.

Merging and hybridizing the wave based impulse response and the geometrical impulse response requires careful consideration in order to avoid non-physical artefacts to be introduced into the combined broadband solution forming the simulated impulse response of the simulated virtual space.

The simulated wave based propagation and the simulated geometrical acoustic based propagation can be simulated in a first frequency range and a second frequency range, respectively. The first frequency range and the second frequency range can partly overlap or completely overlap. A transition frequency is defined as being the frequency where the first frequency range and the second frequency range overlaps. The transition frequency may be defined as the centre frequency of the overlapping between the first frequency range and the second frequency range.

The transition frequency may preferably be used by the wave-based solver to set a frequency content of the at least one sound source in the 3D model. The frequency content of the at least one sound source in the 3D model may comprise sufficient acoustic energy up to the transition frequency in order to have a sufficient signal-to-noise ratio. If the signal-to-noise ratio is too low, the wave-based impulse response may prove inaccurate or yield inaccurate results at some frequencies comprised in the first frequency range, preferably up to the transition frequency.

The transition frequency may be a default transition frequency. The default transition frequency may be proportional to the square root of the volume of the 3D model. The default transition frequency may be based on a simplified calculation of the Schroeder frequency assuming a reverberation time of 1 second and multiplying it by a factor. The reverberation time may be assumed to be 1 second. The factor can be comprised between 0.5 and 2, preferably 0.1 and 5, more preferably 0.1 and 10. The factor may be chosen depending on the volume of the 3D model of the room. The reverberation time can be chosen as a compromise between simulation time and accuracy of the simulation. A low reverberation time may yield inaccurate results, thereby generating an inaccurate generated impulse response, while a high reverberation time may drastically increase simulation time without increasing accuracy of the generated impulse response.

The first frequency range and the second frequency range can also be named the first acoustic frequency range and the second acoustic frequency range, respectively.

Thus, the step of merging the wave based impulse response and the geometrical based impulse response may further comprise the step of calibrating the sound power of the at least one sound source in the 3D model so that they match in both the wave based solver and in the geometrical acoustic solver.

The calibration can for example be done by estimating the sound pressure level radiated from each sound source at 1 meter in free field conditions. For example, in a frequency range near the transition frequency between the first acoustic frequency range and the second acoustic frequency range. The pressure level may be estimated at other distances as well, such as 0.5 meters, 2 meters and or 3 meters. The distance may be between 0.5 meters and the extend of the virtual space or the 3D model of the room in which the simulation is done.

The merging step may even further comprise that the boundary conditions are coherent for the wave based solver and the geometrical acoustic solver. If the boundary inputs are not aligned there is a risk that artefacts, such as a phase mismatch, and/or undesirable results may occur in the transition frequency region.

Preferably, the sound pressure level radiated from each sound source at 1 meter may be 94 dB sound pressure level (SPL). The step of calibrating the sound power of the at least one sound source in the 3D model so that each sound source match in both the wave-based solver and in the geometrical acoustic solver can be independently performed in a source correction step or calibration step comprised in the wave-based solver and/or in the geometrical acoustic solver. More preferably, the calibration step can be independently performed in the image source simulation and/or the ray tracing simulation.

A ray based propagation as described herein can for example be described by ray tracing methods and/or image source methods.

Advantageously, the wave-based impulse response can be digitally filtered with a low-pass filter with a cutoff frequency substantially located at the transition frequency, thereby creating a filtered wave-based impulse response. This may be performed before performing the step of calibrating the sound power. Preferably, the low-pass filter is a fourth order Butterworth low-pass filter. The Butterworth filter is a type of signal processing filter designed to have a frequency response that is as flat as possible in the passband. The flatness of the frequency response in the passband may be appreciated in the context of signal processing, thus minimizing distortion and/or preserving impulse response shape. Preferably, for acoustic simulation as discussed herein, the flat passband response of a Butterworth filter can be desirable because it may help avoid coloration of the sound. Any uneven attenuation within the passband can alter the timber or tone of the audio signal, potentially leading to a less faithful reproduction of a sound. The order of the filter may be a compromise between having a sharp cut-off frequency while avoiding ripples in the time domain. The inventors found out that a fourth order may be a sufficient order to achieve desirable filtering.

Both the wave-based solver and the geometrical acoustic solver output both monoaural and spatial ambisonics impulse responses for each of the listening points of the 3D model, along with acoustic parameters derived from the impulse responses mentioned.

The merging step may digitally filter the geometrical acoustic impulse response with a high-pass filter with a cutoff frequency substantially located at the transition frequency, thereby creating a filtered geometrical acoustic impulse response. This may be performed after or before performing the step of calibrating the sound power. Preferably, the step of calibrating the sound power may be performed before digitally filtering the geometrical acoustic impulse response with a high-pass filter with a cutoff frequency substantially located at the transition frequency. Preferably, the high-pass filter is a fourth order Butterworth high-pass filter.

The merging step can sum both the filtered wave-based impulse response and the filtered geometrical acoustic impulse response, thereby creating a hybridized impulse response, wherein the hybridized impulse response combined the filtered wave-based impulse response and the filtered geometrical acoustic impulse response. The hybridized impulse response may be the impulse response as described herein, wherein the impulse response can combine the wave impulse response and the geometrical impulse response.

The merging step may be independently performed for all the channels comprised in the spatial ambisonics impulse responses.

Typically, the boundary conditions for the wave based solver rely on complex surface impedance and the geometrical acoustic solver relies on energy based absorption coefficients. As these are not one-to-one comparable, one or both need to be converted to be coherent. In one embodiment the geometrical acoustic solver relies on impedance for the boundary conditions, thereby taking both energy reduction and phase shift into account at the boundaries. As an example, this can be implemented by keeping track of phase shifts introduced at boundaries for every reflection of a ray or every image source generated, and accumulating the total phase shift incurred when an acoustic wave travels between a source and a receiver. Additionally, it could imply that the phase of the wave should be tracked for the extent of each ray.

Even further the merging or hybridization step comprises that the time arrival, i.e. phase, of the sound propagated in the virtual space arrives at the receiver location at the same time. In one embodiment this is provided by using a pressure based image source method in the geometrical acoustic based solver that models the phase shift at the boundary conditions discussed above.

In one embodiment, the computer implemented method may further comprise an autostop, wherein the autostop can periodically compute energy decay of the sound energy in the 3D model of the room. By periodically computing energy decay of the sound energy while the simulation is running, the computer implemented method can stop the simulation when a sufficient amount of energy decay is obtained. For example, the simulation can be stopped once the ratio between the sound level of the source and the simulated sound energy reaches a predetermined threshold, for example between −20 dB to −80 dB, such as −20 dB, −40 dB, −60 dB or −80 dB. The periodically computation may occur at each listening points or receivers arranged in the 3D model of the room, wherein the simulation of acoustic wave or sound occurs. The autostop may stop the simulation once all receivers or listening points gets an energy decay of a predefined energy decay value, such as −60 dB. By comprising the autostop, the simulation can stop once a desired energy decay is wished by the user, thereby avoiding the simulation to run for a longer time than needed by the user.

The wave-based solver may also comprise a DG module for determining a DG simulation by preferably simulating the propagation of sound, and an output module for preparing the output of the DG simulation. The DG module may further comprise additional modules that can potentially provide additional features and/or settings to the wave-based solver.

A module such as the DG module may be considered as being a module of a software. It may also be considered as being a part or a section of the software providing the functions of the solver. Software modules are commonly considered as packages or separate portions with isolated functionality. This is used to make the software easier to use for a specific use case or to define where boundaries exist in a program. Module(s) as described herein should not be limited as interpreted as modules of a software but may be related to steps, functions or parts of the solver that may not be independent from each other, but rather interconnected, as shown in FIG. 1.

The 3D model of the virtual space may define a plurality of boundary surfaces of an air volume. The air volume can be semi-enclosed or partially closed, but it can also be completely closed or enclosed, such as a room without any openings. A semi-enclosed air volume would be for example a room comprising opened windows, or opened, semi-opened doors. The air volume may be an outdoor area, where boundaries can be defined by trees, natural or artificial reliefs or objects. The 3D model of the virtual space can be implemented/obtained via any existing modelling computer-implemented method(s), such as 3D computer graphics and/or computer-aided design application softwares. Some 3D computer-aided design application softwares such as Rhinoceros 3D, Revit or SolidWorks may be optimum to design the 3D model of the virtual space. The boundary surfaces of the 3D model can be of any type, such as flat or curved. It may be a combination of both flat and curved boundary surfaces. The boundary surfaces may define the edges of the 3D model. The 3D model may be an enclosed air volume. An opened model may be defined by setting boundary surfaces at a distance such as the amplitude of the acoustic signal becomes negligible when it reaches the boundary surface. The distance can be emulated by creating absorbent boundary surfaces, which may preferably absorb a large quantity of the acoustic wave energy, more preferably the entirety of the acoustic wave energy. In this context, the acoustic wave would not be reflected back into the 3D model and would then be considered by the simulation as being outside of the simulated environment, i.e. the 3D model.

The boundary surfaces may be defined by 2D meshes. The 2D meshes can be defined as 2D surface meshes. The 2D meshes describe the geometry of the boundary surfaces. The boundary surfaces defines the boundaries of the 3D model of a virtual domain. The 3D model of a virtual domain can be represented by a 3D volumetric mesh model. A mesh is a subdivision of a continuous geometric space into discrete geometric and topological cells. Mesh cells are generally used as discrete local approximations of a larger domain. The preferred procedure can involve a division of the boundary surfaces into a mesh of cells or a grid of points, such as the creation of the mesh can capture the 3D model geometry, with a relatively high quality cells, and without so many cells as to potentially make subsequent calculations of acoustic simulation intractable and/or inefficient. The 3D mesh model may be generated differently depending on the complexity of the boundary surfaces, and the accuracy needed by the application and/or user.

The 3D mesh model may contain curvilinear mesh elements, which can reduce the geometric distortion introduced when meshing a curved boundary into discrete mesh elements. A mesh generation may be performed in order to get the 3D volumetric mesh model. The mesh generation is the practice of creating a mesh, a subdivision of a continuous geometric space into discrete geometric and topological cells. A mesh generation may generally be performed with straight-sided (affine) mesh elements. When using straight-sided mesh elements, a curved domain boundary of the 3D model geometry may not be well represented unless an extremely fine mesh is used. An extremely fine mesh can lead to an undesirably high computational cost, and in some cases, an inability of making a simulation to converge while using the fine mesh. By utilizing curvilinear mesh elements, it may become possible to use large mesh elements with high basis orders, while at the same time being able to capture important geometrical details.

In particular curvilinear mesh has shown to be efficient for simulating sound propagation using a wave based simulation. The curved sides and edges provides high fidelity results. Together with the possibility to use larger meshes wave based solver applying finite element methods (FEM), such as a discontinuous Galerkin finite element method (DGFEM), a high-order discontinuous Galerkin finite element method or a spectral element method (SEM) as disclosed herein becomes particularly effective. Especially, it has been shown that DGFEM and SEM are specific finite element methods which are especially effective at handling curvilinear mesh elements.

A curvilinear mesh may be defined by curvilinear coordinates, as opposed to straight-sided mesh, which are defined using affine coordinates. Curvilinear coordinates are a coordinate system for Euclidean space in which the coordinate lines may be curved. These coordinates may be derived from a set of Cartesian coordinates by using a transformation that is locally invertible at each point. Well-known examples of curvilinear coordinate systems in three-dimensional Euclidean space are cylindrical and spherical coordinates.

In one embodiment, the air volume is represented as a volumetric 3D mesh model. Providing the volumetric 3D mesh can for example be done by discretising the air volume into a mesh of cells or grid of points. The air volume may be defined by the 3D model of the virtual space previously defined. The air volume can be any fluid or environment that can potentially propagate acoustic waves.

A qualitative evaluation is performed on the volumetric 3D mesh model evaluating critical areas of sound propagation. A qualitative evaluation may for example be performed by evaluating the uniformity of the volumetric 3D mesh model. Having uniform volumetric 3D meshes facilitates consistent and efficient processing when for example processing the wave based simulation on parallel GPUs or other types of processing unit. The time step is here the same for each element; a direct consequence of the fact that the smallest element in the mesh will constrain the time step globally.

Ideally, all the elements should therefore have similar characteristic lengths (within, e.g., a 10% margin) to avoid unnecessarily increasing the computational time of the simulations.

The volumetric meshes may for example be tetrahedral, which has shown to be an efficient geometric shape for capturing the desired geometric features of the 3D model, as well as the boundaries surfaces. By comparing each tetrahedral mesh element to a standard tetrahedral mesh element, a uniformity score can be established for each volumetric tetrahedral mesh and/or for the entire volumetric 3D mesh model.

The uniformity score can for example be used to indicate how fast the simulation will take. If the uniformity is high the simulation will be as efficient as possible and the frequency range of the wave based solver simulation, e.g. the first acoustic frequency range, can for example be expanded. If uniformity is low the frequency range of the wave based solver simulation, e.g. the first acoustic frequency range, can for example be reduced. Alternatively, the volumetric 3D mesh model may be re-meshed or the entire 3D model of the virtual space may be redesigned to increase the uniformity.

Once the virtual space has been meshed or discretized in some way, the acoustic wave propagation problem can be solved using an acoustic wave equation module. Generally, wave-based methods may divide the virtual space into sub-domains in order to solve algebraic equations on each subdomain instead of solving the whole virtual space at once. The discretization of the virtual space may depend on the wave-based method used to solve the equations. Wave-based methods such as the finite-difference time-domain (FDTD) method, the finite element method (FEM) or the boundary element method (BEM) can be used.

The volumetric 3D mesh model of the air volume may represent discretized sub-domains as described above. Thus, each volumetric 3D mesh, e.g. a tetrahedral provides a discretized sub-domain. The acoustic wave can then for example be represented in terms of polynomial basis functions on the sub-domain. The discretized sub-domain can represent reference elements on which the differential equations characterizing acoustic wave propagation may be discretized into algebraic equations.

Thus the 3D model, e.g. the virtual domain, may be subdivided into smaller domains. Subsequently, the continuous partial differential equations may be turned into discrete algebraic equations that can be solved on a processing unit. Thus, discretization can generally be considered as a two-step process, the first step is to discretize the virtual domain and the second step would be to solve the numerical equation for each element of the discretised virtual domain.

The discontinuous Galerkin finite element method is applied in each sub-domain to solve the partial differential equation simulating the sound propagation for each separate sub-domain. Using the DGFEM for this application enables the sound propagation for each sub-domain to be simulated individually without dependence of neighbouring sub-domains as advantage is taken of the discontinuous nature of the Galerkin method. This provides a method and solver that is well suited for parallel processing, e.g. on heterogeneous multi-device, many-core computing architectures, e.g. in the cloud, as the simulation can be run independently for each sub-domain and then combined when the simulation is complete. The discontinuous Galerkin method is also attractive due to its ability to work with unstructured meshes, meaning that it can easily handle complex geometries.

The discontinuous Galerkin method may have a benefit of being able to handle efficient parallelization and the ability of handling complex geometries in the 2D or 3D virtual domain. Other methods such as FDTD methods are efficient with parallel processing but cannot handle complex geometries. FEM, BEM, FVM can handle complex geometries but may not efficiently perform parallel computing.

The DG module may comprise a locally-reacting boundary model sub-module for simulating the propagation of sound at a boundary region comprising a first material. The locally-reacting model may refer to the locally-reacting behaviour of the boundary region. When a boundary is locally-reacting, this means that the reflective properties of any point on the boundary region is an entirely local phenomenon and can be completely characterized by a locally reacting surface impedance. The boundaries may be frequency-dependent, which means that the reflected wave has both phase and amplitude that differ from those of an incident wave, and such changes vary with frequency. A boundary impedance can be replaced by a frequency-dependent complex-valued impedance to illustrate this effect.

For example for locally reacting materials the material modelling may be considered starting with the numerical flux f* which depends on both the internal solution $q_e$ and the external solution $q_e^{ext}$. However, $q_e^{ext}$ is left undefined wherever the element interface lies on an acoustic boundary, and boundary conditions need to be considered. Similarly to the derivation of the upwind flux previously discussed [Eq. (7)], boundary conditions can be implemented based on the propagation direction of the characteristic waves. At any given time, the waves associated with a positive eigenvalue $\tilde{q}_a^+$ (leaving the mesh element) do not carry any information about the acoustic boundary, while the waves associated with a negative eigenvalue $\tilde{q}_a^-$ need to be specified.

At a given location, the wave $\tilde{q}_a^-$ reflected from an acoustic boundary can be computed as a function of the incident wave $\tilde{q}_a^+$, based on the impulse response function of the plane-wave reflection coefficient at normal incidence r(t) defining the boundary material. This requires the computation of a convolution integral for each boundary point of the form $$\tilde{q}_a^-(t) = \int_{-\infty}^{t} \tilde{q}_a^+(\tau) r(1-\tau) d\tau. \quad (9)$$

This general formulation is also known as a time-domain impedance boundary condition and allows for frequency-dependent material properties. The response of the material is here further approximated as a digital filter to allow the computation of the convoluted integral (9) with a higher order of accuracy [1, 3, 4]. This implies that the convolution integral above is reformulated as a set of ordinary differential equations, which are then solved numerically in time via the same time marching algorithm as the main wave equations, see also the discussion below on time marching. The boundary conditions can finally be enforced weakly by computing a "virtual" external solution $q_e^{ext} = W\tilde{q}$ to be used in the definition of the numerical flux [Eq. (6)], based on the modified characteristic waves $\tilde{q}$.

Characterizing the material properties in terms of the complex reflection coefficient, as used here, directly relates the characteristic waves and is thus a natural choice for flux-based solvers. It has also decisive advantages over more common impedance or admittance formulations relating the surface pressure and velocity for iterative time-domain solvers, such as (i) numerical stability can be easily ensured a priori, as discussed herein, and (ii) it allows modelling materials with a very large and/or a very low impedance. Boundary conditions based on the impedance or the admittance have indeed some inherent limitations in this context, since these quantities essentially characterize the material properties in isolation and do not account for the surrounding air. In mathematical terms, the pressure and velocity are not characteristically independent so the impedance or the admittance cannot be considered as general linear time-invariant systems describing the whole reflection process [5].

The locally-reaction assumption for characterising absorption properties of boundary surfaces may generally be considered acceptable for rigid or near-rigid surfaces, as well as porous materials with a high flow resistivity and mounted on a rigid backing. This type of material may define what is named as a first material as discussed herein.

The local boundary modelling approach described above amounts to modelling the acoustic properties of materials from their surface characteristics. This is generally a good physical approximation if the materials can be considered as locally-reacting, which assumes that the waves are inside the material in the direction perpendicular to the surface. This approach is also beneficial form a numerical point of view, since the volume of the absorbing materials does not have to be meshed, saving some computational time.

In some situations, however, for instance in the case of a thin porous layer backed by an air cavity, the material properties can depend on the angle of incidence of the acoustic waves and the local-reaction approximation may create errors. Such bulk-reacting (or extended-reacting) materials can be accounted for by explicitly solving specific propagation equations inside the materials, e.g. via an equivalent fluid approach [3, 6, 7] or via fluid-structure interaction simulations.

The DG module can also comprise an extended-reacting boundary model sub-module for simulating the propagation of sound at a boundary region comprising a second material. The extended-reacting boundary model may take into account the surface impedance of the boundary region that may vary with the incidence angle of the incoming sound wave due to non-local sound propagation along the boundary surface. By modelling the sound propagation inside the boundary material, e.g. a porous material or a structure, and coupling this with the air domain simulation, the extended reaction behaviour can be modelled.

In one embodiment, the extended reacting frequency boundary model sub-module is configured to model the second material with fluid structure acoustic simulations. The fluid structure acoustic simulations may be analogous to fluid porous simulations. This can be useful for modelling vibrating panels such as lightweight gypsum walls.

Extended-reacting frequency sub-module for simulating the propagation of sound at a boundary region may be relevant for surfaces having elastic properties or fluid layers, such as soft ground, porous materials backed by an air cavity, airtight membranes or perforated panels. These types of surfaces can have acoustic waves propagating along the surface, therefore an extended-reacting frequency sub-module may become relevant in order to get an accurate behaviour of the propagation of acoustic waves.

In one embodiment, the 3D model comprises a directive sound source for emitting sound in a defined direction. The directive sound source can be modelled as a directive sound source. The defined direction may be a specific angle and/or a specific orientation of the directive sound source. Directive sound source can be achieved with multiple methods. One method can consist of building a box with a moving piston in the virtual space to emulate a speaker. Another method may use a mathematical model, e.g., based on spherical harmonics, to model a radiation from a directive source, where the governing differential equations are different (forced equations vs unforced in the normal model of propagation).

In a preferred embodiment, the 3D model comprises a directive sound source for emitting sound in a defined direction, wherein the directive sound source is modelled with a broadband point-source excitation. The broadband point-source excitation may be for instance generated via a forcing term in the governing equations or via an initial pressure disturbance.

One possible method for modelling directional sources in a 3D model may be to include a geometry of a speaker box, and preferably apply an impulsive surface velocity excitation to the speaker box membrane. The membrane of the speaker box can be a diaphragm, which can be a transducer intended to inter-convert mechanical vibrations to sound, or vice versa. The membrane of the speaker box may generally be a sheet of various materials, suspended at its edges. By applying an impulsive surface velocity excitation to the speaker box membrane, a directional sound source can be obtained due to a radiation pattern of the membrane and subsequent edge diffraction that the geometry of the speaker box may introduce.

The speaker box can comprise at least one driver. A driver, in the context of speaker box, may be an individual transducer that may convert an electrical audio signal to sound waves. This may also be named as electrodynamic speaker driver, or speaker driver. The driver may comprise a diaphragm as defined herein, that may move back and forth to create pressure waves. The driver may be preferably mounted into a rigid enclosure of wood, plastic, or occasionally metal. The rigid enclosure can be preferably defined as a loudspeaker enclosure or speaker box. The rigid enclosure may isolate the acoustic energy from the front of the diaphragm from that of the back of the diaphragm. A horn may preferably be employed to increase efficiency and directionality of the directive sound source. A horn can be a horn loudspeaker, which consists of an acoustic horn that can increase the overall efficiency of the driving element. A common form can consist of a flaring duct to conduct the acoustic or the sound waves to the virtual room, or the open air in the real world. As described herein, the horn may be use to improve the coupling efficiency between the speaker driver and the propagation medium of the acoustic waves.

The speaker box may comprise at least two membranes, where a first membrane may have a substantially larger diameter than a second membrane, and wherein the first membrane may model the directive sound source in a first directive sound source frequency range and the second membrane may model the directive sound source in a second directive sound source frequency range. The first directive sound source frequency range may be comprised between 20 Hz and 1 kHz, preferably between 20 Hz and 2 kHz, more preferably between 20 Hz and 3 kHz. The second directive sound source frequency range may be comprised between the upper limit of the first directive sound source frequency range and 4 kHz, preferably 5 kHz, more preferably 6 kHz, even more preferably 7 kHz, most preferably 8 kHz, even most preferably 10 kHz. By having the speaker box comprising the at least two membranes, a better simulation of the directive sound source can be performed, since a speaker box preferably comprises more than one membrane, and wherein a first membrane is preferably designed for the low frequencies of the audible frequency spectrum and a second membrane is preferably designed for the high frequencies of the audible frequency spectrum.

The first membrane may be a woofer and the second membrane may be a tweeter. These are common types of drivers or membranes in a loudspeaker or speaker box.

In another embodiment, the loudspeaker is excited by applying a normal acoustic velocity along the surface of the membrane geometry. The membrane geometry may be fixed. The prescription of the normal acoustic velocity along the surface of the membrane geometry may be performed by a Neumann boundary condition. Due to numerical constraints, the excitation signal may be a Gaussian-like impulse. Such an excitation may substantially have a flat energy spectrum at all frequencies, such as the audible frequencies, i.e. 20 Hz to 20 kHz. Advantageously, a post-processing step can normalize the simulated room impulse responses to the simulated free-field on-axis response at a distance of one meter. Preferably, the rigid enclosure of the speaker box can be modelled as an acoustically hard boundary. The rigid enclosure of the speaker box may preferably and substantially be arranged around the at least two membranes.

By having the approach as described in the previous paragraphs, a straightforward implementation of the directive sound source can be performed, as it preferably may require a sufficiently accurate model of the speaker box geometry. The effects of the diffraction from the baffle can be inherently included in the simulation, making it particularly well suited for low-frequency simulations. The baffle may refer to a flat or panel-like structure that is arranged in from of at least one speaker driver. One function of the baffle can be to provide a mounting surface for the at least one speaker driver and to separate the front and back sound waves generated by the driver. The baffle may help prevent the cancellation of the front and back sound waves by isolating them.

The wave based solver can be used to simulate the acoustic wave propagation at one point in time. However, if it is desired to simulate the temporal propagation of the wave, the time dependent wave propagation should be simulated. Accordingly, in one embodiment the DG module may comprise a time marching sub-module comprising at least a first time marching method for simulating the propagation of sound in time and space. The first time marching method can be an explicit time stepping method. In order to solve the acoustic wave propagation equations, a temporal discretization may need to be performed. The temporal discretization of a semi-discrete numerical system may involve the integration of every term in different equations over a predefined time step.

A semi-discrete system may be a system of partial differential equation(s) where the spatial part can be discretized but the temporal part may not be discretized. Semi-discrete systems may be systems of ordinary differential equations, i.e. the partial differential equations are converted to ordinary differential equations.

The time marching method can comprise a second time marching for simulating the propagation of sound in time and space. Using a second time marching algorithm may be relevant in certain conditions, e.g., if the boundary equations impose a strict stability criterion which renders the first time marching algorithm inefficient.

For example, the first time marching algorithm may be a commonly used time marching algorithm, such as a low-storage explicit Runge-Kutta algorithm which will be discussed. These are typically fast and effective. However, they are not necessarily very robust unless a very small time step is used, i.e. if the simulation is too complex the time marching algorithm may fail and end up returning errors and faulty results.

Accordingly, a second more robust time marching algorithm may be used when the simulation is too complex.

The wave based solver further comprises criterions for establishing when the simulation becomes too complex and thus applies the second time marching algorithm.

In one example, time marching may further be considered with the spatial discretization defined, [Eq. (9)] for a given time t, from which a system of semi-discrete equations (discrete in space, continuous in time) can be obtained with the general form $$\frac{d\bar{q}_e}{dt} = K_e \bar{q}_e(t), \quad (13)$$

with $\bar{q}_e$ the vector of the nodal values for each acoustics quantities, and $K_e$ the element-wise discrete spatial operator, which also includes potential boundary conditions. This system can be integrated in time following the method of lines, where the time axis is discretized with a potentially varying global time step $\Delta t$. From the known initial state of the acoustics field, an approximation of $\bar{q}_e$ at the next time iteration can be computed from the past values of the solution vector, based on successive evaluations of the operator $K_e$. This process is repeated iteratively until the final time is reached.

When doing the time marching, an appropriate time step size must be chosen (see details below on numerical stability). The main wave equations and the ordinary differential equations associated with the boundary conditions may impose conditions on the time step.

As discussed in one embodiment, two time marching algorithms can be used. The default time algorithm can for example be a standard low-storage explicit Runge-Kutta (LSERK) algorithm requiring only two storage locations per variable. This is an efficient time marching algorithm. Fourth-order accuracy in the temporal integration is typically used, which amounts to a four-stage scheme thanks to the linearity of the wave equation [10, 11, 12]. This time marching algorithm is chosen when the wave equation time step size conditions are stricter that the boundary equations. However, when the boundary equations impose a more strict condition, a so-called implicit-explicit time marching algorithm may be employed [1].

In a preferred embodiment, the wave-based solver comprises a unique time marching algorithm, wherein the unique time marching algorithm is a simplified Runge-Kutta algorithm, wherein the simplified Runge-Kutta algorithm is used with simplified integrations. By only using the simplified Runge-Kutta algorithm, the simulation is much faster than if using a first and a second time marching algorithm, as discussed herein.

When doing the time stepping, the numerical stability of the algorithms should be considered. For example, in some embodiments, the time step should not be arbitrarily large, as the time integration may impose a conditional stability criterion based on the maximum (complex) eigenvalue $\lambda_{max}$ associated with the semi-discrete operator $K_e$ across each element. This condition dictates that $\lambda_{max}$ must lie within the stability region C of the time-stepping method, so that $\lambda_{max} \Delta t \leq C$.

One condition for stability is the Courant-Friedrichs-Lewy condition, which constrains the choice of the time step typically in nodal finite element methods as $$\Delta t \leq C_{CFL} \frac{h}{c} \frac{1}{N^2},$$

where h is some measure of the smallest characteristic length of the elements in the mesh (e.g. the largest inscribed sphere), and $C_{CFL}$ is a constant of the order of one which depends on the chosen time-stepping method. The time step $\Delta t$ is here the same for each element; a direct consequence is that the smallest element in the mesh will constrain the time step globally. Ideally, all the elements should therefore have similar characteristic lengths, preferably within a 10% margin, to avoid unnecessarily increase in the computational time of the simulations. Also, smaller time steps do not necessarily imply a more accurate numerical solution, since spatial discretization errors may be dominating.

In one embodiment, the presence of absorbing material in the simulation may affect the modulation stability as this will increase the stiffness of the spatial operator. In the case of local-reacting materials modelled with their reflection coefficient, a numerical stability may be provided when all the poles $\lambda_i$ associated with the boundary materials lie inside the stability region of the time integration scheme, so that $\lambda_i \Delta t \leq C$ [5]. This condition can be easily checked prior to any simulation and if it is not fulfilled by the explicit time scheme for a given $\Delta t$, an implicit scheme with a larger stability region can be used for the boundary conditions instead at the cost of an increase in the computational time [14]. Local explicit time-stepping may also be used in such cases.

It has been shown that the DGFEM method is well suited for parallel computing, however, if not implemented properly the parallelization may substantially suffer.

In one embodiment, a Message Passing Interface (MPI) is used to handle communication between central processing units (CPUs) which facilitates multi-device compatibility, i.e. stringing together several computers (CPUs) to solve a given problem. MPI works by treating each CPU core as its own entity with its own separate memory. Information may thereby be shared between CPU cores through the messaging interface.

In one embodiment, the virtual domain, e.g. the virtual space, is divided into chunks, for example the virtual domain is partitioned or discretized into a set on non-overlapping and potentially unstructured mesh element or sub-domains. Each chunk can also be a set of mesh elements. The domain should preferably be split into even chunks to balance the load between CPU cores. However, it may be difficult to determine the computational load associated with each element a-priori. If a substantial computational load imbalance is present between domain chunks some CPUs/graphical computer units (GPUs) will end up idle in every time step which may severely hurt the performance. Load balancing can be ensured by estimating a-priori the amount of computational operations that are needed for each element on the mesh, and then ensuring that each chunk requires a similar number of computational operations. Each CPU core stores the simulation information needed for the computations in elements/chunks belonging to that part of the domain. However, some CPUs share an interface between them where information has to be shared for the acoustic wave to propagate from the domain chunk handled by one CPU to a neighbouring domain chunk handled by another CPU. In other words, the numerical flux is computed based on neighbouring elements that are located on different CPUs which may require that e.g. MPI communication between the cores takes place in a so-called halo exchange.

The code is in one embodiment structured such that each CPU core is assumed to have access to one GPU. This would seem to increase the cost such as bandwidth cost, as it creates interface communications between CPU cores as compared to only using CPUs because $CPU_0$ may copy all interface information from $GPU_0$ into the RAM on $CPU_0$ before it can communicate this information to $CPU_x$ through the MPI, where $0<x \leq M-1$ denotes an arbitrary CPU core out of the total of M CPUs. $CPU_x$ has to copy the received interface information to its connected GPU, $GPU_x$. In other words, using GPUs introduces an additional communication step and therefore additional overhead communication between the CPU and GPU in the time marching process. In general, this would imply a penalty in the scaling of computational performance when adding additional CPU-GPU pairs to run the simulation as compared to only using CPUs. However, it has been shown that using GPUs may in some embodiment be preferred because of the high number of available cores and a much higher on-chip bandwidth which provides a simulation faster than expected when using GPUs compared to CPUs.

In one example, the implementation of the LSERK time marching method discussed above, including all the interface communication is summarized in Algorithm 1. The GPU functions, i.e. kernels, are launched in every iteration of the time stepping algorithm.

---

Algorithm 1: One stage of the LSERK time marching method

Input: Previous stage $q_h^{(i-1)}$
Result: An updated stage $q_h^{(i)}$
1. GPU to CPU memory copy of interface nodes (CPU/GPU). Simultaneous initiate volume integral compute kernel (GPU).
2. Initiate the interface MPI communication (CPU).
3. CPU to GPU memory copy of interface nodes (CPU/GPU).
4. Initiate surface integral compute kernel (GPU).
5. Update based on current stage (GPU).

---

On most modern graphic cards, the memory movement to and from pinned host memory and device memory can be done with an on-board direct memory access (DMA) engine which can fully overlap with the computational activity on the GPU die. This enables that the device-host communication and the volume integral computation from Eq. (4) above can start simultaneously as shown in step 1 of Algorithm 1. The communication is preferably done in steps 1, 2 and 3 before the volume kernel finishes. This removes the communication cost, which is possible since the volume kernel is completely asynchronous with respect to the host. Step 4 cannot initiate before all communication of steps 1, 2 and 3 are finished and the volume kernel is finished.

Each sub-domain is solved independently on a single CPU core. A single CPU core may be defined as a single unit which can receive instruction, perform calculations, or operations, to satisfy those instructions. A CPU can have multiple cores.

In one embodiment, the wave-based solver further comprises extracting one or more wave impulse response(s) based on the simulation of the propagation of sound. The one or more wave impulse response(s) can be extracted based on a simulation run in the virtual domain as described herein, where the simulation model is excited with an impulsive excitation, i.e. a short-duration, broadband signal.

The wave impulse response can be a spatial impulse response. A spatial impulse response embeds spatio-temporal information regarding direction of arrival of incoming acoustic waves at the receiver position. Typically a spatial impulse response comprises a plurality of single channel impulse responses, where each impulse response records the sound from a specific direction or angle at the same listening point. The spatial impulse response can be constructed in the simulation by recording the room impulse response in multiple locations around the receiver positions using a virtual microphone array, e.g., a spherical microphone array. The receivers may either be omnidirectional or cardioid, and the microphone array can either be open or rigid. The microphones in the array can be distributed in numerous ways. The number of microphones used in the virtual microphone array can be selected based on how much of a spatial resolution is needed in the resulting spatial impulse response. Once the impulse response has been simulated in all virtual microphones, the spatial impulse response can be encoded using spherical harmonics techniques such as ambisonics.

Spatial characteristics around the receiver location can be captured to enable binaural or multi-channel loudspeaker auralizations. An array of receivers can be arranged around the receiver location to determine the direction of a sound wave. This information can for example be used to encode the resulting sound field into an ambisonics spatial impulse response. The spatial impulse response can be decoded to binaural or multi-channel loudspeaker playback systems.

In one embodiment, a spherical receiver array is arranged around at least one receiver. The spherical receiver array may be an open spherical array of cardioid receivers. This array design is robust and allows a wide operating frequency range.

The spherical receiver array may comprise at least 2 receivers, preferably at least 4 receivers, more preferably at least 8 receivers, even more preferably at least 16 receivers, most preferably at least 32 receivers, even most preferably at least 64 receivers. The more receivers arranged in the spherical receiver array, the more order of ambisonics can be obtained.

The number of receivers in the array may determine the maximum truncation order N that can be considered for the spherical harmonics decomposition. The sound field may be sampled with at least as many receivers as the number of terms used for the expansion, leading to $Q=(N+1)^2$. This condition may be necessary to avoid undersampling but it may not guarantee accuracy. The optimal number of sampling points can depend on the chosen quadrature rule; an exact integration can be performed with a Gauss quadrature for Q, but other approaches can require less samples. Another constraint may pertain to spatial aliasing, which can occur if the recorded sound field is not order-limited but admits non-zero spherical harmonics coefficients for orders higher than N. Aliasing can be mitigated by choosing a sufficiently large N, or with dedicated anti-aliasing spatial filters. The wave based solver may comprise an output module, which may render the DG simulation. The output module may provide various formats of the output from the simulation, such as visual, graphical, numerical, and/or audible output. Rendering of sounds is the use of simulated sound propagation to convey the feelings or effects associated with a virtual situation. Rendering may convey a feeling associated with the sound source or the acoustics of the virtual domain. Sound rendering is an integral component of auralization. The complexity of the methods for rendering sound increases drastically in a virtual domain with one or more dynamic receiver(s) or source(s). The capabilities and/or features of the disclosed wave based solver and computer implemented method associated to the wave based solver may solve the computation complexity caused by the dynamic receiver(s) and/or source(s). In some cases, sound may arrive at the receiver from many previous source positions. As a result, a plurality of impulse responses need to be computed between many previous source positions and the current receiver position.

The graphical output can comprise visualising at least a part of the DG simulation in a cutting plane of the 3D model of a virtual space. The part of the DG simulation is a graphical representation of the energy levels of the acoustic waves, spatially represented in the virtual domain where the simulation ran. The graphical output allows the representation of the energy levels to evolve in the virtual domain in time, such as a user may visualize the evolution of the energy levels of the acoustic waves in the virtual domain at an exact time and/or at an exact location in the virtual domain. The graphical output may also be configured to provide a visualization of the acoustic waves in a virtual 2D domain, with the same capabilities as discussed herein. The graphical output can also be static spatial colormaps of various sound descriptors such as sound pressure levels, reverberation time, clarity or other acoustic parameters.

The numerical output may comprise one or more possible formats or forms, such as impulse responses, frequency responses, energy decay curves and/or acoustic parameters such as reverberation time, clarity, sound pressure level and/or speech intelligibility. More generally, the numerical output can comprise parameters such as parameters described in [16].

The audible output comprises playing the impulse response convolved with a sound file. The sound file may be defined as a sound, such as a voice or a music, processed on a processing unit in order to be used by the processing unit or a second processing unit. The convolution of the sound file with the impulse response can render the sound file in a virtual reality setting. In the case of spatial (multi-channel) impulse responses, spatial decoding techniques such as ambisonics decoding can be applied to render the multi-channel output to a binaural auralization, for e.g. headphone playback, or multi-channel auralization, for e.g. loudspeaker system playback.

As discussed, using a geometrical acoustic solver to simulate wave propagation is generally known. However, there are room for improving the known geometrical acoustic solver, in particular in order to optimize the geometrical solver to be used together with a wave based solver as discussed herein.

In one embodiment of the geometrical acoustic solver, the at least first acoustic ray tracing module determines an at least first ray tracing simulation of a first part of the propagation of sound and the at least one image source module determines at least one image source simulation of a second part of the propagation of sound.

In particular the image source module may be used to determine the first reflections, e.g. the first, second and third order reflections. The image source module creates a more exact model of the specular reflection used to estimate the wave propagation, compared to ray tracing, however, it is more computational heavy, especially as the reflection order increases. Thus, to determine the remaining number of reflections the ray tracing module is used as this is less exact but is faster to process on a computer.

It should be understood that the image source module may be used to determine less or more than the first three reflections and can be determined by the user or application to achieve the optimal accuracy and/or processing time for the specific case. The geometrical acoustic solver may also give an estimate on the accuracy and/or the processing time of the simulation before it is initiated by the user.

In a further embodiment, changing between the image source module and the ray tracing module may be determined by the energy of the ray and not the number of reflections.

Thus, as the energy of the simulated propagation of sound decreases below a certain threshold set by the user or software for a specific application or in order to achieve a certain accuracy and/or processing time, the geometrical acoustic solver may switch from the image source module to the ray tracing module.

In one embodiment, the first part of the propagation of sound is the primary set of reflections of the propagation of sound and the second part of the propagation of sound is the subsequent reverberations of the propagation of sound.

For example, the primary set of reflections may be the first, second and third reflections and the subsequent reverberations may be the fourth, fifth and following reflections.

In another embodiment the geometrical acoustic solver further comprises a second acoustic ray tracing module for determining a second ray tracing simulation by simulating the propagation of sound, and that the hybridization module further combines the second ray tracing simulation with the first ray tracing simulation and the at least one image source simulation to the geometrical acoustics simulation.

In one embodiment the first acoustic ray tracing module determines a first subpart of the first part of the propagation of sound and the second acoustic ray tracing module determines a second subpart of the first part of the propagation of sound.

In one embodiment the geometrical acoustics solver is further modified for high performance computing implementation by parallelizing computer operations that are to be carried out by the solver, e.g., parallelizing the propagation of each ray, parallelizing different frequency ranges (e.g. different octave bands) that are simulated by the geometrical acoustics solver or each image source branch in the image source tree. This can be implemented on multi-core CPU computing architectures or on GPU computing architectures.

As discussed previously, it is common to derive an impulse response from an acoustic simulation and then use the impulse response to render the acoustic sound at a specific point in the virtual room.

Thus, in one embodiment, the geometrical acoustic solver may further comprise a geometrical impulse response module for extracting a geometrical impulse response based on the geometrical acoustics simulation of sound propagation.

The geometrical impulse response can for example be monaural or spatial. A monaural impulse response records all the sound at one point without considering the direction of the sound. A spatial impulse response records the direction from where the sound is coming from. Typically, a spatial impulse response comprises a plurality of monaural impulse responses, where each directional impulse response records the sound from a specific direction or angle at the same point, e.g. by using spherical harmonics encoding techniques.

Spatial characteristics around the receiver location can be capture to enable binaural or multi-channel loudspeaker auralizations. An array of receivers can be arranged around the receiver location to encode the resulting sound field into an ambisonics spatial impulse response. The spatial impulse response can be decoded to binaural or multi-channel loudspeaker playback systems.

In one embodiment, a spherical receiver array is arranged around at least one receiver. The spherical receiver array may be an open spherical array of cardioid receivers. This array design is robust and allows a wide operating frequency range.

The spherical receiver array may comprise at least 2 receivers, preferably at least 4 receivers, more preferably at least 8 receivers, even more preferably at least 16 receivers, most preferably at least 32 receivers, even most preferably at least 64 receivers. The more receivers arranged in the spherical receiver array, the more order of ambisonics can be obtained.

The number of receivers in the array may determine the maximum truncation order N that can be considered for the spherical harmonics decomposition. The sound field may be sampled with at least as many receivers as the number of terms used for the expansion, leading to $Q=(N+1)^2$. This condition may be necessary to avoid undersampling but it may not guarantee accuracy. The optimal number of sampling points can depend on the chosen quadrature rule; an exact integration can be performed with a Gauss quadrature for Q, but other approaches can require less samples. Another constraint may pertain to spatial aliasing, which can occur if the recorded sound field is not order-limited but admits non-zero spherical harmonics coefficients for orders higher than N. Aliasing can be mitigated by choosing a sufficiently large N, or with dedicated anti-aliasing spatial filters.

The geometrical acoustics solver may comprise an output module, which may render the geometrical acoustics solver simulation. The output module may provide various formats of the output from the simulation, such as visual, graphical, numerical, and/or audible output. Rendering of sounds is the use of simulated sounds propagation to convey the feelings or effects associated with a virtual situation. Rendering may convey a feeling associated with the sound source or the acoustics of the virtual space. Sound rendering is an integral component of auralization. The complexity of the methods for rendering sound increases drastically in a virtual domain with one or more dynamic receiver(s) or source(s). The capabilities and/or features of the disclosed wave based solver and computer implemented method associated to the wave based solver may solve the computation complexity caused by the dynamic receiver(s) and/or source(s). In some cases, sound may arrive at the receiver from many previous source positions. As a result, a plurality of impulse responses need to be computed between many previous source positions and the current receiver position.

The geometrical acoustics solver wherein the graphical output comprises visualising at least a part of the geometrical acoustics simulation, e.g., by visualizing the traced rays across the 3D domain over time. Another graphical output consists of visualizing valid image sources that represent valid specular reflection paths in the simulation. The graphical output can also be static spatial colormaps of various sound descriptors such as sound pressure levels, reverberation time, clarity and/or other acoustic parameters.

In one embodiment, the geometrical acoustic solver relies on impedance of the boundaries of the air volume of the virtual domain. The geometrical acoustics solver may be configured for using the impedance of the boundaries for defining boundary conditions, thereby taking both energy reduction and phase shift into account at the boundaries of the virtual domain. This can be implemented for example by keeping track of phase shifts introduced at boundaries for every reflection of a ray or every image source generated, and accumulating the total phase shift incurred when an acoustic wave travels between a source and a receiver. Additionally, it could imply that the phase of the wave should be tracked for the extent of each ray.

Even further the merging or hybridization step comprises that the time arrival, i.e. phase, of the sound propagated in the virtual space arrives at the receiver location at the same time. In one embodiment, the geometrical acoustics solver is configured for using a pressure based image source method, wherein the pressure based image source method models a phase shift at the boundary conditions.

In a preferred embodiment, the virtual domain comprises at least one directive sound source for emitting sound in a defined direction. The geometrical acoustics solver can deal with directive sound sources. The geometrical acoustics solver is configured for modelling directive sound sources and can simulate the propagation of sound where one or more sound sources are directive.

In one embodiment, the geometrical acoustics solver approximates diffraction of the acoustic waves.

The computer implemented method generating an impulse response for a listening point in a room as discussed herein can be used in architecture. Simulated and generated impulse responses and related auralization techniques can be extremely useful in making timely and informed decisions during building design processes and change potential design in order to avoid undesirable acoustic effect in the design. One can experience different indoor acoustic conditions without physically realizing it during the design and construction stage, also called virtual prototyping, until the customers and/or building owners find it satisfactory. All the stakeholders involved in the design and construction process can understand the value of good acoustic conditions by listening to the simulated sound, by for instance, listening to a rendered audio sound at a listening point in a 3D model of the room where the acoustic may be simulated.

Similarly, impulse responses generated with the computer implemented method as discussed herein can benefit audio industry. Audio industry can test how audio devices can virtually sound in realistic room conditions to optimize audio device design in terms of directivity pattern, radiation characteristics, speech segregation performance, background noise removal, direction of arrival estimation, etc. In this way, the audio devices can adapt their sound to maximize their performance for a given acoustic condition, characterized by the impulse response(s) generated by the computer-implemented method as discussed herein. Audio devices can include smart phones, smart speakers, TVs, conventional loudspeakers, hearing aids, audio devices attached to head mounted displays, and any combinations thereof.

By generating impulse responses with the computer-implement method as described herein, metaverse and entertainment applications in association with the film and entertainment industry including games can reproduce a high fidelity of sound propagation in virtual environments. One can freely define and simulate any unexplored acoustics in virtual scenes so that a user can experience immersion while playing games, watching movies or any combinations thereof. Simulations of acoustics by generating impulse response with a computer-implemented method can potentially be a promising tool in automatizing the realistic audio signals for a given scene without much human interactions.

In general the acoustic impulse response of a system describes the properties of the system and thus can be used to evaluate the design of a room from a specific listening point. Thus, the frequency content of an impulse response can inform us if a particular frequency is dominant and should perhaps be removed if undesired. Subsequently system can be designed or rooms redesigned in order to change the acoustic characteristics of a room. Thus, an impulse response provides a strong technical tool for a designer, architect, acoustic engineer to evaluate the acoustic property of a space, such as a room.

As discussed, one aspect of applying and using the acoustic simulation as discussed herein may be in training of machine-learning driven audio algorithms.

Machine-learning driven audio algorithms described herein may be used to improve the signal processing of acoustic waves for machine-learning driven audio devices. Audio devices suffer from distinguishing and isolating the main information in a sound to be transmitted and/or received when dealing with sound propagation. The sound propagation may suffer from diffractions, reverberations or echo, which may generate noise or undesirable effects in a sound that may contain the main part of the information to be transmitted and/or received. By training machine-learning driven audio devices with some machine-learning driven audio algorithms, the audio devices can automatically and in an independent way deal with the imperfection of sound propagation in a specific area. Since the specific areas can be any areas such as an office, an outdoor environment, a semi-closed room, a means of transportation such as a car or a bus, a house or a building, training machine-learning driven audio algorithms in as many different environments as possible may be necessary to improve the sound quality by distinguishing between the main information contained in the sound and the undesired effects and/or undesired sounds that may need to be removed.

The standard approach used consists of generating data by measuring the propagation of sound in real case scenarios, such as different rooms having different reverberations, with a sound source and one or more microphone(s) arranged in the different rooms. This can generate data which may then be used to train machine-learning driven audio algorithms. These methods are well-known but are expensive and time-consuming.

By being able of generating through simulation synthetic data for machine-learning driven audio algorithms in a fast and accurate way as disclosed herein, the method of carrying out expensive and time-consuming measurements to collect data can be alleviated. This can potentially make the machine-learning driven audio algorithms more accessible, accurate and/or cost-efficient since they can rely on an amount of synthetic data which may not be able to be generated with the current methods that exists in the market.

The at least one 3D model may comprise at least one internal surface, such as surfaces of at least one virtual object located in the 3D model. The at least one virtual object can be a piece of furniture, a plant, a car or a frame. The at least one internal surface can be any surfaces which is comprised or located in the 3D model. By object, it can be understood as anything being static. A static person can also be comprised in the at least one 3D model. A surface may be defined as the outside or top layer of something.

The at least one sound receiver may comprise a plurality of oriented receivers. The plurality of oriented receivers may be arranged at the location of the at least one sound receiver and wherein a first oriented receiver can be oriented with a first angle and a second oriented receiver may be oriented with a second angle. The plurality of oriented receivers can be oriented in order to capture different impulse responses at the location of the at least one sound receiver. This may help in order to get a spatial impulse response output from the simulation.

Spatial characteristics around the receiver location can be capture to enable binaural or multi-channel loudspeaker auralizations. An array of receivers can be arranged around the receiver location to encode the resulting sound field into an ambisonics spatial impulse response. The spatial impulse response can be decoded to binaural or multi-channel loudspeaker playback systems.

In one embodiment, a spherical receiver array is arranged around at least one receiver. The spherical receiver array may be an open spherical array of cardioid receivers. This array design is robust and allows a wide operating frequency range.

The spherical receiver array may comprise at least 2 receivers, preferably at least 4 receivers, more preferably at least 8 receivers, even more preferably at least 16 receivers, most preferably at least 32 receivers, even most preferably at least 64 receivers. The more receivers arranged in the spherical receiver array, the more order of ambisonics can be obtained.

The number of receivers in the array may determine the maximum truncation order N that can be considered for the spherical harmonics decomposition. The sound field may be sampled with at least as many receivers as the number of terms used for the expansion, leading to $Q=(N+1)^2$. This condition may be necessary to avoid undersampling but it may not guarantee accuracy. The optimal number of sampling points can depend on the chosen quadrature rule; an exact integration can be performed with a Gauss quadrature for Q, but other approaches can require less samples. Another constraint may pertain to spatial aliasing, which can occur if the recorded sound field is not order-limited but admits non-zero spherical harmonics coefficients for orders higher than N. Aliasing can be mitigated by choosing a sufficiently large N, or with dedicated anti-aliasing spatial filters.

The at least one sound source may be at least one directive sound source. The at least one directive sound source can emit a sound in a specific direction. The at least one directive sound source can be modelled in many different ways. One way of modelling the at least one directive sound source can consist of building a 3D model of a speaker around the at least one sound source, wherein the speaker would guide the sound emitted from the at least one sound source to a specific direction within the 3D model. The speaker would be built with at least one material, where the material may have properties that would either absorb or reflect the sound wave such that the majority of the sound wave is directed or guided towards a specific direction in the 3D model of a virtual space. The source may also be omnidirectional.

The at least one sound source may be configured such as described herein.

The method may further comprise a step of obtaining at least one raw sound data. The at least one raw sound data can be an audible sound, such as a music and/or a human voice. The at least one raw sound data may not comprise any echo and/or reverberation, such as a sound that would be recorded in an anechoic chamber. The at least one raw sound data may be obtained by recording it in an anechoic chamber. The at least one raw sound data can comprise frequencies between 20 Hz and 20 kHz, which can be defined as frequencies being audible. The frequency spectrum can be slightly extended beyond these ranges.

In an acoustic simulation of a virtual space, the impulse response of a given virtual domain may be simulated with the wave based solver, or the geometrical acoustics solver or the hybridization of the wave based solver and the geometrical acoustics as described herein.

The impulse response may be monaural or spatial (multichannel). The at least one raw sound data may then be convolved with the impulse response, to create a modified sound data—a simulation of how this raw sound would be in reality in this virtual space. By knowing the raw sound (input) and the modified raw sound (output), machine learning algorithms can be trained to understand the relationship between the raw sound and the modified raw sound, which in turn enables them perform various audio processing such as dereverberation.

Training data of a machine-learning model or algorithm is the data to be used in order to train a machine-learning model or algorithm to accurately predict a particular outcome, or answer, that you want your model to predict.

The machine-learning model can be trained by comparing the at least one raw sound data, such as a system input, to the at least one modified raw sound data, such as a system output. The comparison between the at least one raw sound data and the at least one modified raw sound data teaches the machine-learning model to recognize the difference between the at least one raw sound data and the at least one modified raw sound data such that the machine-learning model can remove unwanted or undesirable effects such as echo and/or reverberation in the at least one modified raw sound data.

The machine-leaning model may also be trained by convolving the at least one raw sound data with a simulated impulse response obtained by the at least one sound propagation simulation.

The input data may comprise a plurality of three-dimensional model of a virtual space, preferably three or more three-dimensional models of a virtual space, more preferably ten or more three-dimensional models of a virtual space. The quality, quantity, and diversity of the input data will determine the accuracy and performance of the machine-learning model or algorithm. The more input data the model can be trained with, the better the machine-learning model performs and the bigger the variety of circumstances the model can handle. Therefore, it may be necessary to generate as much input data as possible by building as many three-dimensional model of a virtual space as possible, and perform sound propagation simulation in each of these 3D models.

These 3D models can be automatically generated in order to create a relatively large amount of 3D models in a short period of time. This would potentially make the method described herein quicker to generate a useful and large amount of synthetic data in order to train the machine-learning driven audio algorithms.

For some specific applications, the at least one sound source can be substantially located at the same location than the at least one sound receiver. Indeed, in order to efficiently train machine-learning driven audio devices such as audio devices performing a blind room response modeling, this configuration may be necessary. In some cases, loudspeakers, soundbars, televisions or smart speakers may try to adapt or filter the sound they emit in the room or the area where they are placed in to improve the sound quality for the potential listeners. In order to adapt or filter the sound they emit in the room or the area where they are placed in, they generally emits at least one sound signal and records in a microphone the at least one returning sound signal that comes back to the speaker. From the at least one returning sound signal, the speakers can then estimate, thanks to a machine-learning model or algorithm, the room properties and then adapt or filter the sound it emits in order to limit undesirable or unwanted sound effects.

The at least one sound propagation simulation may have at least one simulation time. The at least one simulation time may be a compromise between accuracy of the simulation and the time spent by a computer to run and complete the at least one sound propagation simulation.

The at least one simulation time can be calibrated according to 3D model(s) properties.

The 3D model(s) properties may comprise 3D model(s) geometry and/or size.

The method can be configured to be used for speech recognition, echo cancelling, beam forming, direction of arrival estimation, blind source separation, blind room response modeling or feature extraction. The configuration of the method depends on the different applications such as the ones cited as example. By configuration, this can mean that the steps of the method may be executed in a different order, which would result in an optimized training of machine-learning driven audio algorithms.

In one embodiment, the at least one sound propagation simulation is configured to use the solver(s) and/or the computer-implemented method described herein.

In one embodiment the plurality of impulse responses are pre-processed to generate a plurality of modified impulse responses for training the machine learning model as described herein, for example in relation to above aspects.

The pre-processing may for example comprise applying a filter to enhance a voice range in the impulse response. The voice range for enhancement can for example be between 3 kHz-17 KHz or between 350 Hz-17 kHz which is an average human voice range.

Other type of preprocessing can also be done. E.g. the plurality of impulse responses may be segmented such that only parts of it is used. It can for example be segmented such that it is only a predetermined number of reverberations that are considered and trained on.

In one embodiment the method further comprises providing a plurality of reverberating audio signals using the plurality of reverberating audio signals as input. The reverberating audio signal can for example be an audio signal containing the reverberations from a room or a space. Thus, the reverberation audio signal contained not only the raw audio but also information about the space, such as the room, wherein it has passed and been reflected and absorbed on boundaries within the room. Thus, using the reverberating audio signals as input provides substantial information for training the machine learning model.

For example, in one embodiment the reverberating audio signal is provided by convolving each of the plurality of impulse responses with a base audio signal.

In another embodiment the reverberating audio signal may be provided by recording an audio signal received at an at least one microphone of an audio device.

Other input for training the machine learning model for audio compensation as discussed herein can for example be the 3D models of the plurality of rooms. This provides a training wherein specific audio compensation may be provided based on the geometry of the room, which accordingly provides an even further improved audio compensation.

In another embodiment the method may comprise receiving a digital model of the audio device, and using the digital model of the audio device as an input. Using the model, for example geometry or other parameters, of the audio device on which the audio compensation is performed may provide an even further improved audio compensation.

The audio device may for example comprise further methods or geometries that for example may identify the direction of sound which can be used as an advantage for the audio compensation.

In yet a further embodiment an at least one preferred listening position in each of the plurality of rooms can be used as an input to for training a machine learning model for audio compensation. In most situations it is in the position of the listener that the sound emitted from the audio device should be clear and crisp such that the audio is easily understood. Accordingly, providing preferred listening positions as input to the training of the machine learning model the audio device may provide audio compensation such that the audio is heard most clearly at the preferred listening position and not, as an example, at the audio device itself.

A person or audio detection device may be integrated or coupled with the audio device such that the audio device comprising the trained model change the preferred listening position depending on the direction or position of the detected person or audio.

As also discussed, different training steps may be used together or separately in order to train the machine learning model as described herein.

For example, in one embodiment training the machine learning model comprises using the plurality reverberating audio signals as described herein as input, wherein the training comprises reestablishing a base audio signal as an output.

In another, or additional embodiment, the 3D models of the plurality of rooms can be used as input and the at least one preferred listening point in each of the plurality of rooms is used as input for training the machine learning model. The method may further comprise that the machine learning model reestablishes the base audio signal at the at least one preferred listening point as an output.

In a further embodiment training the machine learning model may comprise generating a compensation impulse response as an output. The compensation impulse response can for example be based on the reverberation audio signals as described and a base audio signal as an input. The base audio signal as discussed herein can for example be an anechoic signal, i.e. a signal where no reverberating information such a spatial acoustics is present.

In yet a further embodiment the 3D models of the plurality of rooms is used as input and the at least one preferred listening point in each of the plurality of rooms is used as input, wherein the method further comprises generating the compensation impulse response at the at least one preferred listening point as an output.

The plurality of impulse responses as used for training the machine learning model discussed herein may be generated for each 3D model of the plurality of rooms as described herein, i.e. by using a wave based solver.

The machine learning model applied herein may in one embodiment comprise a neural network.

For example, the neural network may comprise an auto encoder for encoding any of the inputs to the model or for generating a compressed input for use in training the machine learning model for audio compensation.

Alternatively, or additionally, the neural network may further comprise a general adversarial network (GAN) for generating any one of the input for training the machine learning model for audio compensation.

Furthermore, in one embodiment, the neural network may comprise a deep neural network, a convolutional neural networks and/or a transformer for training the machine learning model for audio compensation.

With the machine learning model trained as discussed above a method for providing a machine learning model for audio compensation in an audio device, wherein the audio device comprises at least one microphone can be provided in one embodiment.

The compensated audio signal can for example be generated by convolving the received audio signal with the compensation impulse response as discussed herein. Furthermore, as discussed in one aspect, an audio device comprising at least one microphone, wherein the audio device comprises a processing system for applying a machine learning based audio compensation may be provided.

The audio device may also comprise an at least one speaker.

In one embodiment the audio device may comprise a communication module configured to transmit the compensated audio signal. The compensated audio signal can for example be transmitted to a cloud, an internet and/or a network storage center.

In an even further or additional embodiment, the compensated audio signal can be transmitted to a remote audio device, wherein the remote audio device comprises at least one remote speaker for outputting the compensated audio signal.

The remote audio device may also comprise a machine learning model for audio compensation, for example trained as discussed herein. The remote audio device thus emit the audio signal through an at least one speaker applying the audio compensation to the audio signal.

In one aspect, a system for training a machine learning model for audio compensation is disclosed, the system comprising: a computer system having a processor coupled to a memory, the processor configured to: receive 3D models of a plurality of rooms, each of the 3D models including at least one sound source and at least one acoustic property; receive a plurality of impulse responses at a listening position in each of the plurality of rooms; and training the machine learning model for audio compensation using at least the plurality of impulse responses as input.

As discussed, one aspect of applying and using the acoustic simulation as discussed herein may be in obtaining HRTF for a person's head.

The geometry of a user's head comprises at least one ear geometry. The at least one ear geometry may be the main geometry of interest when determining HRTF since the sound wave arriving at the ear may encounter a plurality of obstacles in the ear itself before it reaches the ear drum through the ear canal. The plurality of obstacles may create absorption and/or reverberation of the sound wave which may modify the spectrum of the sound wave before it reaches the ear drum.

The wave-based solver is a discontinuous Galerkin finite element method-based solver. The discontinuous Galerkin finite element method may have a benefit of being able to handle efficient parallelization and the ability of handling complex geometries, which can be generated in either 2D or 3D. Other methods such as FDTD methods are efficient with parallel processing but cannot handle complex geometries. FEM, BEM, FVM can handle complex geometries but may not efficiently perform parallel computing.

In one embodiment, the wave-based solver determines the simulation of sound propagation simulation within an acoustic frequency range. The acoustic frequency range may be comprised between 20 Hz and 20 KHz, which is the audible frequency range. This audible frequency range may be different from person to person and can tend to decrease the older a person gets. This acoustic frequency range is determined based on the frequency range of interest when determining a HRTF, which can be preferably audible sounds.

The wave-based solver may determine the simulation of sound propagation within an acoustic frequency range. In one embodiment, the acoustic frequency range can be preferably comprised between 20 Hz and 200 Hz, but can also be comprised between 20 Hz and 100 Hz or more preferably between 20 Hz and 150 Hz.

In a second embodiment, the acoustic frequency range can be preferably comprised between 200 Hz and 2 kHz, but can also be comprise between 150 Hz and 1.5 kHz, more preferably between 100 Hz and 1 KHz.

In a third embodiment, the acoustic frequency range can be preferably comprised between 20 Hz and 20 kHz, more preferably between 20 Hz and 6 kHz, even more preferably between 20 Hz and 10 KHz.

In one embodiment, the simulation of sound propagation using a wave-based solver is configured to use the wave-based solver and/or the computer-implemented method for simulating the propagation of sound as described herein.

Disclosed herein is a computer implemented method of determining a head-related transfer function that may comprise: receiving a 3D model of a user's head; using a wave based solver for determining a plurality of wave based impulse responses from an impulse emitted at at least one sound source, each of the plurality of wave based impulse responses being determined at a corresponding head receiver of a plurality of head receivers; and determining a head-related transfer function (HRTF) for the user's head based on the plurality of wave based impulse responses received at the plurality of head receivers.

The 3D model of a user's head may further comprise a head mesh model, wherein the head mesh model can be received from an auxiliary computer implemented method for implementing the mesh. A position of the ear drum may be comprised in the 3D model of a user's head. For instance, the 3D model of a user's head may comprise an indication of the position of the ear drum of the user's head. Preferably, the 3D model of a user's head may comprise an indication of the two ear drums of the user's head. By comprising the position of the ear drum, preferably the two ear drums of the user's head, the computer implemented method can localize the position of the ear drums, thereby using the position of the ear drum to properly execute the computer implemented method of determining a head-related transfer function, since the ear drum is the key parameter when determining a head-related transfer function. An approximation of the position of the ear drums can also be received by the computer-implemented method. The computer-implemented method can further comprise a method for localizing the exact position of the ear drums when receiving the 3D model of a user's head.

In one embodiment, the wave-based solver can use a discontinuous Galerkin finite element method (DGFEM) or a spectral element method (SEM), both as described herein.

In one embodiment, determining a head-related transfer function further comprises obtaining a head mesh model representing the geometry of the user's head. Preferably, the head mesh model can be a 3D head mesh model. The geometry of the user's head may for example be a head mesh model representing the geometry of the user's head. Meshing can be understood as a common way of generating models in a digital environment such as computers. A mesh can be preferably a discretization of a geometry into small, simple shapes. Shapes can be triangles or quadrilaterals in 2D, and/or tetrahedra or hexahedra in 3D. A mesh density control can determine the appropriate mesh density, as too coarse a mesh may lead to inaccurate results, while an excessively fine mesh can increase computational cost and simulation time, or sometimes lead to a non-convergence of the simulation using the mesh.

A mesh can be understood as a polygon mesh, which is a collection of vertices, edges and faces that defines the shape of a polyhedral object. Throughout this patent application, the term mesh elements can be faces, such as triangles, quadrilaterals, other simple convex polygons, or any other combinations thereof.

In one embodiment, the head mesh model is a curvilinear head mesh model. The head mesh model may contain curvilinear mesh elements, which can reduce the geometric distortion introduced when meshing a curved boundary into discrete mesh elements. A mesh generation may be performed in order to get the head mesh model. The mesh generation is the practice of creating a mesh, a subdivision of a continuous geometric space into discrete geometric and topological cells. A mesh generation may generally be performed with straight-sided (affine) mesh elements. When using straight-sided mesh elements, a curved domain boundary of the mesh model may not be well represented unless an extremely fine mesh is used. An extremely fine mesh can lead to an undesirably high computational cost, and in some cases, an inability of making a simulation to converge while using the fine mesh. By utilizing curvilinear mesh elements, it may become possible to use large mesh elements with high basis orders, while at the same time being able to capture important geometrical details.

In particular curvilinear mesh has shown to be efficient for simulating sound propagation using a wave based simulation. The curved sides and edges provides high fidelity results. Together with the possibility to use larger meshes wave based solver applying finite element methods (FEM), such as a discontinuous Galerkin finite element method (DGFEM), a high-order discontinuous Galerkin finite element method or a spectral element method (SEM) as disclosed herein becomes particularly effective. Especially, it has been shown that DGFEM and SEM are specific finite element methods which are especially effective at handling curvilinear mesh elements.

A curvilinear mesh may be defined by curvilinear coordinates, as opposed to straight-sided mesh, which are defined using affine coordinates. Curvilinear coordinates are a coordinate system for Euclidean space in which the coordinate lines may be curved. These coordinates may be derived from a set of Cartesian coordinates by using a transformation that is locally invertible at each point. Well-known examples of curvilinear coordinate systems in three-dimensional Euclidean space are cylindrical and spherical coordinates.

Obtaining the 3D model of the user's head can be done in different ways. The user's head can for example be scanned in order to obtain the 3D model. The 3D model may have been digitally obtained by modelling the 3D model, e.g. using a CAD (Computer Aided Design) software. The 3D model may also have been obtained by loading a file onto the computer, e.g. an STL file which is a common format for storing digital models. The 3D model can also be obtained by capturing 3D images of the user's head with a camera, or any device being able to capture images, preferably 3D images.

In another embodiment, generating the head-related transfer function comprises arranging a digital representation of a head array comprising the plurality of digital representations of head receivers around the 3D model of the user's head, such as the head mesh model. The head array may be arranged such that the distance between any of the digital representations of the head receivers and the head mesh model is not below a predetermined distance.

In a preferred embodiment, receiving a 3D model of a user's head further comprises receiving the position of at least one sound source representing the ear drum or an approximation thereon in the 3D model.

In another embodiment, the computer implemented method further comprises determining on the head mesh model a first closest mesh element, which is closest to the ear drum. As described herein, the position of the ear drum may be received when receiving a 3D model of a user's head. Thereby, a spatial correlation between a first closest mesh element and the position of the ear drum can be performed.

In one embodiment the shape of the head array comprising the plurality of digital representations of head receivers is a sphere. Alternatively, the shape may be an off-set shape where the digital representations of the head receiver are placed/arranged at a predetermined off-set distance from the head mesh model. The predetermined off-set distance may be the same as the predetermined distance discussed herein.

The predetermined distance may for example comprise the radius of the head array and an additional distance in order to properly surround the head mesh model. This can for example be determined such that the distance from any head receiver on the head array to any point on the 3D model of the user's head is preferably not below the predetermined distance.

In one embodiment, the predetermined distance is between 0.5-1.5 meters, preferably 0.8-1.2 meters or most preferred 1 meter. Such predetermined distance has shown to be a good choice for general room simulations, or preferably for generating, determining and/or simulating a head-related transfer function.

The predetermined distance may for example be used to determine the ambisonics order N if this is used for encoding and decoding. For example, the ambisonics order N can be determined using the formula $N>2*pi*f*R(array)/c$, where 'f' is the considered frequency and 'c' is the sound speed. The sound speed is typically 343 m/s, but it can depend on temperature as well as the medium through which a sound wave is propagating. In that case, R(array) can be the predetermined distance. Determining the minimal order N can then be used to select the number of head receivers in the head array which is determined by $(N+1)^2$. This can for example be multiplied by a factor, e.g. 1.5 or 2.0 in order to obtain higher fidelity but also at the cost of increased simulation time.

When applying wave-based solvers to generate a head-related transfer function, it is generally the number of sound sources that determines the time and resources required to determine acoustic simulation. Thus, if the first closest mesh element representing the ear drum was set to function as a microphone, all the receivers in the head array would have to function as sound sources and emit an impulse signal. However, each of these would have to be solved individually and the time and resources used for solving would increase significantly based on the number of sound sources in the head array. Instead, for determining the head-related transfer function as discussed here, a first impulse signal may advantageously be emitted using the ear drum as a sound source, using the law of reciprocity.

In one embodiment where the 3D model of a user's head is a head mesh model, a first closest mesh, which is closest to the ear drum or the position of the ear drum on the 3D model of a user's head can be determined. The first closest mesh element may in one embodiment be used as a sound source for emitting the first impulse signal. By having and/or identifying a first closest mesh element closest to the ear drum on the 3D model of a user's head, a sound source for emitting the first impulse signal can be set up.

Based on the emitted first impulse response, a plurality of first impulse responses may thus be determined using a wave-based solver, where each first impulse response may describe the impulse response of the first impulse signal received at the respective head receiver.

The head-related transfer function for the ear drum may thus be generated by combining the plurality of first impulse responses.

The first impulse signal should preferably be a perfect impulse and have a flat spectrum. However, this may not be possible and in order to increase the fidelity of the head-related transfer function, the first impulse responses should preferably be source-corrected by a reference signal.

This can in one embodiment be done by arranging a digital representation of a first source correction microphone located at a first source distance from the first closest mesh element, where the first source distance is smaller than the predetermined distance.

A first source correction signal may thus be determined using a wave-based solver, where the first source correction signal describes the first impulse signal as received at the first source correction microphone.

A plurality of first source corrected head impulse responses can then be determined by source correcting each of the plurality of wave based impulse responses using the first source correction signal, and the first head-related transfer function of the user's head for the first ear drum can then be determined by combining the plurality of first source corrected head impulse responses.

In one embodiment, generating the head-related transfer function comprises determining an energy content for at least one frequency of the first head-related transfer function.

In one embodiment, determining the energy content for the at least one frequency of the head-related transfer function comprises determining different ambisonics orders corresponding to different levels of energy content.

In one embodiment, determining the energy content for at least one frequency of the head-related transfer function comprises determining the ambisonics order N for the energy content of the at least one frequency.

In a further embodiment, the ambisonics order N is determined for multiple frequencies, where the energy content for each frequency is determined.

In yet a further embodiment, determining the ambisonics order N for the energy content is based on determining the energy content as a sum of the ambisonics coefficients for each order N and then normalized to unity for each frequency.

In one embodiment, the energy content is determined for a range of frequencies, such as from 0 to 20 kHz, such as 0 to 10 kHz, such as 10 to 20 kHz, such as 0 to 9 kHz, such as 0 to 8 kHz, such as 0 to 7 kHz, such as 0 to 6 kHz, such as 0 to 5 kHz, such as 0 to 4 kHz, such as 0 to 3 kHz, such as 0 to 2 kHz, such as 0 to 1 kHz. Preferably, the range of frequencies may be comprised in the audible spectrum. The maximum frequency of the range may dictate the ambisonics order N to be chosen. Generally, a higher maximum frequency requires a larger ambisonics order N.

In one embodiment, the 3D model of a user's head comprises a plurality of ear drums, such as two ear drums. In such a case the computer implemented method as discussed herein is repeated for each ear drum. In other words, each of the plurality of ear drum can be treated as the ear drum such that a plurality of head-related transfer function is generated for the ear drums.

In one embodiment, determining a head-related transfer function comprises obtaining a 3D box model comprising high acoustic absorption surfaces, or a 3D box model with a predefined size such that the first impulse signal received from the sound source to each of the plurality of digital representations of head receivers do not comprise reflections caused by the surfaces of the 3D box model, arrange the head receiver array and the head mesh model in the 3D box model.

By obtaining a 3D box model comprising high acoustic absorption surfaces, the first impulse signal emitted from the first closest mesh element is not reflected by the surfaces of the 3D box model, thereby not being received by the digital representation of the head receiver array comprising a plurality of digital representations of head receivers. Preferably, the plurality of digital representations of head receivers may receive the incoming impulse signal and preferably not the reflections caused by any surfaces, obstacles or geometries external to the digital representation of the head receiver array. In another embodiment, the 3D box model has a predefined size such that the first impulse signal received from the sound source to each of the plurality of digital representations of head receivers do not comprise reflections caused by the surfaces of the 3D box model. The predefined size may be estimated such as the surfaces are far away from the plurality of digital representations of head receivers. Having a predefined size too high may be costly in terms of computation cost and time, thereby the predefined size should be estimated and/or calculated such as the simulation of the impulse signal propagation may get stopped before the impulse signal reaches the surfaces of the 3D box model or substantially reaches the surfaces of the 3D box model.

As an alternative, the 3D box model can be a 3D spherical model. Preferably, the 3D spherical model can consist of a sphere.

DESCRIPTION OF THE DRAWINGS

The invention will in the following be described in greater detail with reference to the accompanying drawings.

DETAILED DESCRIPTION OF THE DRAWINGS

Figure 1:
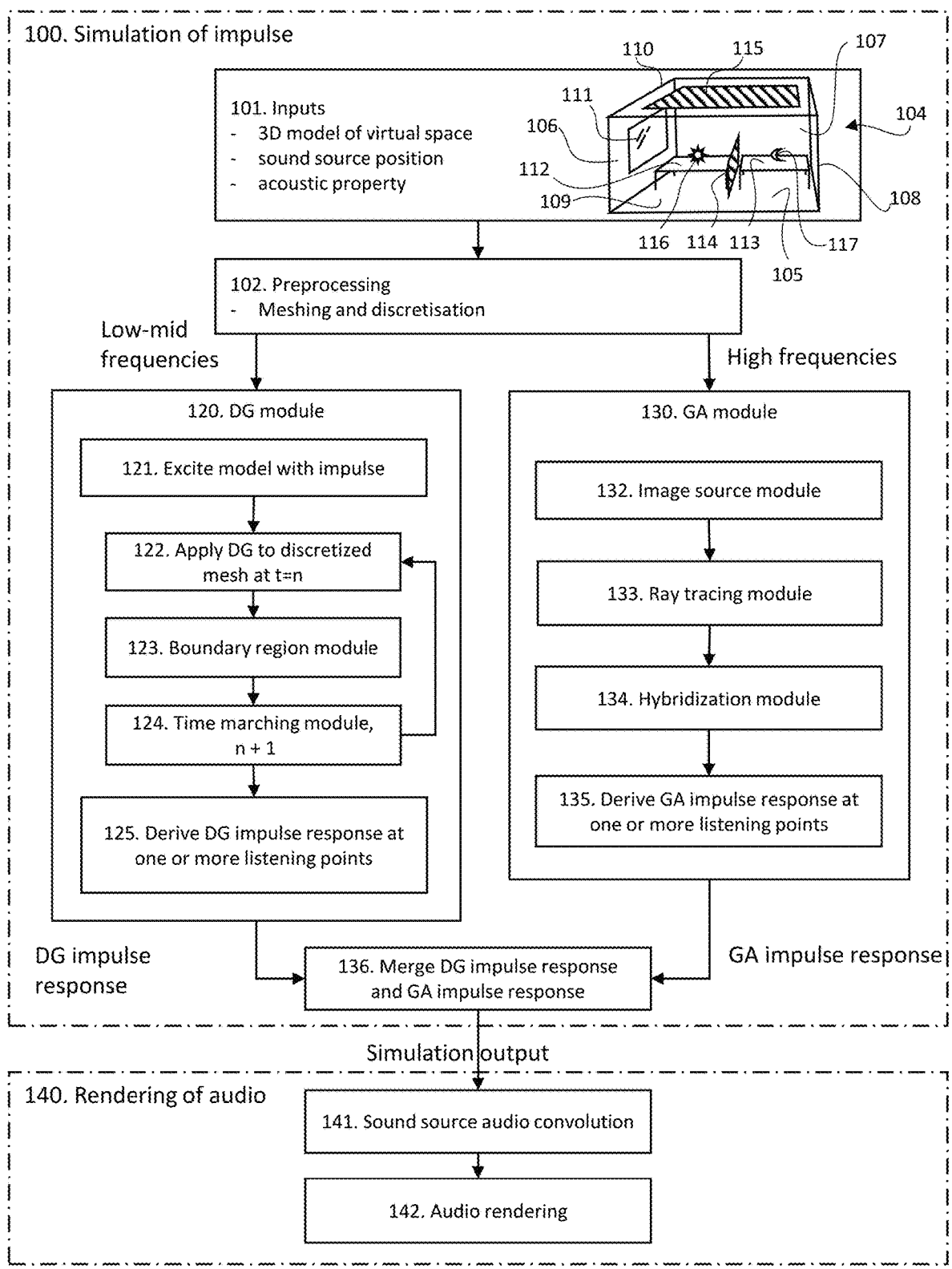
FIG. 1 shows a schematic view of an embodiment of a simulation and simple rendering of an acoustic wave propagation as described herein, FIGS. 2 and 3 illustrated schematically different embodiments of boundary models used to describe acoustic properties of the materials used in simulation.

In one embodiment as shown in FIG. 1 the simulation 100 comprises an input step 101 and a pre-processing step 102. The simulation subsequently branches into a DG (discontinuous Galerkin finite element method) module 120, which implements an embodiment of a finite element method (FEM) as described herein, for simulating wave propagation at low-mid frequencies and a GA (geometrical acoustic) module 130, which implements an embodiment of a geometrical acoustics solver as described herein, for simulating wave propagation at high frequencies.

The input is in the current embodiment a 3D model of the virtual space 104 for which a simulation is desired. As shown in FIG. 1 the virtual space is defined by a floor 105, four walls 106, 107, 108, 109 and a ceiling 110 such that the model is watertight. The outer boundaries defining the virtual space, i.e. walls, ceiling and floor are shown as transparent element in order to show the content of the virtual space. The 3D model of the virtual space further contains a window 111 arranged in one of the walls 106, two tables 112, 113, a room divider 114 arranged between the two tables 112, 113 and a sound absorbing ceiling tile 115 suspended from the ceiling 110. The different elements of the virtual space are described by their 3D shape in the 3D model but also described by respective acoustic properties which will be described later. In other words, each surface describing the different element defines a boundary in the model and the boundary properties described how the simulated sound is affected when it interacts with the boundary.

A sound source 116 is positioned at one of the tables 112. The sound source in the current embodiment is an omnidirectional sound source, i.e. the sound propagates in all directions. In other embodiments the sound source could for example be directional.

During pre-processing different data may be prepared for use in simulation. For example in the current embodiment the 3D model of the virtual space is converted into a curvilinear mesh model. The curvilinear mesh model has the advantage that sound reflected from rounded and curved surfaces are better simulated. Typically curved surfaces has been represented by a staircase model where horizontal and vertical faces approximates the curvature. From a modelling perspective this may be fine, e.g. if the resolution is high. However, when simulating acoustic waves this will always create an either vertical or horizontal surface on which the sound is reflected and even a high resolution cannot correct for this. Accordingly, by generated a curvilinear mesh model the boundary regions and surface can be simulated more detailed for curved and bent objects.

Also, the 3D model of the virtual space is described as a volumetric 3D model where the virtual space defining the 3D model is split/defined into discrete volumetric meshes or sub-domains providing a discretized volumetric mesh. In the current embodiment the volumetric meshes consist of an unstructured mesh of tetrahedral elements and the discretisation process will process the 3D model so that the tetrahedrals are as uniform as possible. As will be described, this advantageously improves the computation time when applying the DG method to the 3D model. As mentioned, other element shapes can also be used.

With the input received and prepared the simulation splits the simulation into two parts, a simulation at lower and mid frequencies using a waved based solver in the DG module 120 and a simulation at higher frequencies using a geometrical acoustics solver in the GA module 130.

The DG module 120 excites the volumetric model with an impulse 121 at the sound source position. As the impulse is excited in the volumetric model the DG method 122 is applied to the discretized mesh and a boundary region module 123 and a time marching module 124 is used to simulate the wave propagation of the impulse in the 3D model.

Applying the DG method to discretized mesh has the advantage that the DG method can be applied to each volume of the 3D model separate and independently and thus allows the method to be computed in parallel for each volume. This allow the computing time to be reduced drastically while still allowing for waveform based simulation to be performed.

In particular this has been found to be an advantageous aspect of the finite elements methods (FEM), such as the discontinuous Galerkin finite element method, as these improves the processing time considerable since each volume can be processed independently and thus in parallel to each other.

One important aspect of wave based simulation is how the wave propagation reacts at a boundary. A boundary should be understood as any change in material or substance in which the wave travels or that it hits or encounter. E.g. a boundary region can for example be a surface that reflects the sound, a surface or material that absorbs the sound or a surface that diffuses the sound.

When applying the DG to the volumetric model 122 the boundary region module 123 holds models describing the acoustic properties of the different materials in the 3D model of the virtual space.

Also, discretely applying the DG method to the volumetric 3D model would result in a simulation only showing the result at a specific point in time. Thus, in order to provide a temporal simulation a time marching module 124 is provided. The time marching module comprises one or more time marching algorithms that connects the temporal aspect with the of the DG method over time. The implementation of a time marching algorithm has been previously discussed herein.

The time marching module tells the system how the wave based propagation is simulated over time, thus the system will reiterate steps 122, 123 and 124 for the full duration of the simulation, i.e. until the wave based simulation is complete.

The duration of the simulation can be determined in different ways. One way is to simple decide to run the simulation for a predetermined time period. However, this will most likely create redundant simulation as the time will most likely be set such that it is ensured that the simulation is complete. E.g. where an impulse is simulated to determine an impulse response the time will be set such that it is ensured that all relevant information is obtained relevant to the impulse response.

However, in the current embodiment the global energy in the virtual space is determined each time the iteration arrives at step 124, and if the global energy level is below a certain threshold then the method will proceed to step 125.

When the DG has been applied to the volumetric model as described the result is a simulation of the wave propagation of the impulse from the sound source position and throughout the 3D model of the virtual space. Thus, for any listening position in the virtual space the impulse response can be derived 125 as the simulation can be played back while recording the impulse response of the sound source position at that listening point, for example at the table 113 as indicated by the listening point location 117.

At the higher frequencies the simulation is performed in the GA module 130. A discussed previously the advantage of using a geometrical acoustic method at higher frequencies is that the wave propagation is treated as ray propagation whereby ray tracing can be used and thus reduce the processing time considerably for the higher frequencies where the diffraction, diffusion and other wave based principles does not occur with the same effect as in the lower frequencies and thus can be considered as negligible. Depending on e.g. the application, use and type of rendering which the simulation is used for the frequency interval defining the lower and respective high frequency may differ and chosen in order to provide the best result and a desired speed for the specific case.

As the geometrical acoustics solver (GA module) considers the energy decay of the sound propagation the model is not excited with an impulse as in the DG module. Instead the decay information is derived and used to establish an impulse response. The simulation in the current embodiment is performed using an image source process in the image source module 132 and subsequently by a ray tracing algorithm in the ray tracing module 133.

Both the image source process and the ray tracing algorithm estimates the sound propagation as rays, e.g. specular reflections. However, the image source process is more accurate as it determines the exact specular reflections wherein the ray tracing is less exact as it is a stochastic method. Thus, in the current embodiment the image source is used for the first couple of reflections of the rays where the energy of the ray is high and the ray tracing method is used for the remaining reflections until the simulation is stopped.

The result from the image source simulation and the ray tracing simulation is then hybridized into one simulation in the hybridization module 134 whereby a simulation of the wave propagation of the impulse at the high frequencies can be established.

Similarly to the DG module step of deriving the impulse response 125, the impulse response of the GA method is derived in step 135.

The DG impulse response and the GA impulse response are merged or hybridized 136 into one simulated impulse response.

The simulated impulse response can be used to render sound 140. As discussed rendering the sound can be done in many different way. In the current embodiment one of the simplest way is shown where the simulated impulse response is convoluted with the sound source audio 141. This is a common way to provide a sound scape to a sound file and thus provide an audio rendering 142 that gives an audible experience of standing at the position where the impulse responses were registered 117 and listening to the audio coming from the sound source position.

Figure 2:
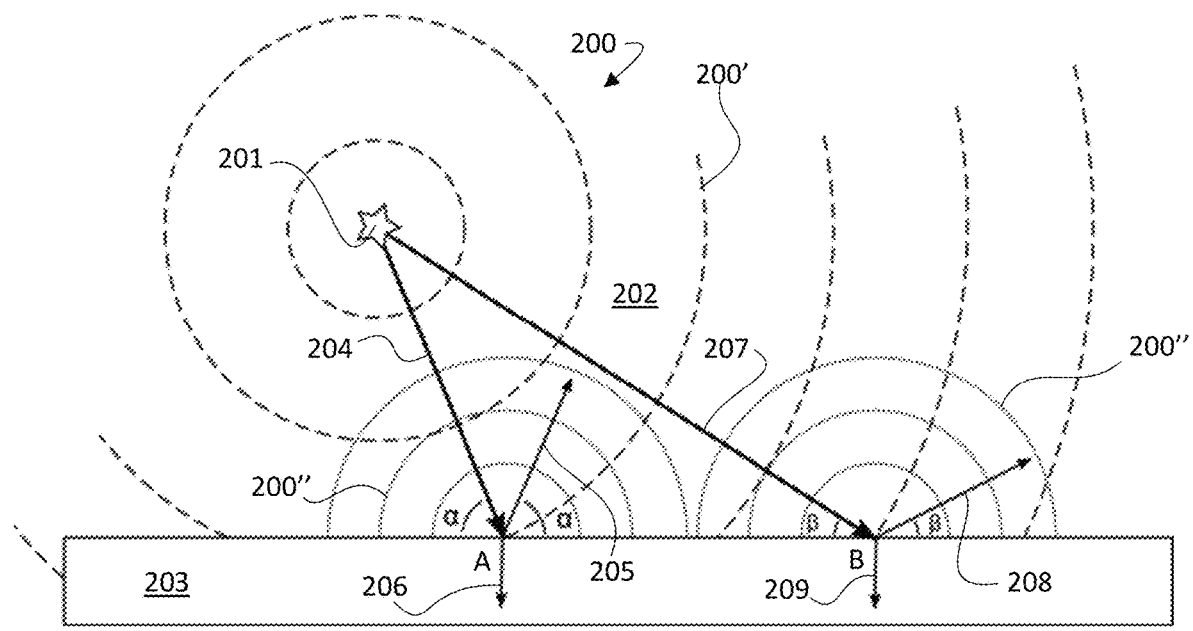
Figure 3:
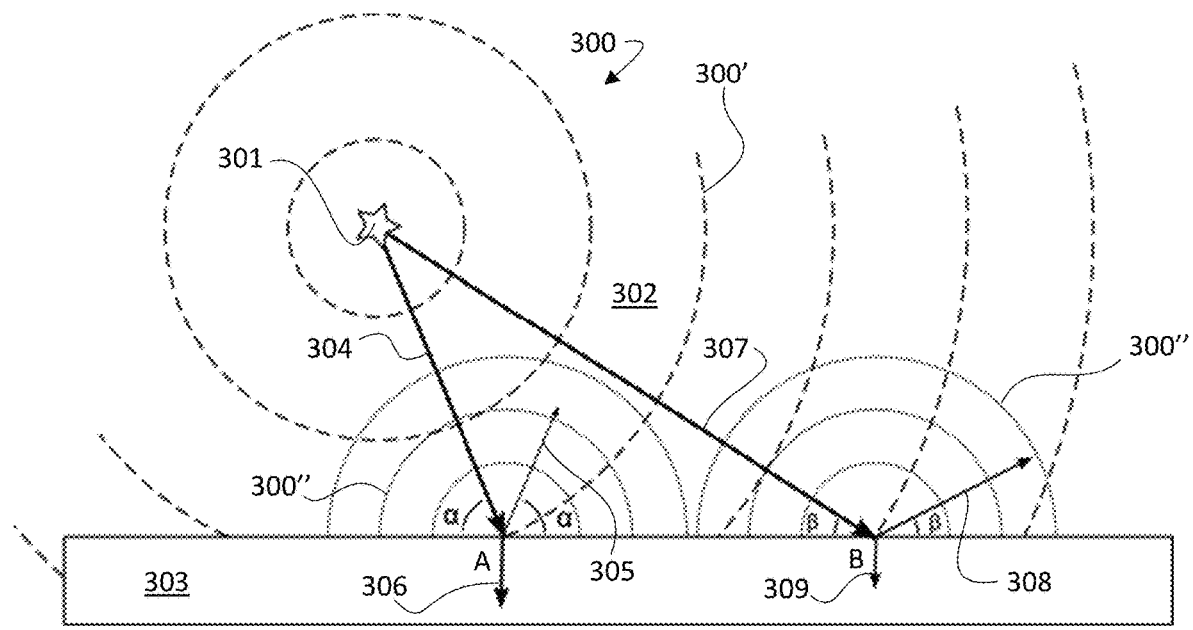

FIGS. 2 and 3 shows two different embodiments of boundary absorption models that can be used to describe the acoustic properties of materials as the acoustic wave hits the surface/boundary of the material.

FIG. 2 illustrates a boundary surface model where a sound wave 200 emitted from a sound source 201 travelling through a material 202 and hits a second material 203. The direct sound wave 200' is indicated by broken circle segment and the $1^{st}$ order reflection 200" of the sound wave is indicated by broken circle segments having a higher number of broken segments.

The boundary surface model is in the current embodiment considered at two points A and B on the surface of the second material 203. However it should be understood that the incident sound wave 200 hits the surface of the second material across the entire surface facing the sound source 201. Thus similar considerations can be done for any point on the surface of the second material.

At point A first reflection occurs along the first incident direction 204 at an incident angle $\alpha$. The sound wave is reflected of the surface along the first reflected direction 205. Some of the energy is absorbed by the second material as indicated by the arrow 206.

Similarly, at point B a first reflection occurs long a second incident direction 207 at an incident angle $\beta$. As can be seen the incident angle β is different from the incident angle α. The sound wave at point B as reflected of the surface along a second reflected direction 208 and some of the energy is absorbed by the second material as indicated by the arrow 209.

In the current embodiment a boundary absorption model is used where the sound reflected 205, 208 is same and independent of the incident angle and thus, the sound and energy absorbed 206, 209 is the same.

Such an absorption model is suitable for highly reflective materials, e.g. hard even surface such as glass, brick and metal.

An identical setup, but with a different second material 303 is shown in FIG. 3 where the energy absorbed and reflected changes depending on the angle of the incident sound wave at the specific point on the surface.

Similarly to FIG. 2, FIG. 3 illustrates a sound wave 300 emitted from a sound source 301 travelling through a material 302 and hits a second material 303. The direct sound wave 300' is indicated by broken circle segment and the $1^{st}$ order reflection 300" of the sound wave is indicated by broken circle segments having a higher number of broken segments.

The boundary surface model is in the current embodiment considered at two points A and B on the surface of the second material 303. However it should be understood that the incident sound wave 300 hits the surface of the second material across the entire surface facing the sound source 301. Thus similar considerations can be done for any point on the surface of the second material.

At point A first reflection occurs along the first incident direction 304 at an incident angle α. The sound wave is reflected of the surface along the first reflected direction 305. Some of the energy is absorbed by the second material as indicated by the arrow 306.

Similarly, at point B a first reflection occurs long a second incident direction 307 at an incident angle β. As can be seen the incident angle β is different from the incident angle α. The sound wave at point B as reflected of the surface along a second reflected direction 308 and some of the energy is absorbed by the second material as indicated by the arrow 309.

In the current embodiment a boundary absorption model is used where the sound reflected 305, 308 is different dependent on the incident angle and thus, also the sound and energy absorbed 306, 309 is different.

This characteristic is for example found for surfaces of porous materials, such as many sound insulating materials, as the uneven surface breaks and scatters the reflection, in particular when the incident angle of the sound wave is low.

Also, some materials may further propagate a wave, e.g. if the sound wave initially travels through air and hits a water body, the transition between air and water will be described with a boundary absorption model as discussed above, however, the water will further propagate the sound wave with different characteristics than air, for example sound in water travels faster than sound in air and the energy loss is smaller.

Although not shown in the above models as they focus on illustrating the boundary absorption and reflection between two materials there will typically also be an energy loss considered in the simulation that is dependent on the distance travelled by the sound wave. Thus, the energy of the direct sound wave at point B in the above embodiment will typically be less than the energy of the direct sound wave at A since the sound wave have travel a longer distance when reaching point B.

Figure 4:
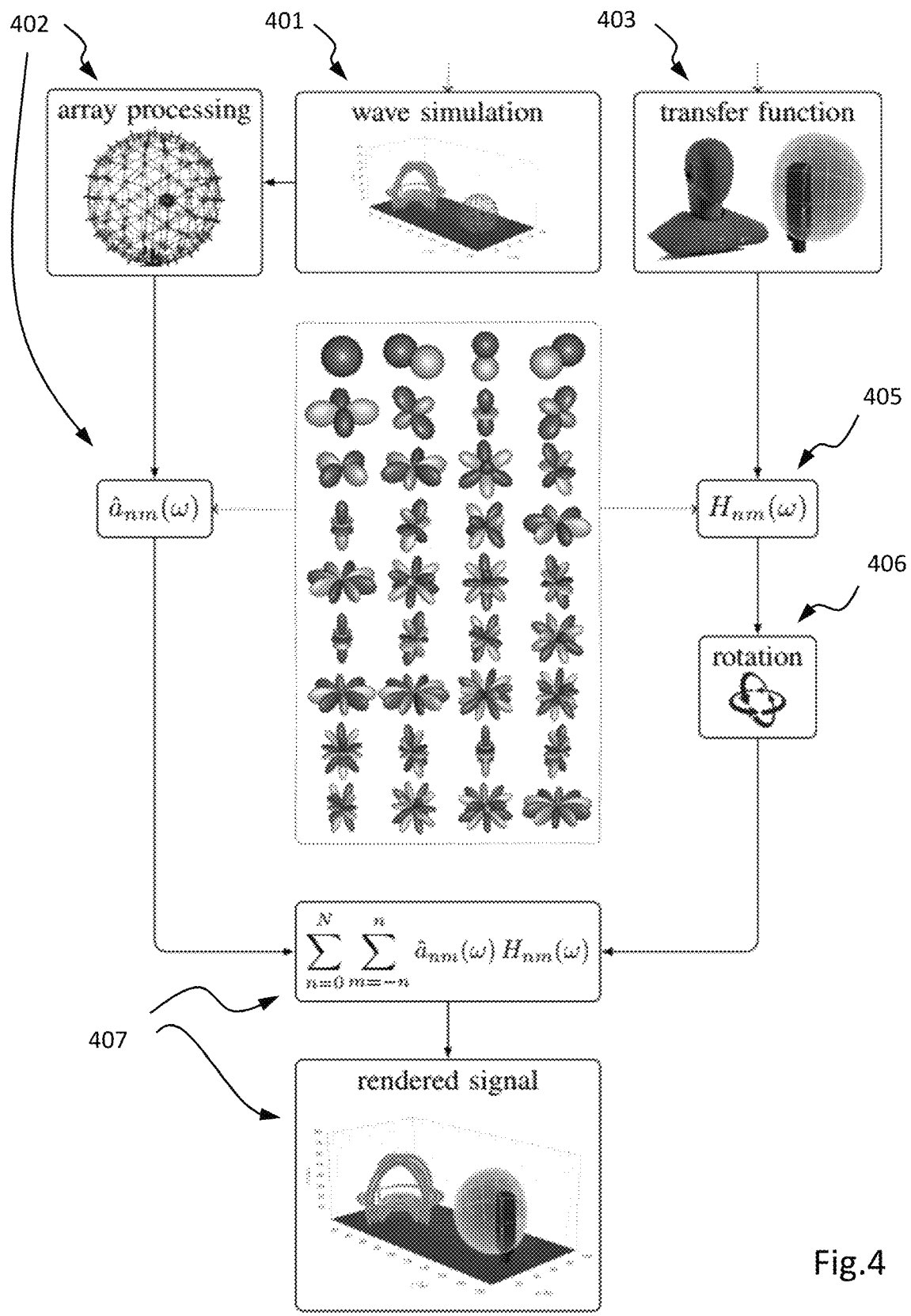
FIG. 4 shows a diagram of an embodiment of a method used to spatially render signals from wave-based simulations.

FIG. 4 shows a diagram of an embodiment of a method used to spatially render signals from wave-based simulations. Preferably, a broadband wave-based acoustics framework is illustrated in FIG. 4, where the broadband wave-based acoustics framework may be used to obtain spatial room impulse responses. The spatial room impulse responses can then be encoded into spherical harmonics contributions 402, potentially resulting in a high-order ambisonics formulation, which can be combined with free-field head-related transfer functions (HRTFs) 403,405 for binaural rendering 407. The binaural rendering or binaural auralization can in this embodiment be understood as being a combination of transfer functions and impulse responses, e.g. the spatial impulse response generated for the specific room at a listening and an HRTF. An anechoic signal can be convolved with the binaural auralization (not shown) in order to generate the rendered sound at the listening point.

The broadband wave-based acoustics framework may also be used for multi-channel rendering, where a high-order ambisonics formulation can be combined with transfer functions comprising more than two channels. In other terms, while HRTF comprises two receivers or two channels, other transfer functions could potentially comprise more than two receivers or channels, and may be used in the broadband wave-based acoustics framework as illustrated in FIG. 4, thereby enabling a multi-channel rendering.

Wave-Based Simulation

The wave-based simulation 401 that may be used in the embodiment as illustrated in FIG. 4 may be the wave-based simulation as described herein. Preferably, the wave-based simulation 401 may be a discontinuous Galerkin finite element method, which can be also described as a discontinuous Galerkin method. Preferably, the wave-based simulation can simulate the acoustic wave over a large frequency range, such as the first frequency range, such as between 20 Hz to 20 kHz, such as between 20 Hz and 10 KHz, such as between 20 Hz and 8 kHz, such as between 50 Hz and 8 kHz, such as between 100 Hz and 8 kHz. As described herein, the discontinuous Galerkin finite element method may have a benefit of being able to handle efficient parallelization and the ability of handling complex geometries, which can be generated in either 2D or 3D.

As shown in FIG. 4, a wave-based simulation 401 is first executed with one or several virtual spherical microphone arrays 402 embedded into a 3D model of a domain, centered on a given location. The 3D model of the domain may also comprise at least one sound source and acoustic properties of a plurality of boundaries. The wave-based simulation 401 can simulate the sound field from the at least one sound source into the 3D model of the domain. The given location would preferably be the listening point.

The wave-based simulation may be executed by a wave-based solver, as described herein. The wave-based solver may determine a wave impulse response of the wave based propagation of an impulse emitted at the at least one sound source in the 3D model of the domain and received at the listening point within a first frequency range.

Spatial Rendering and Further Processing

The wave amplitude density $\hat{a}(\omega, \Gamma_k)$ where ω represents the angular frequency and $(\Gamma_k)$ being the angle pair informs about the spatial properties of the sound field around a given location. More information about the wave amplitude density can be found in [18]. The wave amplitude density can be processed, for instance, to allow binaural auralizations by reconstructing the sound field that would have reached the eardrums of a virtual listener embedded into a virtual room, and preferably located at a listening point or a given location within the virtual room. Such a spatial rendering may be obtained by weighting the different wave contributions based on their direction of incidence ($\Gamma_k$), which can be described mathematically as a multiplication between the wave amplitude density and a complex transfer function $H(\omega, \Gamma_k)$ accounting for variations in amplitude and phase. H may be the HRTF 405 associated with each ear. The rendered signal $\hat{p}_r(\omega)$ can be expressed directly from the plane-wave expansion as $$\hat{p}_r(\omega) = \oint_{S^2} H(\omega, \Gamma_k) \hat{a}(\omega, \Gamma_k) d\Gamma_k, \tag{14}$$

Where the dependence on the position r is omitted since the expansion can be evaluated, without loss of generality, at r=0 (i.e., the center of the head is assumed to be located at the origin of the coordinate system). In other words, $\hat{a}(\omega, \Gamma_k)$ is here used to represent the sound field at the location of the center of the head, while by definition $H(\omega, \Gamma_k)$ may relate the center of the head to each eardrum.

Equation (14) can be evaluated directly in the spherical Fourier domain by first introducing $H_{nm}(\omega)$, the projection of $H(\omega, \Gamma_k)$ against the basis functions $Y_n^m$:

$$H(\omega, \Gamma_k) = \sum_{n=0}^{\infty} \sum_{m=-n}^{n} H_{nm}(\omega) Y_n^m(\Gamma_k) \tag{15}$$

After replacing in Equation (14), it can be shown that thanks to the orthogonality property of the $Y_n^m$ functions, the spatial rendering equation 407 becomes after some algebra:

$$\hat{p}_r(\omega) = \sum_{n=0}^{\infty} \sum_{m=-n}^{n} \hat{a}_{nm}(\omega) H_{nm}(\omega) \tag{16}$$

Finally, after truncation up to order N, this amounts in the time domain to computing $(N+1)^2$ convolution integrals of the form $$p_r(t) \simeq \sum_{n=0}^{\infty} \sum_{m=-n}^{n} (a_{nm} * h_{nm})(t) \tag{17}$$

with $a_{nm}(t)$ and $h_{nm}(t)$ the impulse response functions of $\hat{a}_{nm}(\omega)$ and $H_{nm}(\omega)$, respectively; both impulse responses are real-valued for the real basis functions defined previously. The coefficients $a_{nm}(t)$ are more commonly known as "the ambisonics coefficients" and can be defined as a spatial impulse response.

The ability to spatially render simulation data may require an estimate of the wave amplitude density.

Array of Receivers and Processing

An array of secondary receivers 402 may be placed around the sampling location or the listening point to encode the sound field, as illustrated in FIG. 4. The secondary receivers can be microphones. Consider an open sphere array of radius R consisting of Q receivers sampling the domain at location $r_q=(R, \Gamma_q)$ with $1 \le q \le Q$. The signal $\hat{s}(r_q, \omega)$ recorded by microphone q follows a relation in the form $$\hat{s}(r_q, \omega) = \sum_{n=0}^{\infty} \sum_{m=-n}^{n} a_{nm}(\omega) b_n(kR) Y_n^m(\Gamma_q) \tag{18}$$

with the radial functions $b_n(kR)$. For an ideal nondirectional receiver of unity gain, the sampled signal is identical to the local pressure fluctuations and thus, the radial functions are given as $b_n(kR) = 4\pi i^n j_n(kR)$.

Taking the inverse Fourier transform of (18) directly yields an estimate for the ambisonics coefficients as $$\hat{a}_{nm}(\omega) = \frac{1}{b_n(kR)} \oint_{S^2} \hat{s}(r_q, \omega) Y_n^m(\Gamma_q) d\Gamma_q \tag{19}$$

The surface integral in (19) can either be evaluated via a direct integration or the coefficients can be estimated globally in a least-square sense. Equation (19) shows that a division by $b_n$ is required to compute the coefficients $a_{nm}$ of matching order n. This operation is inherently ill-conditioned whenever the radial functions are zero or have a low magnitude, and can constitute a fundamental limitation of the open-array design considered here since the spherical Bessel functions $j_n(kR)$ can be zero for some frequencies. Rigid-sphere array configurations can be used in measurements to circumvent the nulls of the radial functions, but such an approach is less suitable in simulations considering it requires meshing the surface of a sphere. Moreover, the resulting array would not be acoustically transparent.

Another solution to enhance the robustness of the spatial encoding procedure may consist in an open-sphere array of directional receivers with a first-order cardiod directivity pattern. For the latter, it can be shown that the radial functions become $$b_n(kR) = 4\pi i^n [j_n(kR) - ij'_n(kR)] \tag{20}$$

where $j'_n(\bullet)$ denotes the derivative of $j_n(\bullet)$ with respect to the argument. This relation effectively prevents the nulls occurring with nondirectional receivers. A first-order cardiod directivity pattern can easily be obtained from simulations by sampling the pressure field $p(r_q, \omega)$ as well as the radial particle velocity $\hat{v}_r(r_q, \omega)$. The signal recorded at the sampling locations can be obtained as $$\hat{s}(r_q, \omega) = \hat{p}(r_q, \omega) + \rho_0 c \hat{v}_r(r_q, \omega) \tag{21}$$

which can be understood as the superposition of an omnidirectional and a bidirectional microphone. The radial functions for the open cardioid array configuration can still have a low magnitude: an additional regularization procedure is therefore applied to the radial functions, to prevent an excessive amplification of the noise present in the simulations.

The number of receivers Q in the array directly determines the maximum truncation order N that can be considered for the spherical harmonics decomposition. The sound field must be sampled with at least as many receivers as the number of terms used for the expansion, leading to $Q \ge (N+1)^2$. This condition is necessary to avoid undersampling but does not necessarily guarantee accuracy. The optimal number of sampling points depends on the chosen quadrature rule; an exact integration can for instance be performed with a Gauss quadrature for $Q \ge 2(N+1)^2$, but other approaches can require less samples. Another constraint may pertain to spatial aliasing, which can occur if the recorded sound field $\hat{s}(r_q, \omega)$ is not order-limited but admits non-zero spherical harmonics coefficients for orders higher than N. In this case, the higher modes will be aliased to the lower modes and may degrade the quality of the decomposition. Aliasing can be mitigated by choosing a sufficiently large N, or with dedicated anti-aliasing spatial filters.

FIG. 4 shows a diagram of an embodiment of a method used to spatially render acoustic signals from wave-based simulations. Once the wave-based simulation is completed, the results are post-processed to extract the wave amplitude density coefficients by solving Eq. (19), based on a projection against spherical harmonics basis functions. The spatial rendering equation (16), or, equivalently, (17), can be evaluated to account for a given binaural HRTF dataset (with a given orientation) in the wave-based simulation. A spatial rendering can then be obtained by convolving the binaural HRTF dataset in the wave-based simulation with an audio signal to be spatially rendered. A plurality of balloon plots are illustrated in the center of the figure to depict the shape of the considered spherical harmonics basis functions up to n=5.

The HRTF dataset 405 may comprise different orientation data. Preferably, the HRTF dataset can be simulated or measured with a HRTF reference. The HRTF reference may be uncorrelated with the ambisonics coefficient, thereby potentially unmatching the ambisonics coefficient reference when solving the spatial rendering equation. Thereby, a rotation of the HRTF reference 406 may be necessary in order to align the HRTF reference with the ambisonics coefficient reference. If the HRTF reference is not aligned with the ambisonics coefficient reference, the rendered signal may be generated with an offset, thereby generating a wrong audio rendering feeling to the user.

In parallel to the wave-based simulation and binaural auralization as described, a geometrical acoustics based simulation may also be performed for a second frequency range. The final result can thus be a hybridization of a geometrical-acoustics based simulation with a wave-based simulation. The hybridization can for example be the hybridization as described in the present disclosure.

Figure 5:
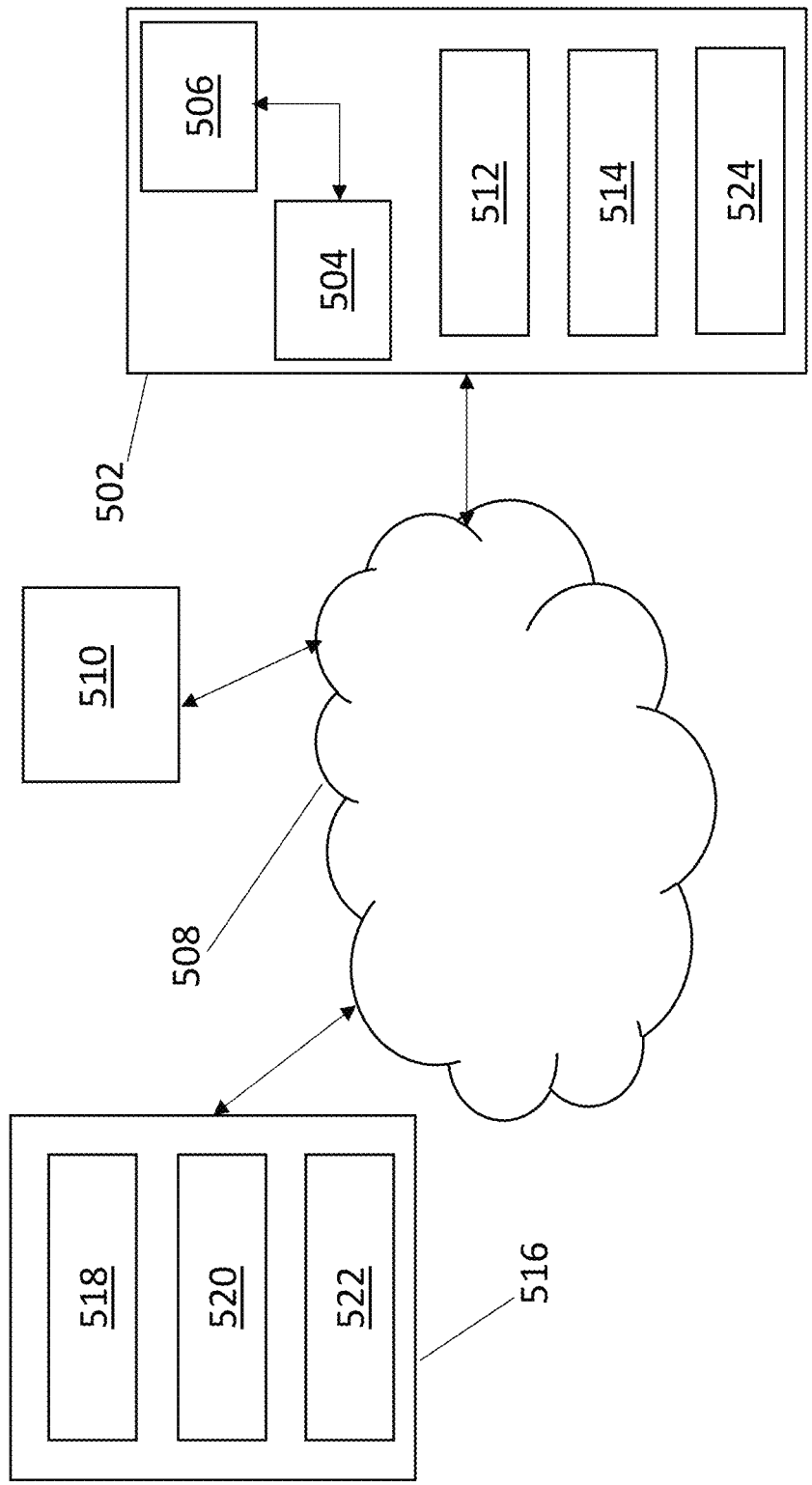
FIG. 5 shows a system in accordance with an embodiment of the present invention.

FIG. 5 shows a system 500 in accordance with an embodiment of the present invention. System 500 includes a computer system 502. Computer system 502 includes specialized hardware and/or software modules that execute on a processor 504 coupled to a memory 506. The computer system 502 may also be communicatively coupled to a communications network 508. Network 508 may be a public network, such as the internet, or it may be a private network, such as a network internal to a company. Network 508 also may be a combination of public and/or private networks. The computer system 502 may be coupled to the network 508 directly, for example via an Ethernet cable or via wireless connection such as Wi-Fi. Computer system 502 may also be coupled to the network 508 in any other way known to the skilled person, for example indirectly through another device (not shown), such as, but not limited to, a router, a switch, a hub, a separate computer system, a mobile device, a modem, and/or a combination of these devices. The processor 504 is configured to execute any of the methods described in detail throughout the present disclosure.

The computer system 502 further includes one or both of an impulse response generation module 512, a neural network training module 514 and a HRTF generation module 524, both executing on processor 504. While all modules are shown in FIG. 5, it is expressly noted that only the impulse response generating model 512 or only the neural network training module 514 or the HRTF generation module 524 may be present. The impulse response generation module 512 is configured to execute one or more methods for generating an impulse response as described above in detail. Exemplarily, the impulse response generation module may also include at least one of a wave-based solver and a geometrical acoustics-based solver. The neural network training module 514 is configured to execute one or more methods for training a machine learning model for audio compensation as described above in detail. The HRTF generation module 524 is configured to execute one or more methods for generating an HRTF as described above in detail. In some embodiments, modules 512, 514 and 524 are specialized sets of computer software instructions programmed onto one or more dedicated processors in computer system 502 and can include specifically designed memory locations and/or registers for executing the specialized computer software instructions.

Although modules 512, 514 and 524 are shown in FIG. 5 as executing within the same computer system 502, it is expressly noted that the functionality of modules 512, 514 and 524 can be distributed among a plurality of computer systems. Computer system 502 enables modules 512, 514 and 524 to communicate with each other in order to exchange data for the purpose of performing the described functions. It should be appreciated that any number of computing devices, arranged in a variety of architectures, resources, and configurations (e.g., cluster computing, virtual computing, cloud computing) can be used without departing from the scope of the invention. Exemplary functionality of modules 512, 514 and 524 is described in detail throughout the specification.

In some embodiments, a machine learning model 510 is coupled to the network 508, as shown in FIG. 5, or included in computer system 502. The machine learning model 510 may be a single architecture or it may be a combination of a plurality of neural network architecture. For example, the machine learning model 510 may include a first neural network architecture and a second neural network architecture that are different entities. The machine learning model 510 is configured to provide and/or execute the functions described in detail above. The machine learning model 510 may be coupled to the network 508 as shown here and communicate with computer system 502 over the network 508, but it is also expressly contemplated that the machine learning model is part of computer system 502. The impulse response generation module 512 and/or the neural network training module 514 and/or the HRTF generation module 524 communicate with the machine learning model 510 in order to exchange data for the purpose of performing their described functions. It is also expressly noted that the functionality of the machine learning model 510 may be distributed among a plurality of computer systems. Similar to what is noted above with reference to modules 512, 514 and 524, any number of computing devices, arranged in a variety of architectures, resources, and configurations may be used without departing from the scope of the invention.

In some embodiments, an audio device 516 is coupled to the network 508. The audio device 516 includes one or both of a microphone 518 and a speaker 520. The audio device 516 may also include a processing system 522. The audio device and 516 and/or its processing system 522 may be configured to apply machine learning-based audio compensation as described in detail above. To this end, the audio device 516 and/or the processing system 522 may be communicatively coupled to a machine learning model, such as machine learning model 510, to transmit data to the model and receive data from the model. Illustratively, the audio device 516 is shown in FIG. 5 as coupled to network 508, for example by use of a communication module. However, it is expressly contemplated that the audio device 516 may not be coupled to network 508. Illustratively, the audio device 516 may include a machine learning model substantially similar to machine learning model 510 configured to apply machine learning-based audio compensation as described in detail above. While only one microphone 518 and one speaker 520 is shown in FIG. 5, it is noted that the audio device 516 may include more than one microphone and/or more than one speaker.

REFERENCE LIST

[1] F. Pind, A. P. Engsig-Karup, C. H. Jeong, J. S. Hesthaven, M. S. Mejling, and J. Strømann-Andersen. "Time domain room acoustic simulations using the spectral element method". In: The Journal of the Acoustical Society of America 145.6 (2019), pp. 3299-3310.

[2] G. Gabard and E. J. Brambley. "A full discrete dispersion analysis of time-domain simulations of acoustic liners with flow". In: Journal of Computational Physics 273 (2014), pp. 310-326.

[3] D. Dragna, P. Pineau, and P. Blanc-Benon. "A generalized recursive convolution method for time-domain propagation in porous media". In: The Journal of the Acoustical Society of America 138.2 (2015), pp. 1030-1042.

[4] H. Wang and M. Hornikx. "Time-domain impedance boundary condition modeling with the discontinuous Galerkin method for room acoustics simulations". In: The Journal of the Acoustical Society of America 147.4 (2020), pp. 2534-2546.

[5] M. Cosnefroy. "Propagation of impulsive sounds in the atmosphere: numerical simulations and comparison with experiments". Partly in French. PhD thesis. École Centrale de Lyon, 2019.

[6] F. Pind, C.-H. Jeong, A. P. Engsig-Karup, J. S. Hesthaven, and J. Strømann-Andersen. "Time-domain room acoustic simulations with extended-reacting porous absorbers using the discontinuous Galerkin method". In: The Journal of the Acoustical Society of America 148.5 (2020), pp. 2851-2863.

[7] F. Pind, C.-H. Jeong, J. S. Hesthaven, A. P. Engsig-Karup, and J. Strømann-Andersen. "A phenomenological extended-reaction boundary model for time-domain wave-based acoustic simulations under sparse reflection conditions using a wave splitting method". In: Applied Acoustics 172 (2021), p. 107596.

[8] T. W. J. S. Hesthaven. Nodal Discontinuous Galerkin Methods. Springer-Verlag GmbH, 2007.

[9] H. L. Atkins and C.-W. Shu. "Quadrature-Free Implementation of Discontinuous Galerkin Method for Hyperbolic Equations". In: AIAA Journal 36.5 (1998), pp. 775-782.

[10] A. Jameson and T. Baker. "Solution of the Euler equations for complex configurations". In: 6th Computational Fluid Dynamics Conference. American Institute of Aeronautics and Astronautics (AIAA), 1983.

[11] F. Q. Hu. "Low-dissipation and low-dispersion Runge-Kutta schemes for computational acoustics". In: Journal of Computational Physics 124.1 (1996), pp. 177-191.

[12] J. Berland, C. Bogey, and C. Bailly. "Low-dissipation and low-dispersion fourth-order Runge-Kutta algorithm". In: Computers & Fluids 35.10 (2006), pp. 1459-1463.

[13] H. Wang, M. Cosnefroy, and M. Hornikx. "An arbitrary high-order discontinuous Galerkin method with local time-stepping for linear acoustic wave propagation". In: The Journal of the Acoustical Society of America 149.1 (2021), pp. 569-580.

[14] A. Melander and E. Strøm. "Massively Parallel Nodal Discontinous Galerkin Finite Element Method Simulator for Room Acoustics". MA thesis. Technical University of Denmark, 2020.

[15] J. S. Hesthaven and T. Warburton, Nodal Discontinuous Galerkin Methods-Algorithms, Analysis, and Applications (Springer, New York, 2008), Chap. 3.

[16] H. Kuttruff, "Room Acoustics: 6th edition", Dec. 10, 2019, CRC Press.

[17] F. Pind, "Wave-based Virtual Acoustics", 2020, Technical University of Denmark—orbit.dtu.dk/en/publications/wave-based-virtual-acoustics.

[18] S. Bilbao, A. Politis, and B. Hamilton. "Local time-domain spherical harmonic spatial encoding for wave-based acoustic simulation". IEEE Signal Processing Letters 26.4 (2019), pp. 617-621.

[19] L. Savioja and U. P. Svensson. Overview of geometrical room acoustic modelling techniques. J. Acoust. Soc. Am., 138:708-730, 2015.

Further Details of the Invention

1. A wave based solver for simulating the propagation of sound in at least one model of a virtual domain based on at least one sound source in the virtual domain and at least one acoustic property of the virtual domain, wherein the wave based solver comprises a finite element method (FEM), such as a discontinuous Galerkin finite element method (DGFEM) or a spectral element method (SEM).

2. The wave based according to item 1, wherein the virtual domain is a one dimensional (1D) domain, a two dimensional (2D) domain or a three dimensional (3D) domain such as a three dimensional model (3D) of a virtual space.

3. The wave based solver according to item 1, wherein the 3D model of the virtual space defines boundary surfaces of an air volume.

4. The wave based solver according to item 1 or 2, wherein the boundary surfaces are meshes, thus representing the 3D model of a virtual space as a 3D mesh model.

5. The wave based solver according to item 4, wherein the 3D mesh model is curvilinear.

6. The wave based solver according to any one of the items 3-5, wherein the air volume is represented as a volumetric 3D mesh model.

7. The wave based model according to item 6, wherein a qualitative evaluation is provided on the volumetric 3D mesh model evaluating critical areas of sound propagation.

8. The wave based solver according to any one of the items 1-7, wherein the virtual space is numerically discretized into sub-domains using an acoustic wave equation module.

9. The wave based solver according to any one of the items 2-8, wherein the volumetric 3D mesh model of the air volume represents discretized sub-domains.

10. The wave based solver according to item 8 or 9, wherein the FEM is applied to each sub-domain separately.

11. The wave based solver according to any one of the items 1-10, wherein the wave based solver comprises a locally-reacting frequency dependent boundary modelling sub-module for simulating the propagation of sound at at least one first boundary region comprising a first material.

12. The wave based solver according to any one of the items 1-11, wherein the wave based solver comprises an extended-reacting frequency sub-module for simulating the propagation of sound at at least one second boundary region comprising a second material.

13. The wave based solver according to item 12, wherein the extended-reacting frequency dependent boundary modelling sub-module is configured to model the second material with fluid structure acoustic simulations.

14. The wave based solver according to any one of the items 12-13, wherein the second material is a porous material.

15. The wave based solver according to any one of the items 1-14, wherein the 3D model comprises at least one directive sound source for emitting sound in a defined direction.

16. The wave based solver according to any one of the items 1 to 15, wherein the wave based solver comprises a time marching sub-module comprising at least a first time marching method for simulating the propagation of sound in time and space.

17. The wave based solver according to item 16, wherein the time marching sub-module comprises a second time marching method for simulating the propagation of sound in time and space, wherein the first time marching method comprises a standard low-storage explicit Runge-Kutta algorithm and the second time marching method comprises an implicit-explicit time marching algorithm.

18. The wave based solver according to any one of the items 1-17, wherein each sub-domain is solved independently on a central processing unit (CPU) and/or a graphical processing unit (GPU).

19. The wave based solver according to any one of the items 1-18, wherein a message passing interface (MPI) is configured to handle communication between central processing units (CPUs).

20. The wave based solver according to item 19, wherein the communication handled by the MPI is performed following a halo exchange.

21. The wave based solver according to any one of the items 1-20, wherein the wave based solver further comprises extracting one or more wave impulse response(s) based on the simulation of the propagation of sound.

22. The wave based solver according to item 21, wherein the wave impulse response(s) is/are spatial impulse response(s).

23. The wave based solver according to any one of the items 1-22, wherein the wave based solver renders the simulation of the propagation of sound for one or more output format(s), such as visual and/or graphical and/or numerical, and/or audible output format(s).

24. The wave based solver according to item 23, wherein the graphical output comprises visualising at least a part of the simulation of the propagation of sound in a cutting plane of the 3D model of a virtual space.

25. The wave based solver according to item 23, wherein the numerical output comprises one or more format(s), such as impulse responses, frequency responses, energy decay curves and/or acoustic parameters such as reverberation time, clarity, sound pressure level and/or speech intelligibility.

26. The wave based solver according to item 23, wherein the audible output comprises playing the impulse response convolved with a soundfile.

27. A computer implemented method for simulating the propagation of sound in at least one model of a virtual domain based on at least one sound source in the virtual domain and at least one acoustic property of the virtual domain, wherein the method applies a wave based solver for the steps of:
providing a wave based simulation by simulating the propagation of sound using at least a finite element method (FEM), such as a discontinuous Galerkin finite element method (DGFEM) or a spectral element method (SEM).

28. The computer implemented method according to item 27, wherein the virtual domain is a one dimensional (1D) domain, a two dimensional (2D) domain or a three dimensional (3D) domain such as a three dimensional model (3D) of a virtual space.

29. The computer implemented method according to item 28, wherein the 3D model of the virtual space is defined by boundary surfaces of an air volume.

30. The computer implemented method according to item 28 or 29, wherein the method represents boundary surfaces as meshes, thereby representing the 3D model of a virtual space as a 3D mesh model.

31. The computer implement method according to item 30, wherein the 3D mesh model is curvilinear.

32. The computer implemented method according to any one of the items 29-31, wherein the method represents the air volume as a volumetric 3D mesh model.

33. The computer implemented method according to item 32, wherein the method performs a qualitative evaluation on the volumetric 3D mesh model evaluating critical areas of sound propagation.

34. The computer implemented method according to any one of the items 27-33, wherein the method numerically discretizes the virtual space into sub-domains using an acoustic wave equation module.

35. The computer implemented method according to item 34, wherein the method represents the volumetric 3D mesh model of the air volume as discretized sub-domains.

36. The computer implemented method according to item 34 or 35, wherein the method applies the FEM to each sub-domain separately.

37. The computer implemented method according to any one of the items 27-36, wherein the method comprises simulating the propagation of sound at an at least one first boundary region comprising a first material using a locally-reacting frequency condition.

38. The computer implemented method according to any one of the items 27-37, wherein the method comprises simulating the propagation of sound at an at least one second boundary region comprising a second material using an extended-reacting frequency sub-module.

39. The computer implement method according to item 38, wherein the extended-reacting frequency sub-module is configured to model the second material with fluid structure acoustic simulations.

40. The computer implemented method according to item 38 or 39, wherein the second material is a porous material.

41. The computer implemented method according to any one of the items 27-40, wherein the method obtains at least one directive sound source in the 3D model, where the at least one directive sound source is arranged for emitting sound in a defined direction.

42. The computer implemented method according to any one of the items 27-41, wherein the method comprises the step of providing a time marching for simulating the propagation of sound in time and space.

43. The computer implemented method according to item 42, wherein the method further comprises the step of providing a second time marching method for simulating the propagation of sound in time, wherein the first time marching method comprises a standard low-storage explicit Runge-Kutta algorithm and the second time marching method comprises an implicit-explicit time marching algorithm.

44. The computer implemented method according to any one of the items 27-43, wherein each sub-domain is solved independently on a central processing unit (CPU) and/or a graphical processing unit (GPU).

45. The computer implemented method according to any one of the items 27-44, wherein a message passing interface (MPI) is configured to handle communication between central processing units (CPUs).

46. The computer implemented method according to item 44 or 45, wherein the communication handled by the MPI is performed following a halo exchange.

47. The computer implemented method according to any one of the items 27-46, wherein the method further comprises a step of extracting one or more wave impulse responses based on the wave based simulation.

48. The computer implemented method according to item 47, wherein the wave impulse response(s) is/are spatial impulse response(s).

49. The computer implemented method according to any one of the items 27-48, wherein the method comprises a step of rendering the wave based simulation for one or more output format(s), such as graphical and/or numerical, and/or audible output format(s).

50. The computer implemented method according to item 49, wherein the step of rendering the graphical output comprises visualising at least a part of the wave based simulation in a cutting plane of the 3D model of a virtual space.

51. The computer implemented method according to item 49, wherein the step of rendering the numerical output comprises generating one or more format(s) such as impulse responses, frequency responses, energy decay curves and/or acoustic parameters such as reverberation time, clarity, sound pressure level and/or speech intelligibility.

52. The computer implemented method according to item 49, wherein the step of rendering the audible output comprise playing the impulse response convolved with a soundfile.

53. A geometrical acoustics solver for simulating the propagation of sound in at least one model of a virtual domain based on at least one sound source in the virtual domain and at least one acoustic property of the virtual domain, wherein the geometrical acoustics solver comprises:
   at least one image source module for determining at least one image source simulation by simulating the propagation of sound;
   at least a first acoustic ray tracing module for determining an at least first ray tracing simulation by simulating the propagation of sound;
   a hybridization module for combining the at least first ray tracing simulation and the at least one image source simulation to a geometrical acoustics simulation of the propagation of sound; and
   an output module for preparing the output of the geometrical acoustics simulation.

54. The geometrical acoustics solver according to item 53, wherein the virtual domain is a one dimensional (1D) domain, a two dimensional (2D) domain or a three dimensional (3D) domain such as a three dimensional model (3D) of a virtual space.

55. The geometrical acoustics solver according to item 54, wherein the 3D model of the virtual space defines boundary surfaces of an air volume.

56. The geometrical acoustics solver according to any one of the items 53-55, wherein the at least one image source module determines at least one image source simulation of a first part of the propagation of sound and the at least first acoustic ray tracing module determines an at least first ray tracing simulation of a second part of the propagation of sound.

57. The geometrical acoustics solver according to any one of the items 53-56, wherein the first part of the propagation of sound is the primary set of reflections of the propagation of sound and the second part of the propagation of sound is the subsequent reverberations of the propagation of sound.

58. The geometrical acoustics solver according to any one of the items 53-57, wherein the primary set of reflections are the first, second and third reflections and the subsequent reverberations are the fourth, fifth and following reflections.

59. The geometrical acoustics solver according to any one of the items 53-58, wherein the geometrical acoustics solver further comprises a second acoustic ray tracing module for determining a second ray tracing simulation by simulating the propagation of sound, and that the hybridization module further combines the second ray tracing simulation with the first ray tracing simulation and the at least one image source simulation to the geometrical acoustics simulation.

60. The geometrical acoustics solver according to any one of the items 53-59, wherein the first acoustic ray tracing module determines a first subpart of the first part of the propagation of sound and the second acoustic ray tracing module determines a second subpart of the first part of the propagation of sound.

61. The geometrical acoustics solver according to any one of the items 53-60, wherein the geometrical acoustics solver is further modified for high performance computing implementation, such as parallelizing propagation of each ray or parallelizing a first and a second frequency range.

62. The geometrical acoustics solver according to any one of the items 53-61, wherein the geometrical acoustics solver further comprises a geometrical impulse response module for extracting a geometrical impulse response based on the geometrical acoustics simulation.

63. The geometrical acoustics solver according to any one of the items 53-62, wherein the output module prepares the geometrical acoustics simulation for one or more output format(s), such as visual and/or graphical and/or numerical, and/or audible output format(s).

64. The geometrical acoustics solver according to item 63, wherein the graphical output comprises visualising at least a part of the geometrical acoustics simulation in a cutting plane of the 3D model of a virtual space.

65. The geometrical acoustics solver according to any one of the items 53-64, wherein the geometrical acoustics solver relies on impedance of the boundaries of an air volume.

66. The geometrical acoustics solver according to any one of the items 53-65, wherein the geometrical acoustics solver approximates diffraction of acoustic waves in the virtual domain.

67. The geometrical acoustics solver according to any one of the items 53-66, wherein the 3D model comprises at least one directive sound source for emitting sound in a defined direction.

68. A computer implemented method for simulating the propagation of sound in at least one model of a virtual domain based on at least one sound source in the virtual domain and at least one acoustic property of the virtual domain, wherein the method applies a geometrical acoustics solver for the steps of:
providing a ray tracing simulation by simulating the propagation of sound using at least one acoustic ray tracing method;
providing an image source simulation by simulating the propagation of sound using at least one image source method;
providing a geometrical acoustic simulation of the propagation of sound by combining the ray tracing simulation and the image source simulation.

69. The computer implemented method according to item 68, wherein the virtual domain is a one dimensional (1D) domain, a two dimensional (2D) domain or a three dimensional (3D) domain such as a three dimensional model (3D) of a virtual space.

70. The computer implemented method according to item 69, wherein the 3D model of the virtual space is defined by boundary surfaces of an air volume.

71. The computer implemented method according to item 68, wherein the method comprises the step of determining the image source simulation of a first part of the propagation of sound and the step of determining the at least first ray tracing simulation of a second part of the propagation of sound.

72. The computer implemented method according to any one of the items 68-71, where the first part of the propagation of sound is the primary set of reflections of the propagation of sound and the second part of the propagation of sound is the subsequent reverberations of the propagation of sound.

73. The computer implemented method according to item 72, wherein the primary set of reflections are the first, second and third reflections and the subsequent reverberations are the fourth, fifth and following reflections.

74. The computer implemented method according to any one of the items 68-73, wherein the method further comprises providing a second acoustic ray tracing module for determining a second ray tracing simulation by simulating the propagation of sound, and that the hybridization method further comprises the step of combining the second ray tracing simulation with the first ray tracing simulation and the image source simulation to the geometrical acoustics simulation.

75. The computer implemented method according to any one of the items 68-74, wherein the method comprises the step of determining a first subpart of the first part of the propagation of sound using the first acoustic ray tracing method and the step of determining a second subpart of the first part of the propagation of sound using the second acoustic ray tracing method.

76. The computer implemented method according to any one of the items 68-75, wherein the computer implemented method is further modified for high performance computing implementation, such as parallelizing propagation of each ray or parallelizing a first and a second frequency range.

77. The computer implemented method according to any one of the items 68-76, wherein the method further comprises the step of extracting a geometrical spatial impulse response based on the geometrical acoustics simulation.

78. The computer implemented method according to any one of the items 68-77, wherein the method further comprises the step of preparing the geometrical acoustics simulation for one or more output format(s), such as visual and/or graphical and/or numerical, and/or audible output format(s).

79. The computer implemented method according to item 78, wherein the graphical output comprises visualising at least a part of the geometrical acoustics simulation in a cutting plane of the 3D model of a virtual space.

80. The computer implemented method according to any one of the items 68-79, wherein the computer implemented method is configured to rely on impedance of the boundaries of an air volume.

81. The computer implemented method according to any one of the items 68-80, wherein the computer implemented method approximates diffraction of acoustic waves in the virtual domain.

82. The computer implemented method according to any one of the items 68-81, wherein the 3D model comprises at least one directive sound source for emitting sound in a defined direction.

83. A computer implemented method for acoustic simulation in a virtual domain, wherein the method comprises the steps of:
(a) obtaining input data comprising at least one model of a virtual domain, at least one sound source in the virtual domain, and at least one acoustic property of the virtual domain;
(b) obtaining a wave based solver for determining the wave based propagation of sound in the virtual domain based on the at least one sound source and the at least one acoustic property within a first acoustic frequency range;
(c) obtaining a geometrical acoustics based solver for determining the ray based propagation of sound in the virtual domain based on the at least one sound source and the at least one acoustic property within a second acoustic frequency range; and
(d) outputting the wave based propagation and the geometrical acoustics based propagation.

84. The computer implemented method according to item 83, wherein the virtual domain is a one dimensional (1D) domain, a two dimensional (2D) domain or a three dimensional (3D) domain such as a three dimensional model (3D) of a virtual space.

85. The computer implemented method according to item 83, wherein the first and second acoustic frequency ranges are different.

86. The computer implemented method according to item 83 or 84, wherein the first acoustic frequency range are low-mid acoustic frequencies, such as 20 Hz-2 kHz, and the second acoustic range are high acoustic frequencies, such as 2 kHz-20 KHz.

87. The computer implemented method according to item 83, wherein the first and second acoustic frequency ranges partly overlap.

88. The computer implemented method according to item 83, wherein the first and second acoustic frequency ranges completely overlap.

89. The computer implemented method according to any one of the items 83-88, wherein the wave based propagation and the geometrical acoustics based propagation are merged together.

90. The computer implemented method according to any one of the items 83-89, wherein the lowest frequency of the second frequency range and/or the highest frequency of the first frequency range is manually selected by a user.

91. The computer implemented method according to any one of the items 83-90, wherein the method comprises a method for applying a wave based solver according to any one of the items 26-52 and/or a method for applying a geometrical acoustic solver according to any one of the items 68-82.

92. A method of training machine-learning driven audio algorithms comprising the steps of:
obtaining input data comprising at least one model of a virtual domain, at least one sound source located in the at least one model of a virtual domain and at least one acoustic property of the at least one model of a virtual domain;
performing at least one sound propagation simulation in a virtual space from the at least one sound source to at least one sound receiver located in the at least one model of a virtual domain;
obtaining at least one sound propagation simulation output from the at least one sound propagation simulation; and
training a machine-learning model for machine-learning driven audio algorithms with the at least one sound propagation simulation output.

93. The method according to item 92, wherein the virtual domain is a one dimensional (1D) domain, a two dimensional (2D) domain or a three dimensional (3D) domain such as a three dimensional model (3D) of a virtual space.

94. The method according to item 93, wherein the at least one 3D model comprises at least one internal surface, such as surfaces of at least one virtual object located in the 3D model.

95. The method according to item 92, wherein the at least one sound receiver comprises a plurality of oriented receivers.

96. The method according to item 95, wherein the plurality of oriented receivers are arranged at the location of the at least one sound receiver and wherein a first oriented receiver is oriented with a first angle and a second oriented receiver is oriented with a second angle.

97. The method according to any one of the items 92-96, wherein the at least one sound source is at least one directive sound source.

98. The method according to any one of the items 92-97, wherein the method comprises a step of obtaining at least one raw sound data.

99. The method according to item 98, wherein the at least one raw sound data is an audible sound, such as a music and/or a human voice.

100. The method according to item 98 or 99, wherein the at least one raw sound data does not comprise echo and/or reverberation.

101. The method according to item 99, wherein the audible sound is comprised between 20 Hz and 20 KHz.

102. The method according to any one of the items 98-101, wherein the at least one raw sound data is emitted by the at least one sound source in the 3D model of a virtual space.

103. The method according to any one of the items 98-102, wherein the at least one sound propagation simulation determines at least one modified raw sound data captured/received at the at least one sound receiver.

104. The method according to any one of the items 98-103, wherein the at least one modified raw sound data is the at least one raw sound data, which is convolved with a simulated impulse response obtained by the at least one sound propagation simulation.

105. The method according to any one of the items 98-104, wherein the machine-learning model is trained by comparing the at least one raw sound data to the at least one modified raw sound data.

106. The method according to any one of the items 98-105, wherein the machine-leaning model is trained by convolving the at least one raw sound data with a simulated impulse response obtained by the at least one sound propagation simulation.

107. The method according to any one of the items 98-106, wherein the input data comprises a plurality of three-dimensional model of a virtual space, preferably three or more three-dimensional models of a virtual space, more preferably ten or more three-dimensional models of a virtual space.

108. The method according to any one of the items 98-107, wherein the at least one sound source is substantially located at the same location as the at least one sound receiver.

109. The method according to any one of the items 98-108, wherein the at least one sound propagation simulation has at least one simulation time.

110. The method according to item 109, wherein the at least one simulation time is calibrated according to 3D model(s) properties.

111. The method according to item 110, wherein the 3D model(s) properties comprises 3D model(s) geometry and/or size.

112. The method according to any one of the items 92-111, wherein the method is configured to be used for speech recognition, echo cancelling, blind source separation, blind room response modeling or feature extraction.

113. The method according to any one of the items 92-112, wherein the at least one sound propagation simulation is configured to use the solver(s) and/or the computer-implemented method(s) according to items 1-91.

114. A method of determining a head-related transfer function comprising:
(a) obtaining a geometry of a user's head;
(b) performing a simulation of sound propagation from at least one audio source to the geometry of the user's head, wherein the simulation of sound propagation is based on a sound propagation simulation using a wave-based solver; and (c) determining a head-related transfer function (HRTF) for the user's head based on the simulation of sound propagation.

115. The method according to item 114, wherein the geometry of a user's head comprises at least one ear geometry.

116. The method according to any one of the items 114-115, wherein the wave-based solver is a discontinuous Galerkin finite element method-based solver.

117. The method according to any one of the items 114-116, wherein the wave-based solver determines the simulation of sound propagation simulation within an acoustic frequency range.

118. The method according to item 117, wherein the acoustic frequency range is comprised between 20 Hz and 20 KHz.

119. The method according to any one of the items 114-118, wherein the wave-based solver determines the simulation of sound propagation within a first acoustic frequency range.

120. The method according to item 119, wherein the first acoustic frequency range is comprised between 20 Hz and 200 Hz.

121. The method according to any one of the items 114-120, wherein the wave-based solver determines the simulation of sound propagation within a second acoustic frequency range.

122. The method according to item 121, wherein the second acoustic frequency range is comprised between 200 Hz and 2 KHz.

123. The method according to any one of the items 114-122, wherein the wave based solver determines the simulation of sound propagation within a third acoustic frequency range.

124. The method according to item 123, wherein the third acoustic frequency range is comprised between 20 Hz and 20 kHz, preferably between 20 Hz to 6 kHz, more preferably between 20 Hz to 10 KHz.

125. The method according to any one of the items 114-124, wherein the simulation of sound propagation using a wave-based solver is configured to use the wave-based solver according to any one of the items 1-26 and/or the computer implemented method according to any one of the items 27-52.

126. A computer-implemented method of generating a binaural auralization at a listening point, wherein the method comprises the step of:
(a) determining a head-related transfer function (HRTF) for a user's head according to any of the items 114-125;
(b) receiving a 3D model of a domain, a position of at least one sound source in the domain, and acoustic properties of a plurality of boundaries in the 3D model of the domain;
(c) arranging an array of secondary receivers around the listening point;
(d) executing a wave based solver for determining a wave impulse response of the wave based propagation of an impulse emitted at the at least one sound source in the 3D model of the domain and received at the listening point within a first acoustic frequency range;
(e) determining wave density coefficients based on a projection against spherical harmonics basis functions at the listening point;
(f) generating a binaural auralization at the listening point, by evaluating a spatial rendering equation, wherein the spatial rendering equation combines the wave density coefficients with the HRTF.

127. The computer-implemented method according to item 126, wherein the method further comprises the step of convolving the binaural auralization with an anechoic sound, thereby generating a rendered sound at the listening point.

128. The computer-implemented method according to any one of item 126 or 127, wherein the array of secondary receivers is an open-sphere array.

129. The computer-implemented method according to item 128, wherein the secondary receivers are arranged on the open-sphere array.

130. The computer-implemented method according to any one of the items 126-129, wherein the secondary receivers are directional receivers.

131. The computer-implemented method according to item 130, wherein the directional receivers are directional receivers with a first-order cardiod directivity pattern.

132. The computer-implemented method according to any one of the items 126-131, wherein the method further comprises the step of executing a geometrical acoustics based solver for determining a geometrical acoustic impulse response of a ray based propagation of the impulse emitted at the at least one sound source in the 3D model of the domain and received at the listening point within a second acoustic frequency range.

133. The computer-implemented method according to item 132, wherein the method further comprises a step of generating the impulse response by combining the wave impulse response and the geometrical impulse response.

134. The computer-implemented method according to item 132 or 133, wherein the method further comprises a step of determining geometrical acoustics spherical harmonics coefficients from the at least one sound source to the listening point.

135. The computer-implemented method according to item 132, 133 or 134, wherein the method further comprises a step of combining the geometrical acoustics spherical harmonics coefficients and the wave density coefficients, thereby obtaining hybridized spherical harmonics coefficients within the first and the second frequency range.

136. The computer-implemented method according to any one of items 126 to 135, wherein the method further comprises a step of rotating a HRTF reference in order to establish a given orientation at the listening point.

137. The computer-implemented method according to any one of the items 126-136, wherein the first and the second frequency range are the first and the second frequency range according to any one of items 114-125.

138. A computer implemented method generating an impulse response for a listening point in a room, wherein the method comprises the steps of:
(a) receiving a 3D model of the room, the position of at least one sound source in the room, and acoustic properties of the boundaries in the 3D model of the room;
(b) executing a wave based solver for determining a wave impulse response of the wave based propagation of an impulse emitted at the at least one sound source in the 3D model of the room and received at the listening point within a first acoustic frequency range;

(c) executing a geometrical acoustics based solver for determining a geometrical impulse response of the ray based propagation of an impulse emitted that the at least one sound source in the 3D model of the room and received at the listening point within a second acoustic frequency range; and (d) generating the impulse response by combining the wave impulse response and the geometrical impulse response.

139. A computer implemented method for generating an impulse response for a listening point in a room, wherein the method comprises the steps of:

(a) receiving a 3D model of the room, the position of at least one sound source in the 3D model of the room, and acoustic properties of at least one boundary in the 3D model of the room;

(b) using a wave based solver for determining a wave based impulse response of a wave based propagation of an impulse emitted at the at least one sound source in the 3D model of the room and received at the listening point within a first acoustic frequency range;

(c) using a geometrical acoustics based solver for determining a geometrical impulse response of the ray based propagation of an impulse emitted at the at least one sound source in the 3D model of the room and received at the listening point within a second acoustic frequency range; and (d) generating the impulse response by merging the wave impulse response and the geometrical impulse response.

140. The computer implemented method according to item 139, wherein the first and second acoustic frequency ranges partly overlap.

141. The computer implemented method according to item 139 or 140, wherein the virtual domain comprises at least one directive sound source for emitting sound in a defined direction.

142. The computer implemented method according to any one of items 139-141, wherein the computer implemented method further comprises performing a mesh model of the 3D model of the room, wherein the 3D mesh model is a 3D curvilinear mesh model.

143. The computer implemented method according to any one of items 139-142, wherein the wave based solver applies a discontinuous Galerkin finite element method (DGFEM) or a spectral element method (SEM).

144. The computer implemented method according to any one of the items 139-143, wherein the method further comprises a calibration step, wherein the power level of the at least one sound source is adjusted such that the sound level received at a predetermined distance from the at least one sound source is the same in the wave based solver and in the geometrical acoustic solver.

145. The computer implemented method according to any one of the items 139-144, wherein an upper frequency of the first acoustic frequency range and a lower frequency of the second frequency range overlap at a transition frequency.

146. The computer implemented method according to item 145, wherein the step of merging the wave based impulse response and the geometrical impulse response comprises applying a low pass filter to the wave based impulse response.

147. The computer implemented method according to item 145 or 146, wherein the step of merging the wave based impulse response and the geometrical impulse response comprises applying a high pass filter to the geometrical impulse response.

148. The computer implemented method according to item 146 or 147, wherein the low pass filter and/or the high pass filter comprises a cut off frequency at the transition frequency.

149. The computer implemented method according to any one of the items 139-148, wherein the wave based solver and/or the geometrical acoustic solver comprises extracting one or more wave based impulse response(s) and/or one or more geometrical impulse response(s) based on the simulation of the propagation of sound and wherein the wave based impulse response(s) is/are spatial impulse response(s).

150. The computer implemented method according to item 149, wherein the spatial impulse response(s) comprises a plurality of single channel impulse responses, wherein each one of the plurality of single channel impulse responses records the wave impulse response from a specific direction or angle at a same listening point.

151. The computer implemented method according to any one of the items 139-150, wherein a spherical receiver array is arranged around the listening point, wherein the spherical receiver array comprises a plurality of receivers.

152. The computer implemented method according to item 151, wherein the spherical receiver array is an open spherical array of cardioid receivers.

153. The computer implemented method according to item 151 or 152, wherein the spherical receiver array comprises at least 2 receivers, preferably at least 4 receivers, more preferably at least 8 receivers, even more preferably at least 16 receivers, most preferably at least 32 receivers, even most preferably at least 64 receivers.

154. The computer implemented method according to any one of items 151-153, wherein the number of receivers is determined based on the maximum truncation order N, such that the number of receivers is higher or equal to $(N+1)^2$.

155. The computer implemented method according to any one of items 139-154, wherein the computer implemented method further comprises convolving the generated impulse response with a base audio signal such that a convolved audio signal is generated.

156. The computer implemented method according to any one of items 139-155, wherein the computer implemented method further comprises rendering a base audio signal by convolving the base audio signal with the generated impulse response, thereby creating a rendered audio signal.

157. The computer implemented method according to item 156, wherein the base audio signal is a speech, a music, an environmental sound, an impulse sound or any combinations thereof.

158. The computer implemented method according to any one of items 155-157, wherein the rendered audio signal provides an audio rendering of the base audio signal in the 3D model of the room at the listening point.

159. A system for generating an impulse response for a listening point in a room, the system comprising:

a computer system having a processor coupled to a memory, the processor configured to:

receive a 3D model of the room, the position of at least one sound source in the 3D model of the room, and acoustic properties of at least one boundary in the 3D model of the room;

determine, using a wave-based solver, a wave-based impulse response of a wave-based propagation of an impulse emitted at the at least one sound source in the 3D model of the room and received at the listening point within a first acoustic frequency range;

determine, using a geometrical acoustics-based solver, a geometrical impulse response of a ray-based propagation of an impulse emitted at the at least one sound source in the 3D model of the room and received at the listening point within a second acoustic frequency range; and generate the impulse response by merging the wave impulse response and the geometrical impulse response.

160. A computer implemented method for training a machine learning model for audio compensation, wherein the method comprises the steps of:
receiving 3D models of a plurality of rooms, each of the 3D models comprising at least one sound source and at least one acoustic property,
receiving a plurality of impulse responses at a listening position in each of the plurality of rooms,
training the machine learning model for audio compensation using at least the plurality of impulse responses as input.

161. The computer implemented method according to item 160, wherein the plurality of impulse responses are pre-processed to generate a plurality of modified impulse responses for training the machine learning model.

162. The computer implemented method according to item 161, wherein the pre-processing comprises applying a filter to enhance a voice range in the impulse response.

163. The computer implemented method according to item 162, wherein the voice range is between 3 kHz-17 kHz or between 350 Hz-17 kHz.

164. The computer implemented method according to any one of the items 160-163, wherein the method further comprises providing a plurality of reverberating audio signals using the plurality of reverberating audio signals as input for training the machine learning model.

165. The computer implemented method according to item 164, wherein the reverberating audio signal is provided by convolving each of the plurality of impulse responses with a base audio signal.

166. The computer implemented method according to item 164, wherein the reverberating audio signal is provided by recording an audio signal received at an at least one speaker of an audio device.

167. The computer implemented method according to any one of the items 160 to 166, wherein the method further comprises using the 3D models of the plurality of rooms as input for training the machine learning model.

168. The computer implemented method according to any one of the items 160-167, wherein the method further comprises receiving a digital model of the audio device, and using the digital model of the audio device as an input for training the machine learning model.

169. The computer implemented method according to any one of the items 160-168, wherein the at least one preferred listening position in each of the plurality of rooms is used as input for training the machine learning model.

170. The computer implemented method according to any one of the item 160-169, wherein training the machine learning model comprises using the plurality reverberating audio signals according to item 164, 165 or 166 as input, wherein the training comprises reestablishing a base audio signal as an output.

171. The computer implemented method according to item 170, wherein the 3D models of the plurality of rooms is used as input and the at least one preferred listening point in each of the plurality of rooms is used as input, wherein the method further comprises reestablishing the base audio signal at the at least one preferred listening point as an output.

172. The computer implemented method according to any one of the items 160-171, wherein training the machine learning model comprises generating a compensation impulse response as an output.

173. The computer implemented method according to item 172, wherein generating the compensation impulse response is based on the reverberation audio signals according to item 164, 165 or 166 and a base audio signal as an input for training the machine learning model.

174. The computer implemented method according to item 172 or 173, wherein the 3D models of the plurality of rooms is used as input and the at least one preferred listening point in each of the plurality of rooms is used as input, wherein the method further comprises generating the compensation impulse response at the at least one preferred listening point as an output.

175. The computer implemented method according to any one of the item 160-174, wherein the method further comprises that receiving the plurality of impulse responses comprises generating the impulse responses according to the method of item 139-158 for each 3D model of the plurality of rooms.

176. The computer implemented model according to any one of the items 160-175, wherein the method further comprises receiving a digital model of the audio device.

177. The computer implemented method according to any one of the items 160-176, wherein training the machine learning model comprises a neural network.

178. The computer implemented method according to item 177, wherein the neural network comprises an auto encoder for encoding any of the inputs to the model or for generating a compressed input for use in training the machine learning model for audio compensation.

179. The computer implemented method according to item 177 or 178, wherein the neural network further comprises training a general adversarial network (GAN) for generating any one of the input for training the machine learning model for audio compensation.

180. The computer implemented method according to item 177, 178 or 179, wherein the neural network comprises a deep neural network, a convolutional neural networks and/or transformer for training the machine learning model for audio compensation.

181. A method for providing a machine learning model for audio compensation in an audio device, wherein the audio device comprises at least one microphone, wherein the machine learning model is trained by the method according to any of the items 160-180, and wherein the method comprises receiving an audio signal at the at least one microphone and generating a compensated audio signal by using the machine learning model for audio compensation.
182. The method for providing a machine learning based audio compensation in an audio device comprising at least one microphone, wherein the machine learning based audio compensation has been trained using a computer implemented method for training a machine learning model according to any one of the items 160-180, wherein the method for providing a machine learning based audio compensation comprises receiving an audio signal at the at least one microphone and generating a compensated audio signal by using the trained machine learning model on the received audio signal.
183. The method according to item 181 or 182, wherein the compensated audio signal is compensated by convolving the received audio signal with the compensation impulse response of item 172, 173 or 174.
184. An audio device comprising at least one microphone, wherein the audio device comprises a processing system for applying a machine learning based audio compensation according to the method of any one of items 181-183, wherein the audio device is configured to receive an audio signal at the at least one microphone and applies the machine learning based audio compensation to the audio signal to generate a compensated audio signal.
185. The audio device according to item 184, wherein the audio device comprises a communication module configured to transmit the compensated audio signal.
186. The audio device according to item 184 or 185, wherein the audio device is configured to transmit the compensated audio signal to a cloud, an internet and/or a network storage center.
187. The audio device according to item 184, 185 or 186, wherein the audio device is further configured to transmit the compensated audio signal to a remote audio device, wherein the remote audio device comprises at least one remote speaker for outputting the compensated audio signal.
188. A system for training a machine learning model for audio compensation, the system comprising:
a computer system having a processor coupled to a memory, the processor configured to:
receive 3D models of a plurality of rooms, each of the 3D models including at least one sound source and at least one acoustic property;
receive a plurality of impulse responses at a listening position in each of the plurality of rooms; and
training the machine learning model for audio compensation using at least the plurality of impulse responses as input.
189. A computer implemented method of determining a head-related transfer function comprising:
(a) receiving a 3D model of a user's head and the position of at least one sound source representing the ear drum or an approximation thereon in the 3D model;
(b) using a wave based solver for determining a plurality of wave based impulse responses from an impulse emitted at the at least one sound source, wherein the plurality of wave based impulse responses is determined at a plurality of digital representation of head receivers; and
(c) determining a head-related transfer function (HRTF) for the user's head based on the plurality of wave based impulse responses being determined at the plurality of digital representation of head receivers.
190. The computer implemented method according to item 189, wherein the wave-based solver uses a discontinuous Galerkin finite element method (DGFEM) or a spectral element method (SEM).
191. The computer implemented method according to any one of items 189-190, wherein the computer implemented method further comprises obtaining a head mesh model representing a geometry of the user's head.
192. The computer implemented method according to item 191, wherein the head mesh model is a curvilinear head mesh model.
193. The computer implemented method according to any one of items 189-192, wherein the computer implemented method further comprises arranging a digital representation of a head array comprising the plurality of digital representations of head receivers around the head mesh model, such that the distance between any of the digital representations of the head receivers and the head mesh model is not below a predetermined distance.
194. The computer implemented method according to any one of items 189-193, wherein the computer implemented method further comprises determining on the head mesh model a first closest mesh element, which is closest to the ear drum.
195. The computer implemented method according to any one of items 189-194, wherein the computer implemented method further comprises arranging a digital representation of a first source correction microphone located at a first source distance from the first closest mesh element, wherein the first source distance is smaller than the predetermined distance.
196. The computer implemented method according to any one of items 189-195, wherein the computer implemented method further comprises digitally emit a first impulse signal using the first closest mesh element as a sound source.
197. The computer implemented method according to any one of items 189-196, wherein the computer implemented method further comprises determine a first source correction signal using the wave-based solver, wherein the first source correction signal describes the first impulse signal as received at the first source correction microphone.
198. The computer implemented method according to any one of items 189-197, wherein the computer implemented method further comprises determine a plurality of first source corrected head impulse responses by source correcting each of the plurality of wave based impulse responses using the first source correction signal.
199. The computer implemented method according to any one of items 189-198, wherein the computer implemented method further comprises generate the head related transfer function of the user's head for the first ear drum by combining the plurality of first source corrected head impulse responses.

The invention claimed is:
1. A computer implemented method for generating an impulse response for a listening point in a room, the method comprising:
receiving a 3D model of the room, a position of at least one directive sound source for emitting sound in a defined direction in the 3D model of the room, and acoustic properties of at least one boundary in the 3D model of the room;

determining, using a time-domain discontinuous Galerkin finite element method (DGFEM), a plurality of wave-based impulse responses of a wave-based propagation of a plurality of impulses emitted at the at least one directive sound source for emitting sound in a defined direction in the 3D model of the room and received at the listening point within a first acoustic frequency range, wherein the at least one directive sound source is modelled using spherical harmonics functions, wherein each of the plurality of impulses matches a directivity pattern associated with at least one spherical harmonics function;

generating a directional wave-based impulse response of the wave-based propagation of the plurality of impulses emitted at the at least one directive sound source by combining the plurality of wave-based impulse responses;

determining, using a geometrical acoustics-based solver, a geometrical impulse response of a ray-based propagation of an impulse emitted at the at least one directive sound source for emitting sound in a defined direction in the 3D model of the room and received at the listening point within a second acoustic frequency range; and generating the impulse response by merging the directional wave-based impulse response and the geometrical impulse response.

2. The computer implemented method according to claim 1, wherein the first and second acoustic frequency ranges partly overlap.

3. The computer implemented method according to claim 1, wherein the computer implemented method further comprises generating a mesh model of the 3D model of the room, wherein the mesh model is a 3D curvilinear mesh model.

4. The computer implemented method according to claim 1, further comprising adjusting a power level of the at least one sound source such that a sound level received at a predetermined distance from the at least one sound source is the same in the time-domain DGFEM and in the geometrical acoustic solver.

5. The computer implemented method according to claim 1, wherein an upper frequency of the first acoustic frequency range and a lower frequency of the second frequency range overlap at a transition frequency.

6. The computer implemented method according to claim 5, wherein merging the wave-based impulse response and the geometrical impulse response comprises applying a low pass filter to the wave-based impulse response.

7. The computer implemented method according to claim 5, wherein merging the wave-based impulse response and the geometrical impulse response comprises applying a high pass filter to the geometrical impulse response.

8. The computer implemented method according to claim 7, wherein at least one of the low pass filter and the high pass filter comprises a cut off frequency at the transition frequency.

9. The computer implemented method according to claim 1, wherein using at least one of the time-domain DGFEM and the geometrical acoustic solver comprises extracting at least one of one or more wave impulse responses and one or more geometrical impulse responses based on a simulation of a propagation of sound and wherein the one or more wave impulse responses are spatial impulse responses.

10. The computer implemented method according to claim 9, wherein the one or more spatial impulse responses comprise a plurality of single channel impulse responses, wherein each one of the plurality of single channel impulse responses corresponds to the wave impulse response from a specific direction or angle at a same listening point.

11. The computer implemented method according to claim 1, wherein a spherical receiver array is arranged around the listening point, wherein the spherical receiver array comprises a plurality of receivers.

12. The computer implemented method according to claim 11, wherein the spherical receiver array is an open spherical array of cardioid receivers.

13. The computer implemented method according to claim 11, wherein the spherical receiver array comprises at least 4 receivers.

14. The computer implemented method according to claim 11, wherein a number of receivers is determined based on the maximum truncation order N, such that the number of receivers is higher or equal to $(N+1)^2$.

15. The computer implemented method according to claim 1, further comprising convolving the generated impulse response with a base audio signal such that a convolved audio signal is generated.

16. The computer implemented method according to claim 1, further comprising rendering a base audio signal by convolving the base audio signal with the generated impulse response, thereby creating a rendered audio signal.

17. The computer implemented method according to claim 16, wherein the base audio signal is selected from the group consisting of speech, music, an environmental sound, an impulse sound, and combinations thereof.

18. The computer implemented method according to claim 16, wherein the rendered audio signal provides an audio rendering of the base audio signal in the 3D model of the room at the listening point.

19. A system for generating an impulse response for a listening point in a room, the system comprising:

a computer system having a processor coupled to a memory, the processor configured to:

receive a 3D model of the room, a position of at least one directive sound source for emitting sound in a defined direction in the 3D model of the room, and acoustic properties of at least one boundary in the 3D model of the room;

determine, using a time-domain discontinuous Galerkin finite element method (DGFEM), a plurality of wave-based impulse responses of a wave-based propagation of a plurality of impulses emitted at the at least one directive sound source for emitting sound in a defined direction in the 3D model of the room, wherein the at least one directive sound source is modelled using spherical harmonics functions, and received at the listening point within a first acoustic frequency range, wherein each of the plurality of impulses matches a directivity pattern associated with at least one spherical harmonics function;

generate a directional wave-based impulse response of the wave-based propagation of the plurality of impulses emitted at the at least one directive sound source by combining the plurality of wave-based impulse responses;

determine, using a geometrical acoustics-based solver, a geometrical impulse response of a ray-based propagation of an impulse emitted at the at least one directive sound source for emitting sound in a defined direction in the 3D model of the room and received at the listening point within a second acoustic frequency range; and generate the impulse response by merging the directional wave-based impulse response and the geometrical impulse response.

* * * * *

UNITED STATES PATENT AND TRADEMARK OFFICE
CERTIFICATE OF CORRECTION

PATENT NO. : 12,242,972 B2
APPLICATION NO. : 18/521850
DATED : March 4, 2025
INVENTOR(S) : Finnur Pind and Jesper Pedersen Page 1 of 1

It is certified that error appears in the above-identified patent and that said Letters Patent is hereby corrected as shown below:

On the Title Page

Item (72) Inventors should read:
Finnur Pind, Reykjavik (IS); Jesper Pedersen, Garðabær (IS); Matthias Cosnefroy, Reykjavik (IS)

Signed and Sealed this
Twelfth Day of August, 2025

Coke Morgan Stewart
*Acting Director of the United States Patent and Trademark Office*